US012657265B2

(12) United States Patent
Hurwitz et al.

(10) Patent No.: US 12,657,265 B2
(45) Date of Patent: Jun. 16, 2026

(54) PHYSICAL UNCLONABLE FUNCTION READOUT APPARATUS

(71) Applicant: Analog Devices International Unlimited Company, Limerick (IE)

(72) Inventors: Jonathan Ephraim David Hurwitz, Edinburgh (GB); Jose Bernardo Din, Biclatan (PH); Albert Movilla Lastimada, Imus (PH)

(73) Assignee: Analog Devices International Unlimited Company, Limerick (IE)

( * ) Notice: Subject to any disclaimer, the term of this patent is extended or adjusted under 35 U.S.C. 154(b) by 366 days.

(21) Appl. No.: 18/144,667

(22) Filed: May 8, 2023

(65) Prior Publication Data

US 2024/0378270 A1    Nov. 14, 2024

(51) Int. Cl.
| | |
|---|---|
| *G06F 21/00* | (2013.01) |
| *G06F 7/58* | (2006.01) |
| *G06F 21/31* | (2013.01) |

(52) U.S. Cl.
CPC .............. *G06F 21/31* (2013.01); *G06F 7/588* (2013.01); *G06F 2221/2103* (2013.01)

(58) Field of Classification Search
CPC .. G06F 21/31; G06F 2221/2103; G06F 7/588; H04L 9/3234; H04L 9/0869; H04L 9/3273; H04L 9/3271; H04L 9/3278
See application file for complete search history.

(56) References Cited

U.S. PATENT DOCUMENTS

| | | | | |
|---|---|---|---|---|
| 11,962,709 B1* | 4/2024 | Hunt-Schroeder | ... | H04L 9/0866 |
| 11,985,260 B2* | 5/2024 | Schifmann | ............ | H04L 9/0866 |

(Continued)

FOREIGN PATENT DOCUMENTS

WO        2022170142        8/2022

OTHER PUBLICATIONS

"International Application Serial No. PCT/EP2024/061981, International Search Report mailed Sep. 30, 2024", 6 pgs.

(Continued)

*Primary Examiner* — Joseph P Hirl
*Assistant Examiner* — Chi D Nguy
(74) *Attorney, Agent, or Firm* — Schwegman Lundberg & Woessner, P.A.

(57)        ABSTRACT

The present disclosure relates to a physical unclonable function, PUF, apparatus. In one example, the PUF apparatus includes a PUF source, for outputting a first signal and a second signal, where a difference between the signals is indicative of a random manufacturing difference between components in the PUF source, and an analog to digital converter, ADC, for coupling to the PUF source. In this example, the PUF apparatus is configured to operate in a plurality of different modes comprising at least a PUF coarse-measurement mode and a PUF fine-measurement mode. When operating in the PUF coarse-measurement mode and when operating in the PUF fine-measurement mode, the PUF apparatus is configured to use the ADC to generate a digital measurement that is a measure of the difference between the first signal and the second signal and generate a PUF value using the digital measurement. However, when the PUF apparatus is operating in the PUF fine-measurement mode, the digital measurement has a greater resolution than when operating in the PUF coarse-measurement mode.

18 Claims, 29 Drawing Sheets

(56)  References Cited

U.S. PATENT DOCUMENTS

| | | | |
|---|---|---|---|
| 2020/0104101 A1 | 4/2020 | Satpathy et al. | |
| 2020/0287729 A1 | 9/2020 | Hurwitz | |
| 2022/0045872 A1* | 2/2022 | Holland | G06F 17/18 |
| 2022/0385849 A1* | 12/2022 | Sawada | H04N 25/67 |
| 2024/0078087 A1* | 3/2024 | Taneja | H04L 9/0866 |
| 2024/0106664 A1* | 3/2024 | Yang | H04L 9/0866 |

OTHER PUBLICATIONS

"International Application Serial No. PCT/EP2024/061981, Written Opinion mailed Sep. 30, 2024", 13 pgs.

\* cited by examiner

PHYSICAL UNCLONABLE FUNCTION READOUT APPARATUS

TECHNICAL FIELD

The present disclosure relates to methods and apparatus for reading out a physical unclonable function (PUF) value from a PUF cell.

BACKGROUND

A physical unclonable function (sometimes also called physically unclonable function) or 'PUF' is a physical entity capable of generating an output ('response') to a given input ('challenge') that is unique to that particular PUF such that it can be regarded as a 'fingerprint'. This capacity is typically arrived at by devising the PUF in such a way that its output depends upon features that differ randomly in each device due to minor manufacturing variations. Thus, a PUF cannot be readily replicated with the correct fingerprint, even with full knowledge of its circuit layout. The response may be used for various different purposes, for example in cryptographic operations to secure communications to/from a device that includes the PUF, or used in a process of authenticating the identity of a device that includes the PUF, etc.

A PUF apparatus may comprise one or more pairs of physical devices, each comprising some physical features that differ randomly due to minor manufacturing variations, and some determination circuitry configured to readout a PUF value from a pair of physical devices. The PUF apparatus may be configured such that the determination circuitry can read out a persistent random PUF value from each of the pairs of physical devices and generate a persistent random number based on the PUF value(s). The persistent random number may then be used as part of the determination of a 'response' to a 'challenge'. For example, the PUF apparatus may receive a 'challenge' from another circuit, the determination circuitry may then read the persistent random number from the PUF cells and the PUF apparatus may then determine a 'response' based on the 'challenge' and the persistent random number (for example, by carrying out some cryptographic operation, such as a hash, or XOR, or encryption using the 'challenge' and the persistent random number). A persistent random number is random in that its value is dependent on the minor, random manufacturing variations between different PUF apparatus. Thus, different instances of the PUF apparatus, whilst identical in design, should each generate a different, persistent random number. A random number is 'persistent' in that it should stay the same, or stay the same within acceptable limits, over time. For example, the persistent random number generated by the one or more PUF cells of a PUF apparatus should be the same each time it is generated (or stay the same within acceptable limits, for example so that it can be corrected using error correcting code, ECC), so that it can act as a reliable fingerprint of the device.

A random number generator (RNG), or true random number generator (TRNG), is a device that generates a 'dynamic' random number. A dynamic random number is one where each time a new random number is generated, there is an equal, or substantially equal, likelihood of the random number having any one of its possible values. The random number as it has the possibility of changing each time a new number is generated, in contrast to a 'persistent' random number which should stay the same, or stay the same within acceptable limits, each time a new number is generated.

Dynamic random numbers are used for a variety of different purposes, for example as part of cryptographic processes. In some instances, there is a need for a PUF apparatus for generating a persistent random number and an RNG apparatus for generating a dynamic random number, for example where the persistent random number and dynamic random number are both used as part of a particular process, such as a cryptographic key generation process.

SUMMARY

In a first aspect of the disclosure, there is provided a physical unclonable function, PUF, apparatus, comprising: a PUF source for outputting a first signal and a second signal, wherein a difference between the first signal and the second signal is indicative of a random manufacturing difference between components in the PUF source; and an analog to digital converter, ADC, for coupling to the PUF source; wherein the PUF apparatus is configured to operate in a plurality of different modes comprising at least a PUF coarse-measurement mode and a PUF fine-measurement mode, and wherein when operating in the PUF coarse-measurement mode and when operating in the PUF fine-measurement mode, the PUF apparatus is configured to: use the ADC to generate a digital measurement that is a measure of the difference between the first signal and the second signal; and generate a PUF value using the digital measurement, and wherein when the PUF apparatus is operating in the PUF fine-measurement mode, the digital measurement has a greater resolution than when operating in the PUF coarse-measurement mode.

In a second aspect of the disclosure, there is provided a system comprising: a pair of matched electrical devices; a noise source configured to generate an electrical signal comprising random noise; and a determination circuit configured to, when the system is operating in a physical unclonable function, PUF, mode: generate, using the pair of matched electrical devices, a first electrical signal that is indicative of a random manufacturing difference between the pair of matched electrical devices; and generate a PUF value based on the first electrical signal, and wherein the determination circuit is further configured to, when the system is operating in a dynamic random number mode: generate, using the noise source, a second electrical signal comprising random noise; and generate a dynamic random number using the second electrical signal.

In a third aspect of the disclosure, there is provided a physical unclonable function, PUF, system, comprising: a pair of matched devices; and a determination circuit coupled to the pair of matched devices, wherein when the system is operating in an enrolment mode, the determination circuit is configured to: determine whether a magnitude of a random manufacturing difference between the pair of matched devices exceeds a stability threshold; mark the pair of matched devices as suitable for use in generating a PUF value if the magnitude of the random manufacturing difference exceeds the stability threshold; and mark the pair of matched devices as unsuitable for use in generating a PUF value if the magnitude of the random manufacturing difference is less than the stability threshold, and wherein when the system is operating in a PUF mode and the pair of matched devices are marked as suitable for use in generating a PUF value: determine a measure of the random manufacturing difference between the pair of matched devices; and generate the PUF value using the measure of the random manufacturing difference between the pair of matched devices.

DRAWINGS

Aspects of the present disclosure are described, by way of example only, with reference to the following drawings, in which.

DETAILED DESCRIPTION

Disclosed herein are various circuits designs that improve the accuracy and/or versatility of PUF apparatus. In one aspect, the PUF apparatus can be configured to be operable in various different modes. For example, to generate a PUF value (e.g., a 0 or a 1) a measure of the difference between two signals may be determined. The difference between the two signal may be indicative of a random manufacturing difference between a pair of matched electronic devices (e.g., two electrical components that are intended to be identical, but will have some random differences between them as a result of manufacturing processes). The signals may be measured in a way that is indicative of which of the two signals is larger, which may decide whether the PUF value is a 0 or a 1. However, the PUF apparatus may be configured to be operable to measure the two signals to different degrees of accuracy, but still using at least some of the same components and circuitry for each mode of operation. For example, in one mode the measurement may be of the magnitude of the difference between the signals and also the sign (positive or negative) of the difference, and in another mode the measurement may be just the sign of the difference. Additionally or alternatively, the PUF apparatus 100 may be configured to be operable in a self-enrolment mode where again at least some of the same signal measurement circuitry is reused. In this mode, the magnitude of the difference may be measured against a stability threshold that indicates how stable a PUF value generated using those two signals will be. For example, is the difference between the two signals is found to be very small and below the threshold, there may be a risk the PUF value generated using those signals in the future will change from a 0 to 1 (or vice-versa), thereby failing to meet the 'persistent' requirement. In that case, a record can be kept that that pair of signals should not be used for PUF output generation in the future. Additionally or alternatively, the PUF apparatus also comprise a source of random noise, and the PUF apparatus may be configured to be operable in a mode where a dynamic random number is generated, again reusing at least some of the signal measurement devices and circuits used for PUF related measurements.

As a result of the reconfigurability of the PUF apparatus in this aspect of the disclosure, a highly versatile device may be realised at limited component cost and in a relatively small area, since many readout components/circuits are reused by each mode of operation.

In other aspects of the disclosure, the PUF apparatus may be configured to operate in only one mode. In those instances, the PUF apparatus may generate PUF values with greater accuracy or greater reliability than previous devices, for example by virtue of measuring the difference between signals more accuracy and/or more quickly and/or more efficiently.

Figure 1:
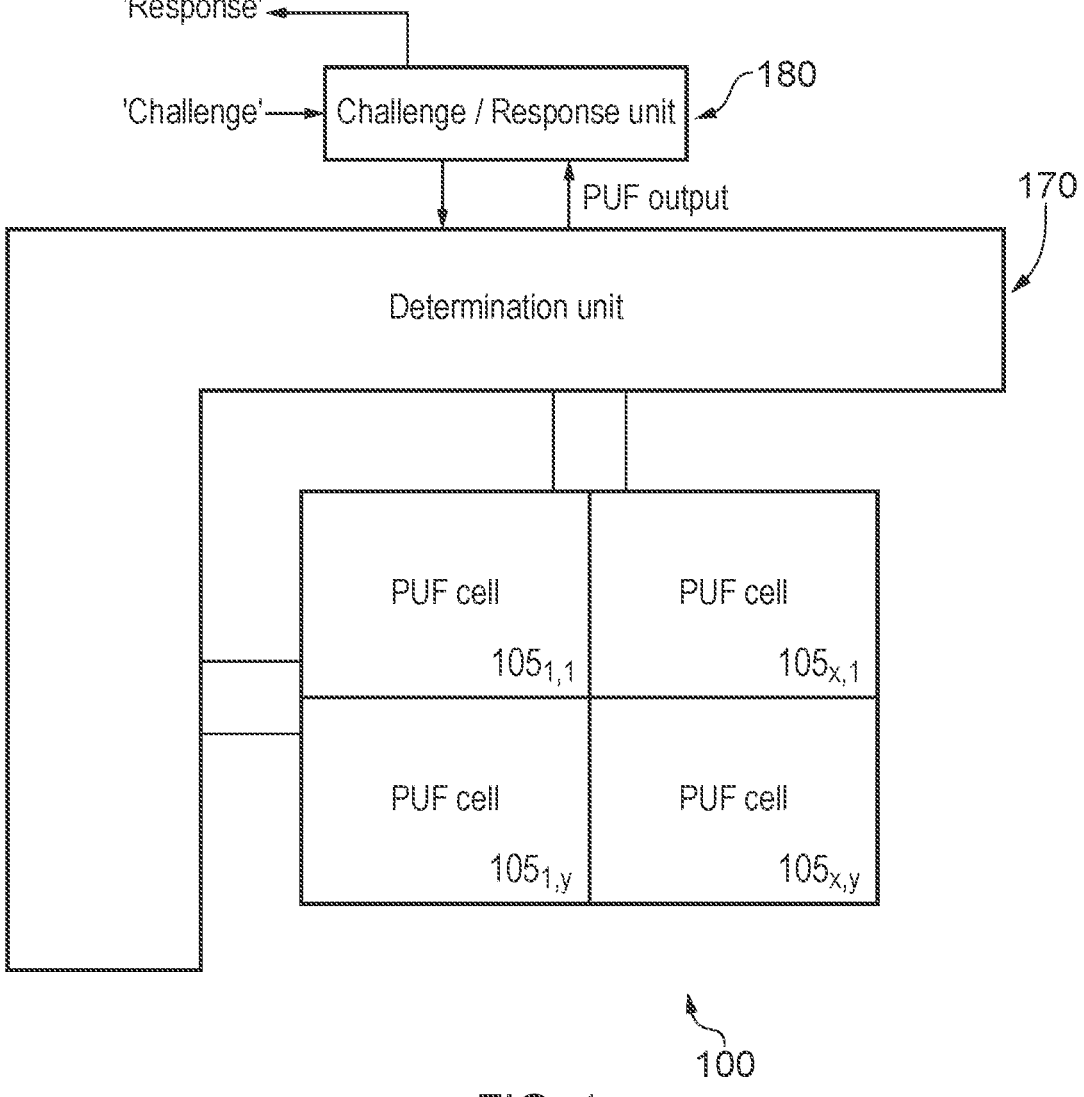
FIG. 1 shows an example schematic representation of a PUF apparatus/system in accordance with an aspect of the present disclosure.

FIG. 1 shows an example schematic representation of a PUF apparatus/system 100 in accordance with an aspect of the present disclosure. The PUF apparatus comprises a plurality of PUF cells 105$_{x,y}$, a determination unit 170 and a challenge/response unit 180. Whilst only a 2×2 array of PUF cells 105$_{x,y}$ is represented, it will be appreciated that there may be any number of PUF cells, (for example, 8, 12, 20, 32, 128, 256, etc, etc) arranged in an array of any size and dimension, or arranged in any other suitable configuration.

The determination unit 170 is configured to determine a PUF output using the plurality of PUF cells 105$_{x,y}$. The PUF output is a persistent random number. Each PUF cell 105$_{x,y}$ comprises a pair of physical components/devices, where the determination unit 170 measures a difference in a physical characteristic of the pair of components/devices in a particular PUF cell 105$_{x,y}$ in order to determine a persistent random PUF value. The determination unit 170 may repeat this for a plurality of the PUF cells 105$_{x,y}$ and the plurality of determined persistent random values may then be used to generate the PUF output (for example, each persistent random value may be a 1-bit or multi-bit value that forms part of the PUF output. In one particular non-limiting example, the PUF output may be a 128-bit word, and 128 PUF cells may each contribute 1-bit to the 128-bit word).

The challenge/response unit 180 is configured to receive a 'challenge' from an external entity, request and obtain the PUF output from the determination unit 170 and then determine and return a response based on the challenge and the PUF output. The challenge/response unit 180 may be configured to operate in any suitable way that will be apparent to the person skilled in the art of PUF devices. The challenge/response unit 180 may form a separate unit, or may be part of the determination unit 170. The present disclosure is concerned specifically with the configuration and operation of the determination unit 170, as described in detail below. Further reference to, or explanation of, the challenge/response unit 180 is given only where helpful in explaining the operation of the determination unit 170.

Example PUF Cell Implementations

Each PUF cell 105$_{x,y}$ may comprise a pair of any suitable physical devices/components that are arranged to be compared in order to determine a difference in their physical characteristics, caused by random manufacturing differences.

For example, each PUF cell 105$_{x,y}$ may comprise a pair of matched transistors and the determination unit 170 may be configured to determine a PUF output based on a difference between a physical characteristic (such as gate-source voltage) of the transistors that is caused by random manufacturing differences. Various example implementations of the PUF apparatus/system 100 where PUF cells 105$_{x,y}$ each comprise a pair of transistors are given in U.S. patent application Ser. No. 16/296,998 (the '998 application), which is incorporated herein by reference in its entirety. Two particular example implementations are disclosed between FIGS. 2 to 9 and between line 16, page 10, to line 6, page 26 of the '998 application as filed, some of which is reproduced in part below.

Figure 2:
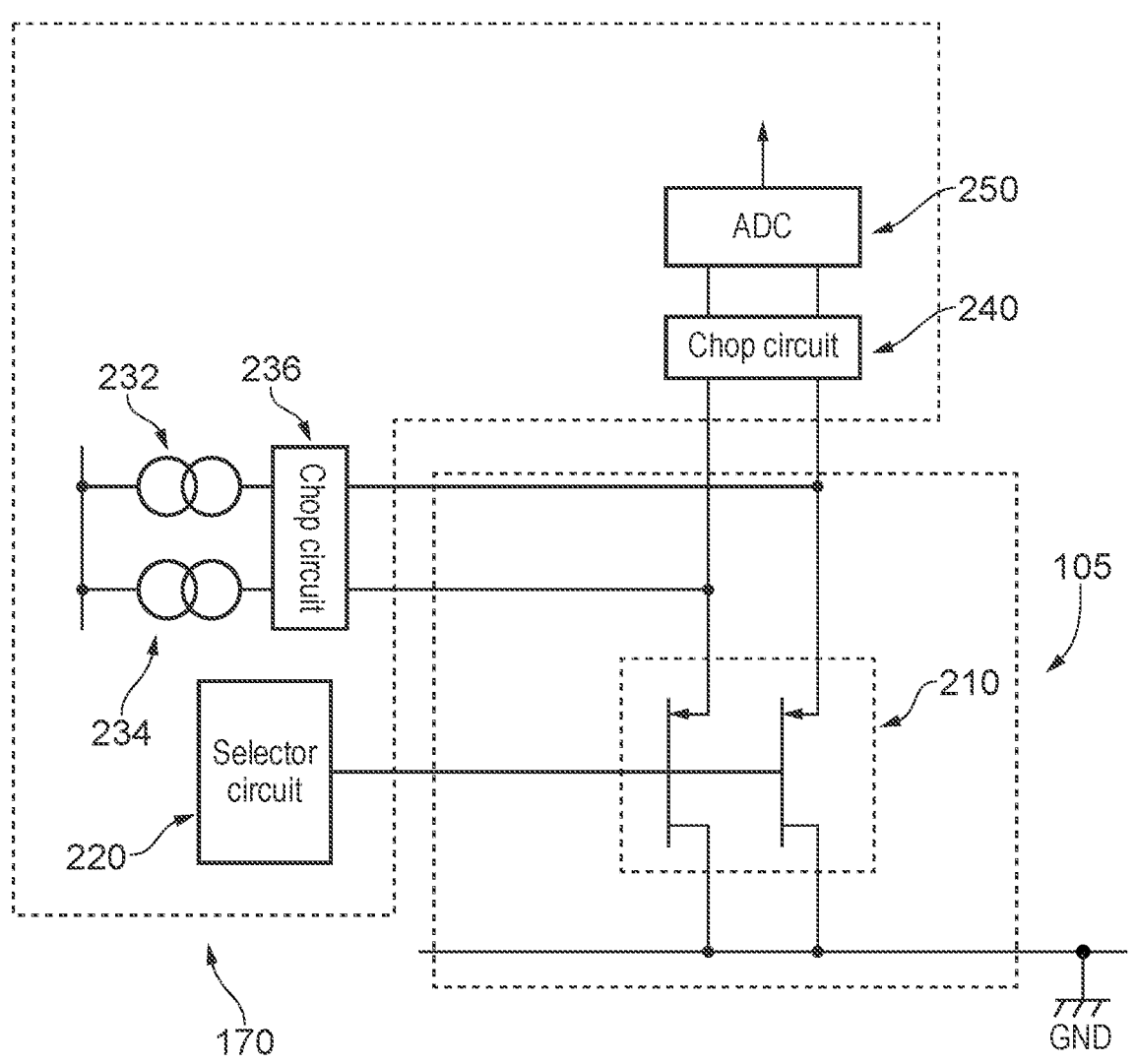
FIG. 2 shows a schematic diagram of an example implementation of a PUF cell and determination unit.

FIG. 2 (which is reproduced from FIG. 2 of U.S. patent application Ser. No. 16/296,998) shows a schematic diagram of an example implementation of a PUF cell 105 and the determination unit 170 configured to determine a PUF value of the PUF cell 105.

Figure 3A:
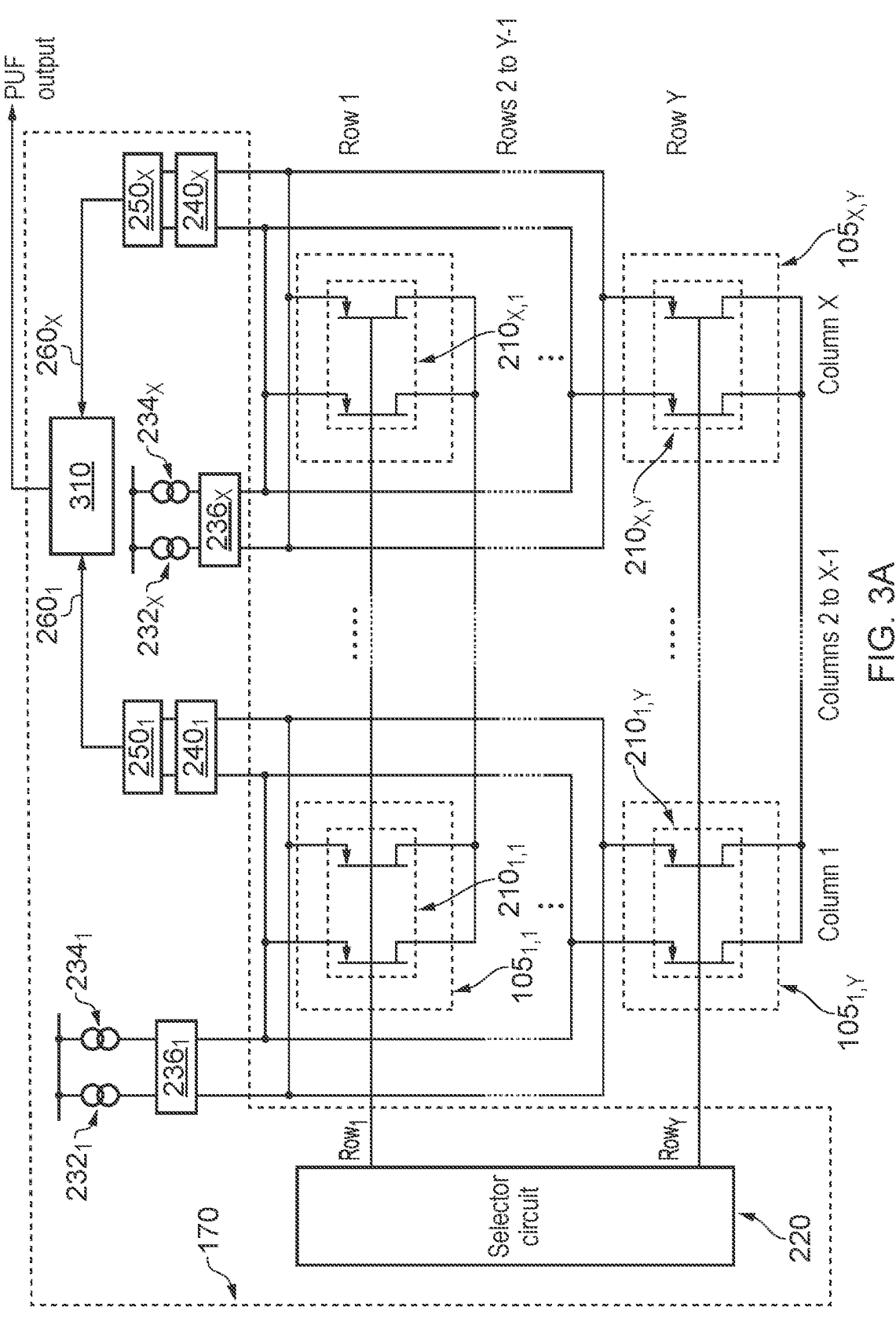
FIGS. 3A and 3B show example schematic diagrams of an array of PUF cells.

FIG. 3A (which is reproduced from FIG. 3 of U.S. patent application Ser. No. 16/296,998) shows a schematic diagram of an array of PUF cells 105$_{x,y}$ that are each configured in the same way as the PUF cell 105 represented in FIG. 2.

Returning to FIG. 2, the PUF cell 105 comprises a matched pair of transistors 210. The term 'matched' in this disclosure means that the pair of transistors are of identical design. Whilst FIG. 2 shows a representation of a matched pair of p-type FETs, it will be appreciated that throughout the present disclosure, in every different described aspect, the matched pair of transistors 210 may be of any transistor type, for example p-type, n-type, enhancement, depletion, FETs (such as MOSFETS, JFETs, MESFETs, etc), BJTs (such as IGBTs, heterojunction bipolar transistors, etc), etc. For the sake of simplicity, we focus specifically on FETs, but it should be appreciated that the terms 'gate', 'source' and 'drain' used herein encompass the terms 'base', 'emitter' and 'collector' of BJTs.

Whilst the two transistors making up the matched pair of transistors 210 are of identical design, in practice there will inevitably be small, random manufacturing variations between the two transistors. Those manufacturing variations may include at least one of: differences in gate oxide thickness, differences in doping densities, differences in carrier mobility, differences in device dimensions, etc. These manufacturing variations result in variations in transistor on-state characteristics/performance, such as differences in turn-on threshold voltage, differences in B, differences in the back-gate effect, etc. The term 'on-state' is used herein to refer to an operational characteristic of a transistor relating to its normal on state operation, such as turn-on threshold voltage, gate-source voltage, drain current, linear resistivity, saturation point, transconductance, etc. By considering an on-state characteristic, as opposed to an off-state characteristic (such as off-state leakage current) or a failure characteristic (such as dielectric breakdown), reliability of the PUF apparatus 100 may be increased, since high voltages are not applied, gate oxides are not degraded, etc.

The determination unit 170 is configured to determine a transistor difference value based at least in part on a comparison of an on-state characteristic of the matched pair of transistors 210, wherein the transistor difference value is indicative of one or more random manufacturing differences between the matched pair of transistors 210. In this implementation, the compared on-state characteristic of the matched pair of transistors 210 is the gate-source voltage of the two transistors ($V_{GS}$). The $V_{GS}$ of the two transistors may differ as a result of one or many different random manufacturing differences that cause, for example, a difference in the turn-on threshold voltage and/or β and/or back-gate effect, of the transistors.

The drains of the matched pair of transistors 210 are coupled to ground. The determination unit 170 comprises a selector circuit 220 configured to apply a suitable voltage to the gates of the matched pair of transistors 210 in order to turn-on the transistors. This voltage functions as a 'selection potential', which is explained in more detail below with reference to FIG. 3A. The determination unit 170 also comprises a first current source 232 and a second current source 234, that are configured to provide the same amount of current as each other. The current from the first current source 232 may be applied as a first input signal to the source of a first transistor of the matched pair of transistors 210, and the current from the second current source 234 may be applied as a second input signal to the source of a second transistor of the matched pair of transistors 210. If the matched pair of transistors 210 were truly identical, their source voltages would be exactly the same. However, owing to random manufacturing differences, the gate-source voltages of the two transistors are likely to be different and, since the gate voltage applied to the matched pair of transistors 210 is the same, the source voltages of the matched pair of transistors 210 should be different by some amount.

The determination unit 170 further comprises an ADC 250 that is configured to measure the difference in the gate-source voltage and output a digital value indicative of the difference. However, it has been realised that there may be some mismatch between the currents provided by the first current source 232 and the second current source 234. Therefore, a chop circuit 236 may be provided so that the first input signal (the current from the first current source 232) may be applied to the first transistor, the second input signal (the current from the second current source 234) may be applied to the second transistor and a first transistor comparison value determined by the ADC 250 by comparing the gate-source voltages of the matched pair of transistors 210. Then, the chop circuit 236 may switch the coupling of the first current source 232 and the second current source 234 such that the first input signal is applied to the second transistor, the second input signal is applied to the first transistor and a second transistor comparison value is determined by the ADC 250 by comparing the gate-source voltages of the matched pair of transistors 210.

The first and second transistor comparison values may be expressed as:

First transistor mismatch value = $\Delta V_{GS}$ + mismatch + noise1

Second transistor mismatch value = $\Delta V_{GS}$ − mismatch + noise 2

The transistor difference value for the PUF cell 105 may then be determined based on the first transistor comparison value and the second transistor comparison value, for example from a sum or an average of the first transistor comparison value and the second transistor comparison value.

For example, the transistor difference value may be expressed as:

transistor difference value = first mismatch value + second mismatch value = $2 * \Delta V_{GS}$ + noise1 + noise2

Or transistor difference value = avg of first mismatch value and second mismatch value =

$\Delta V_{GS}$ + (noise1 + noise2)/2

In this way, any measurement inaccuracies caused by a mismatch between the first and second current sources 232 and 234 may be eliminated without appreciably increasing the signal to noise ratio. It will be appreciated that the chop circuit 236 is optional and the determination unit 170 may be configured to determine the transistor difference value from a single comparison of the gate-source voltages, for example if the first and second current sources are considered to be matched to a sufficiently high accuracy.

Furthermore, optionally, a further chop circuit 240 may be provided at the input to the ADC 250. This may operate similarly to the chop circuit 236, and at the same time as the chop circuit 236, in order to switch the coupling of differential inputs to a comparator in the ADC 250. In this case however, the sign of the $\Delta V_{GS}$ component in the first transistor comparison value will be different from the sign of the $\Delta V_{GS}$ component in the second transistor comparison value as a result of switching the inputs to the comparator in the ADC 250. For example, in the case where both chop circuit 236 and 240 are used:

First transistor mismatch value = $\Delta V_{GS}$ + mismatch + offset + noise1

Second transistor mismatch value = $-\Delta V_{GS}$ + mismatch + offset + noise 2 where offset is the offset of the ADC 250.

In this case, the transistor difference value may be determined by taking the difference of the first transistor comparison value and the second transistor comparison value. For example:

transistor difference value = first mismatch value − second mismatch value = $2 * \Delta V_{GS}$ + noise1 − noise2

Using the chop circuit 236 in this way may help to cancel any offset in the ADC 250 and well as any mismatch between the first and second current sources 232 and 234.

Furthermore, the $\Delta V_{GS}$ component has increased by 2× and low frequency components of noise1 and noise2 should mostly cancel each other out. However, it will be appreciated that the chop circuit 240 is optional, depending on the configuration of the ADC 250 and the quality of components making up the ADC 250. Furthermore, the determination unit 170 may not comprise an ADC 250, but may instead determine the transistor difference value using any other suitable circuitry, for example analog only circuitry.

The chop circuit 236 and further chop circuit 240 may be configured in any suitable way to perform the switching/chopping functionality described above. For example, they may each comprise one or more switches that can be controlled (for example, by a control unit not represented in FIG. 2) to switch/chop the couplings as described above.

The transistor difference value is indicative of which of the transistors in the matched pair of transistors 210 has the larger/smaller $V_{GS}$ and the magnitude of the difference. For example, it may be a positive number of a magnitude indicative of the amount by which the $V_{GS}$ of the first transistor is larger than the $V_{GS}$ of the second transistor, and may be a negative number of a magnitude indicative of the amount by which the $V_{GS}$ of the first transistor is smaller than the $V_{GS}$ of the second transistor.

Turning to FIG. 3A, a plurality of PUF cells 105$_{x,y}$ are represented, where x=1, 2, . . . , X−1, X and y=1, 2, . . . , Y−1, Y, such that the overall number of PUF cells 105$_{x,y}$ totals X*Y. The PUF cells 105$_{x,y}$ in this example are arranged in an array comprising X columns and Y rows. The selector circuit 220 has Y outputs, one for each row of the array and it can be seen that each output is coupled to the gates of all of the matched transistor pairs 210$_{x,y}$ in a particular row (for example, the first output is coupled to transistor pairs 210$_{x,1}$, the second output is coupled to transistor pairs 210$_{x,2}$, etc). In order to select a particular row of PUF cells 105$_{x,y}$, the selector circuit 210 applies a selection potential to that row (for example, a potential that exceeds the turn-on threshold voltage of the transistors) in order to turn on the matched transistor pairs 210$_{x,y}$ in that row. A non-selection potential is applied to all other rows (for example, a potential that is less than the turn-on threshold voltage of the transistors). Thus, it can be seen that in this example, each matched transistor pair 210$_{x,y}$ is not only used for determining a transistor difference value, it is also used as a selection mechanism for its PUF cell 105$_{x,y}$. By using each matched pair of transistors 210$_{x,y}$ for both of these purposes, the size of the PUF cell array may be reduced compared with an array that includes a pair of transistors to be used for the determination of a PUF value, and one or more further transistors to be used to select a PUF cell.

It can also be seen that the determination unit 170 comprises X first and second current sources 232$_x$ and 234$_x$, X chop circuits 236$_x$, X further chop circuits 240$_x$ and X ADCs 250$_x$. Consequently, it is possible to determine, in parallel, transistor difference values for the X pairs of transistors 210$_{x,y}$ in a selected row, thereby increasing the speed of operation. Furthermore, each set of first and second current sources 232$_x$ and 234$_x$, chop circuit 236$_x$, further chop circuit 240$_x$ and ADC 250$_x$ may be shared by a column of the PUF array, thereby reducing the number of components required and thus the overall size, cost and power consumption of the PUF apparatus 100.

The determination unit 170 represented in FIG. 3A also comprises a PUF output unit 310 that either: a) receives the determined transistor difference value from each ADC 250$_x$, or b) receives the determined first and second transistor comparison values from each ADC$_x$ and then determines the transistor difference value based on the first and second transistor comparison values (for example, by averaging them).

The determination unit 170 may operate by selecting one row of PUF cells 105$_{x,y}$ and determining a transistor difference value for each selected PUF cell. Subsequently, the next row of PUF cells 105$_{x,y}$ may be selected and transistor difference values determined for them. The operation of the selector circuit 220, chop circuits 236$_x$ and further chop circuits 240$_x$ may be controlled in any suitable way, for example by the PUF output unit 310 or any other suitable controller. Control interconnections are not represented in FIG. 3A for the sake of simplicity.

Figure 3B:
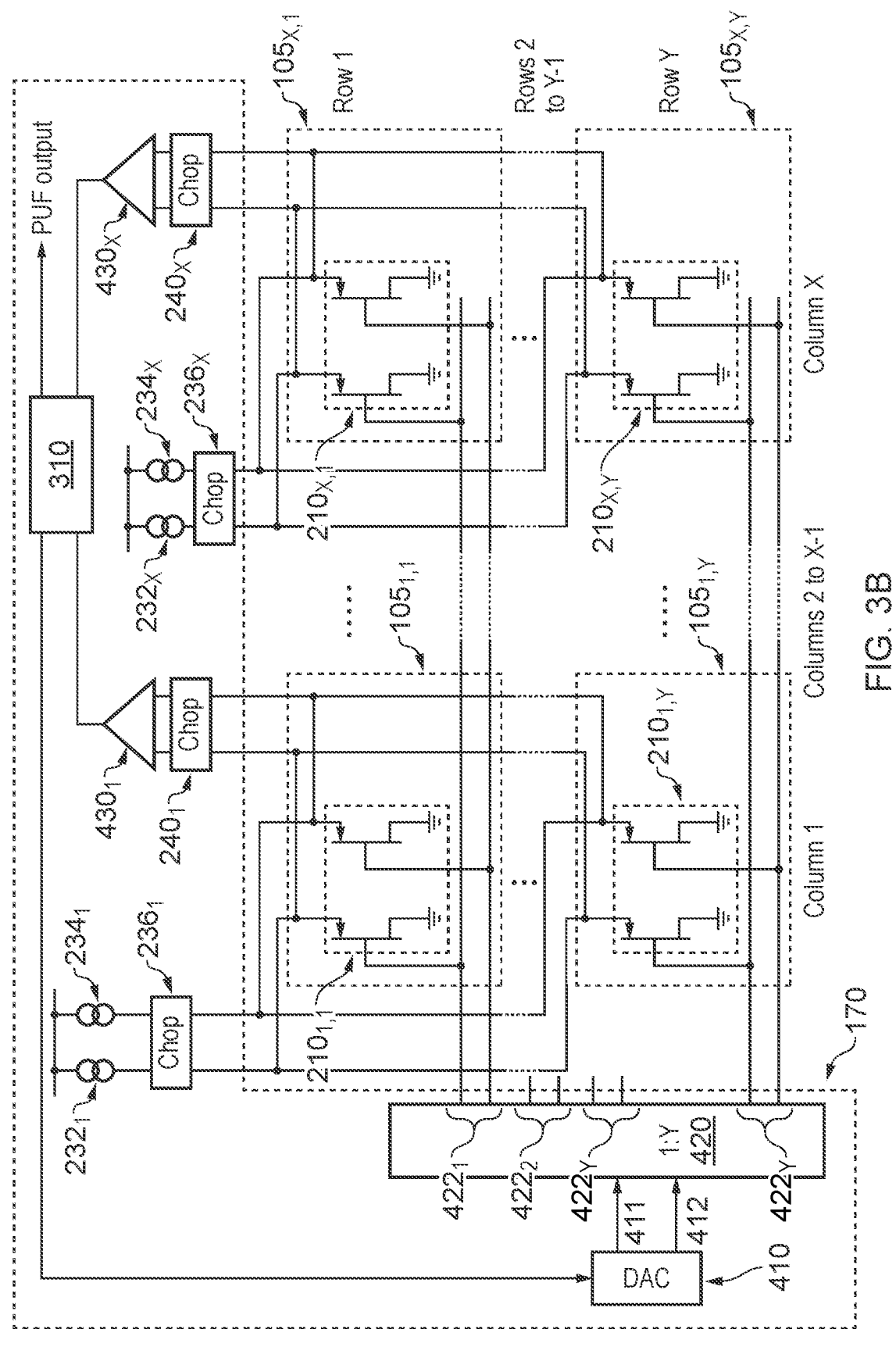
Figure 6:
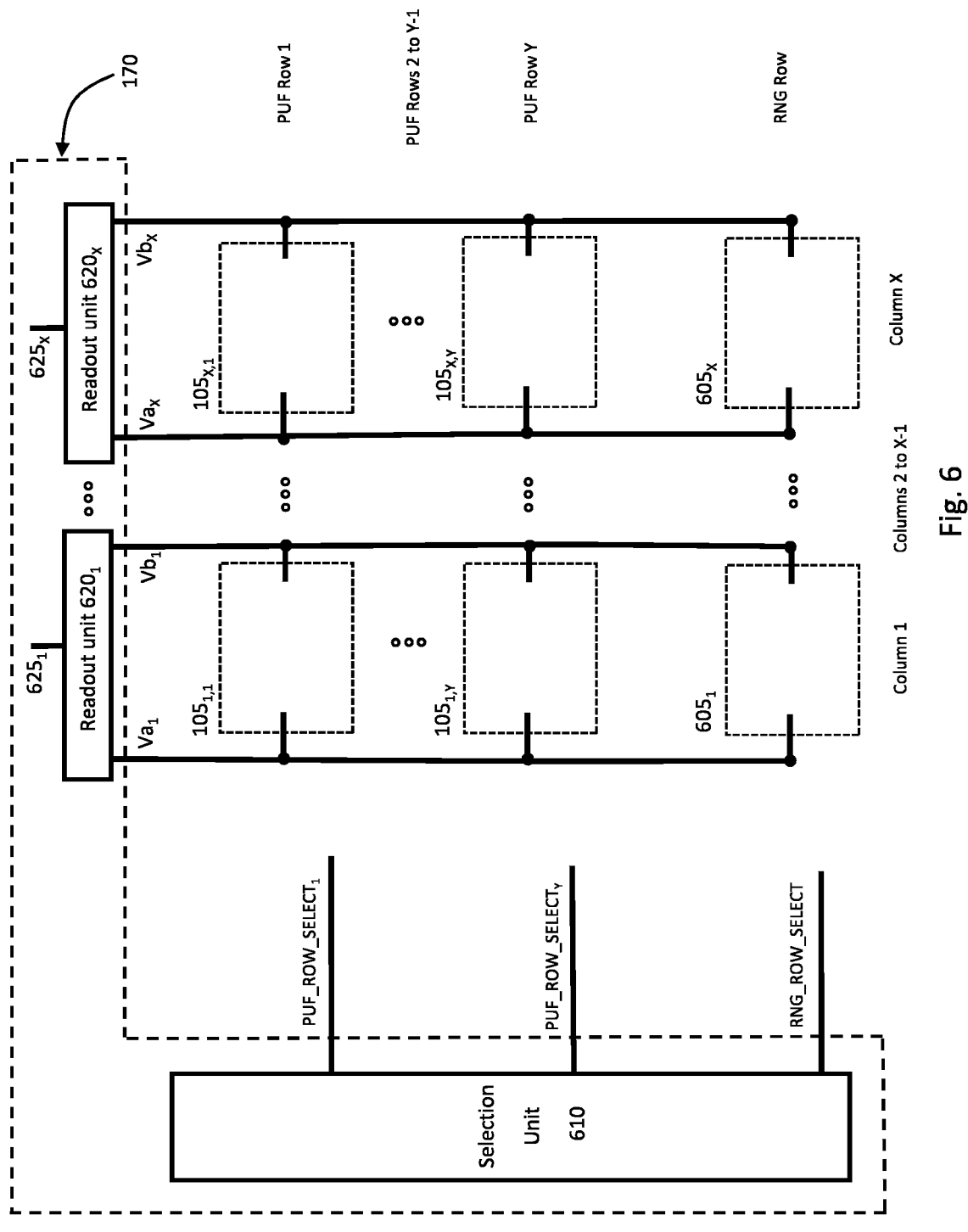
FIG. 6 shows a schematic representation of a further example PUF apparatus/system in accordance with an aspect of the present disclosure.

FIG. 3B (which is reproduced from FIG. 6 of U.S. patent application Ser. No. 16/296,998) shows a schematic diagram of an alternative configuration of an array of PUF cells 105$_{x,y}$ and a determination unit 170. A detailed explanation of the operation of the circuit is given between line 5, page 18, to line 23, page 23, of U.S. Ser. No. 16/296,998 and will not be repeated herein for the sake of efficiency. However, it will be appreciated that FIG. 3B should a further example representation of how the PUF apparatus 100 may be implemented in such a way that parallel measuring of the physical characteristic of a plurality of PUF cells 105$_{x,y}$, and parallel readout of a plurality of PUF cells 105$_{x,y}$, may be achieved.

The PUF output determined by the PUF output unit 310 is a persistent random number that may be, for example, a multi-bit number. This is explained in more detail later in the "Configuration" and "Readout" sections. However, in summary, the measured transistor difference value of a particular PUF cell may be used to set the value (i.e., "0" or "1") of one or more bits of the multi-bit PUF output. Since the outcome of each transistor comparison is dependent on random manufacturing differences between the matched pair of transistors 210$_{x,y}$, it can be seen that the PUF output should be random, in that each different instance of PUF apparatus 100 is highly likely to generate a randomly different PUF output.

In a further example implementation, each PUF cell 105$_{x,y}$ may comprise a pair of capacitors and the determination unit 170 may be configured to determine a PUF output based on a difference between a physical characteristic (such as the capacitance) of the capacitors that is caused by random manufacturing differences. Various example implementations of the PUF apparatus/system 100 where PUF cells 105$_{x,y}$ each comprise a matched pair of capacitors are given in U.S. patent application Ser. No. 16/716,435 (the '435 application), which is incorporated herein by reference in its entirety. Various example implementations are disclosed between FIG. 2A to 6B and between line 10, page 10, to line 31, page 22 of the '435 application as filed, some of which is reproduced in part below.

Figure 4A:
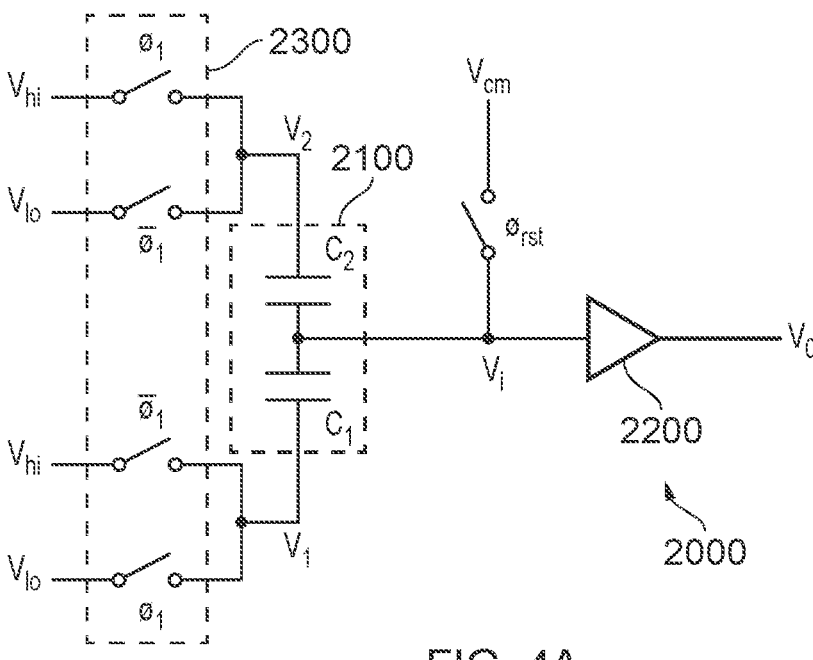
FIGS. 4A to 4C show an example schematic circuits and operation timing diagrams for capacitor based PUF cells.

FIG. 4A (which is reproduced from FIG. 2A of U.S. patent application Ser. No. 16/716,435) shows a schematic diagram of a circuit for determining a capacitor difference value indicative of a random manufacturing difference between a pair of capacitors 2100.

Figure 4B:
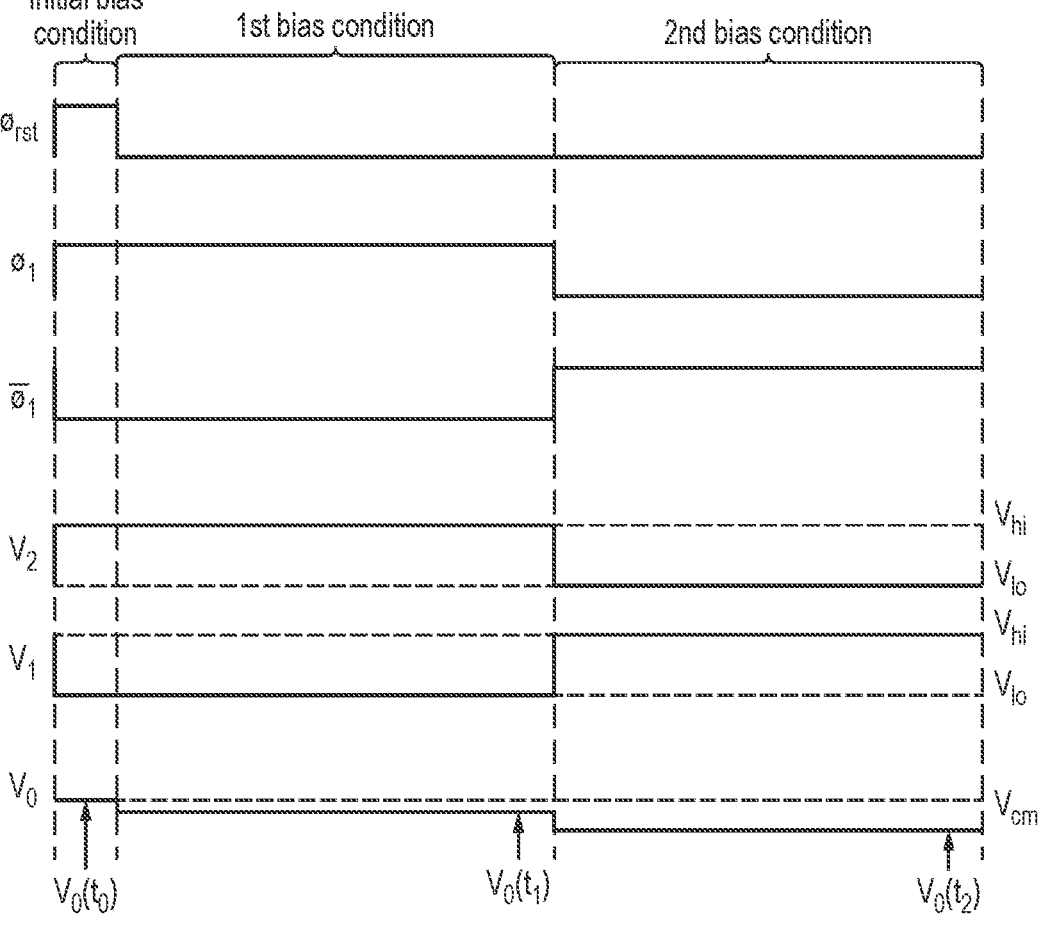
Figure 4C:
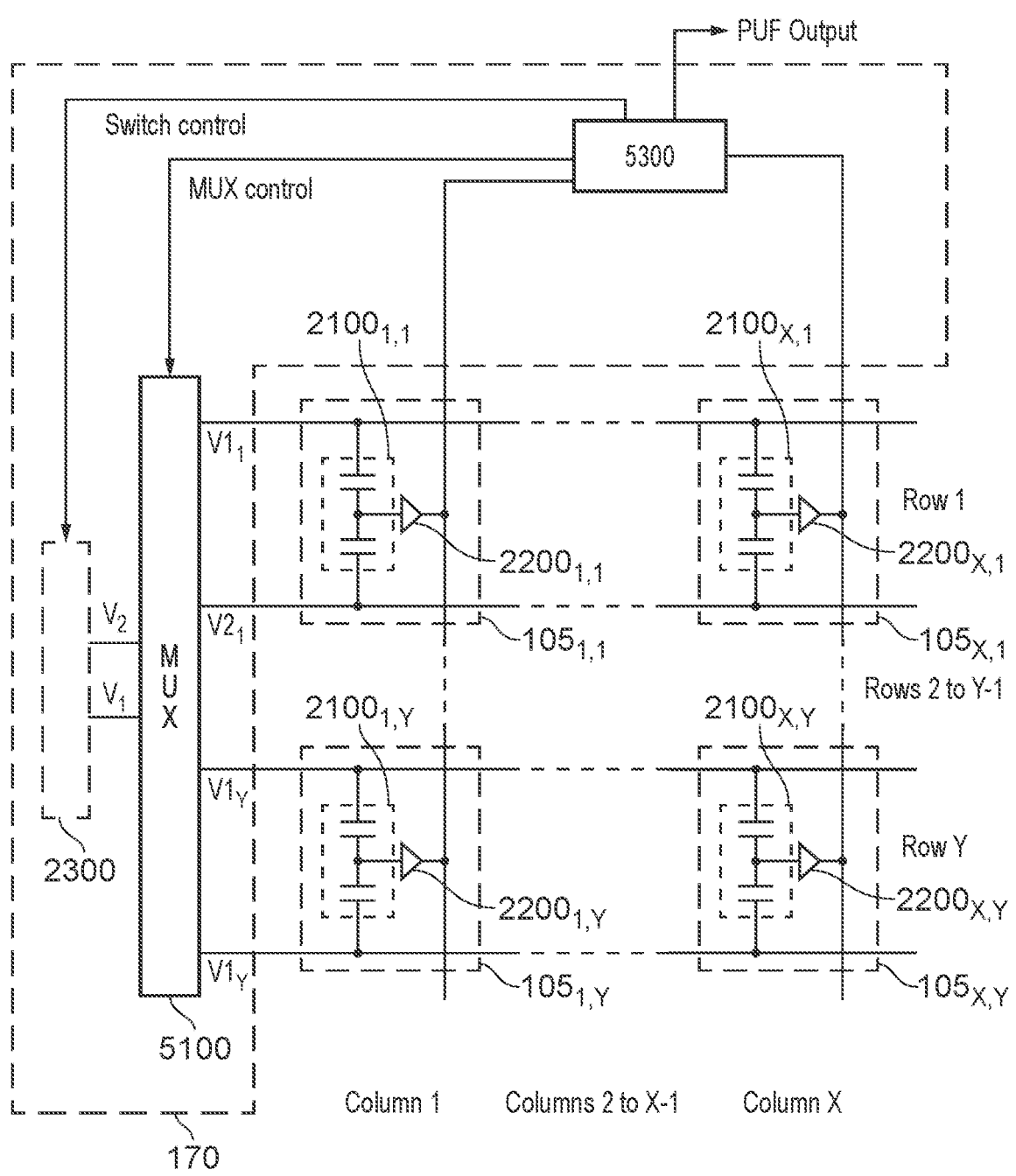

FIG. 4C (which is reproduced from FIG. 3 of U.S. patent application Ser. No. 16/296,998) shows a schematic diagram of an array of PUF cells 105$_{x,y}$ that are each configured in the same way as the PUF cell 105 represented in FIG. 4A.

Returning to FIG. 4A, each PUF cell 105$_{x,y}$ may comprise a pair of capacitors 2100$_{x,y}$, such that each PUF cell 105$_{x,y}$ may be used to generate a corresponding capacitor difference value, based on which a persistent random PUF value for the PUF cell 105$_{x,y}$ can be determined (similarly to the above description with reference to FIG. 3A). The PUF output can then be determined from a plurality of persistent random PUF values determined from a plurality of PUF cells 105$_{x,y}$. However, for the sake of simplicity, the determination of a capacitor difference value from a single pair of capacitors 2100 shall be described below.

The pair of capacitors 2100 may be a matched pair of capacitors, or they may be different capacitors. The term 'matched' in this disclosure means that the pair of capacitors are of identical design. Whilst the two capacitors making up the matched pair of capacitors 2100 are of identical design, in practice there will inevitably be small, random manufacturing variations between the two capacitors. Those manufacturing variations may include at least one of: differences in distance between the capacitor plates (for example, caused by differences in dielectric thickness), differences in the area of overlap of the two plates, differences in dielectric constant, etc. These manufacturing variations result in variations in capacitance between the two capacitors making up the matched pair of capacitors 2100. Whilst the below description will focus on a matched pair of capacitors 2100 for simplicity, it should be appreciated that in an alternative the two capacitors 2100 may be of different design. In this case, there will be some expected difference between their capacitances, on top of which random manufacturing differences should introduce some random variation around the expected difference. Consequently, the capacitor difference value that is determined according to the processes described below may perform the same function as when the capacitors are matched, but with an offset applied to the random variation, that offset being equal to the design difference in capacitance of the two capacitors.

The circuit of FIG. 4A comprises a switch bank 2300 that may be used to set bias conditions for determining the capacitor difference value indicative of the random manufacturing difference between the first capacitor $C_1$ and the second capacitor $C_2$. The first capacitor $C_1$ and the second capacitor $C_2$ are arranged as a capacitor divider, wherein the two capacitors share a common node, or centre tap. The circuit further comprises a buffer 2200 for buffering the signal at the common node between the first capacitor $C_1$ and the second capacitor $C_2$. The buffer may be any suitable type of voltage buffer (for example a source follower, a simple operational amplifier, etc) that is configured to output a voltage $V_o$, or current, that is indicative of the voltage $V_i$ at the common node or centre tap of the capacitor divider. Each of the switches in the circuit may be implemented by any suitable type of controllable switch, for example each switch may be implemented by a transistor such as a FET or a bipolar transistor. The state of each switch may be controlled by a controller that is not represented in FIG. 4A for the sake of simplicity.

FIG. 4B (which is reproduced from FIG. 2B of U.S. patent application Ser. No. 16/716,435) shows an example timing diagram of the operation of the circuit of FIG. 4A. The timing diagram in FIG. 4B represents timings of switch control signals Ø1, $\overline{Ø1}$ and Ø$_{rst}$, and the relative voltages $V_1$, $V_2$ and $V_o$. Initially, an initial bias condition is set, where Ø$_{rst}$ closes the reset switch so that a common mode voltage $V_{cm}$ (an initialisation voltage, which may be at any suitable voltage level, for example in consideration of the components in the circuit, such as which buffer 2200 is used, etc) is applied to the common node or centre tap of the two capacitors. During the initial bias condition, the voltage of $V_2$ is held relatively high ($V_{hi}$) and the voltage of $V_1$ is held relatively low ($V_{lo}$). $V_{hi}$ and $V_{lo}$ may be set to any suitable size, for example depending on the size and type of capacitors used. The output voltage at a time $t_0$ during the initial bias condition may be expressed as:

$$V_o(t_0) = V_{cm} + V_{off} + V_n(t_0)$$

where $V_{off}$ is the offset of readout, caused by any inherent offset in the buffer 2200, and $V_n(t_0)$ is the random readout noise at time $t_0$.

A first bias condition is then set by opening the reset switch such that the common node is no longer held at $V_{cm}$. This means that a first bias voltage $V_{hi}$–$V_{lo}$ is applied across the pair of capacitors 2100 without the common node or centre tap being held to any particular potential. The first bias condition thereby sets a corresponding first charge distribution between the two capacitors. In the timing diagram of FIG. 4B, a change in $V_o$ is represented when the bias condition changes from the initial condition to the first condition. This change is a result of charge injection and capacitive coupling of the reset switch. The output voltage at a time $t_1$ during the first bias condition may be expressed as:

$$V_o(t_1) = V_{cm} + V_{off} + V_{ci} + V_{ktc} + V_n(t_1)$$

where $V_{ci}$ is the charge injection from the rst switch caused by the switch opening, $V_n(t_1)$ is the random readout noise at time $t_1$ and $V_{ktc}$ is sampled KTC noise from the two capacitors. The value $V_o(t_1)$ shall be referred to as a first nodal measurement that is indicative of a voltage at the common node of the capacitor divider 2100 during the first bias condition.

A second bias condition is then set by applying the first bias voltage across the pair of capacitors 2100 in the opposite direction, such that the voltage across the pair of capacitors 2100 is $-(V_{hi}$–$V_{lo})$. This is achieved by controlling the switch bank 2300 to apply $V_{lo}$ to $V_2$ and apply $V_{hi}$ to $V_1$. In the timing diagram of FIG. 4B, a change in $V_o$ can be seen when the bias condition changes from the first condition to the second condition, which is caused by a redistribution of charge between the first capacitor and the second capacitor. $V_o$ is represented as decreasing when the second bias condition is applied, which is a result of the capacitance of $C_2$ being greater than that of $C_1$. If, however, the capacitance of $C_1$ were greater than that of $C_2$, $V_o$ would instead increase when the second bias condition is applied. The output voltage at a time $t_2$ during the second bias condition may be expressed as:

$$V_o(t_2) = V_{cm} + V_{off} + V_{ci} + V_{ktc} + V_n(t_2) + ((C_1 - C_2)/(C_1 + C_2)) * (V_{hi} - V_{lo})$$

The value $V_o(t_2)$ shall be referred to as a second nodal measurement that is indicative of a voltage at the common node of the capacitor divider 2100 during the first bias condition.

Because the pair of capacitors are matched, by design their capacitance is $C_1 = C_2 = C$. However, in practice, there is a small, random difference in their capacitance, such that $C_1 - C_2 = dC$. Therefore, we can express the actual capacitance of $C_1$ and $C_2$ as:

$$C_1 = C + dC/2$$
$$C_2 = C - dC/2$$

Substituting this into the equation above, we arrive at:

$$V_o(t_2) = V_{cm} + V_{off} + V_{ci} + V_{ktc} + V_n(t_2) + (dC/2C) * (V_{hi} - V_{lo})$$

Whilst $V_o(t_2)$ is a function of the random manufacturing difference (dC) between the capacitors, it is also affected by a number of different sources of noise. Consequently, $V_o(t_2)$ may not be a reliable indicator of the random manufacturing difference, particularly considering that dC may be very small and therefore susceptible to being lost in noise.

However, by taking the difference of $V_o(t_2)$–$V_o(t_1)$, we arrive at:

$$V_o(t_2) - V_o(t_1) = (dC/2C) * (V_{hi} - V_{lo}) + V_n(t_2) - V_n(t_1)$$

By taking the difference in this way, ktc noise $V_{ktc}$, the offset $V_{off}$, the charge injection signal $V_{ci}$, and the common mode signal, $V_{cm}$, are all cancelled out. Furthermore, any low frequency components in the readout noise $V_n(to)$ and $V_n(t_1)$ should also substantially cancel. Therefore, by measuring $V_o$ under both first and second bias conditions and then finding the difference, a more accurate measure of the random manufacturing difference between the two capacitors $C_1$ and $C_2$ can be found. The difference between $V_o(t_2)$ and $V_o(t_1)$ may be referred to as the capacitor difference value, that is indicative of a random manufacturing difference between the pair of capacitors 2100. This more accurate measure can then be used to determine a persistent random PUF value, based on which the PUF output can be determined, for example setting the value of one bit in a multi-bit PUF output, as explained in more detail below in the "Configuration" and "Readout" sections.

For example, the size of the capacitor difference value ($V_o(t_2)$–$V_o(t_1)$) of a particular PUF cell 105$_{x,y}$ may be used to set a persistent random PUF value (e.g., to "0" or "1"), which then acts as one or more bits of the multi-bit PUF output. Since the capacitor difference value $V_o(t_2)$–$V_o(t_1)$ has been determined in a way that maximises the accuracy of measurement of dC by eliminating almost all noise, the value of the PUF output is determined almost exclusively by the random manufacturing difference. This should result in the value of the PUF output being sufficiently random to meet PUF requirements.

Turning to FIG. 4C, the determination unit 170 comprises a MUX 5100, a PUF output unit 5300 and the switch bank 2300. The PUF output unit 5300 is configured to control the switch bank 2300 and the MUX 5100 so as to apply voltages $V_{hi}$ and $V_{lo}$ to a particular row of PUF cells and apply a deselection voltage to all other rows of PUF cells. By doing so, it will be appreciated that, in parallel, the physical characteristic of the plurality of PUF cells in the selected row may be measured. Consequently, very fast measurement and readout may be achieved.

In a further example implementation, each PUF cell 105$_{x,y}$ may comprise resistors and the determination unit 170 may be configured to determine a PUF output based on a difference between a physical characteristic (such as the resistance) of the resistors that is caused by random manufacturing differences.

Figure 5A:
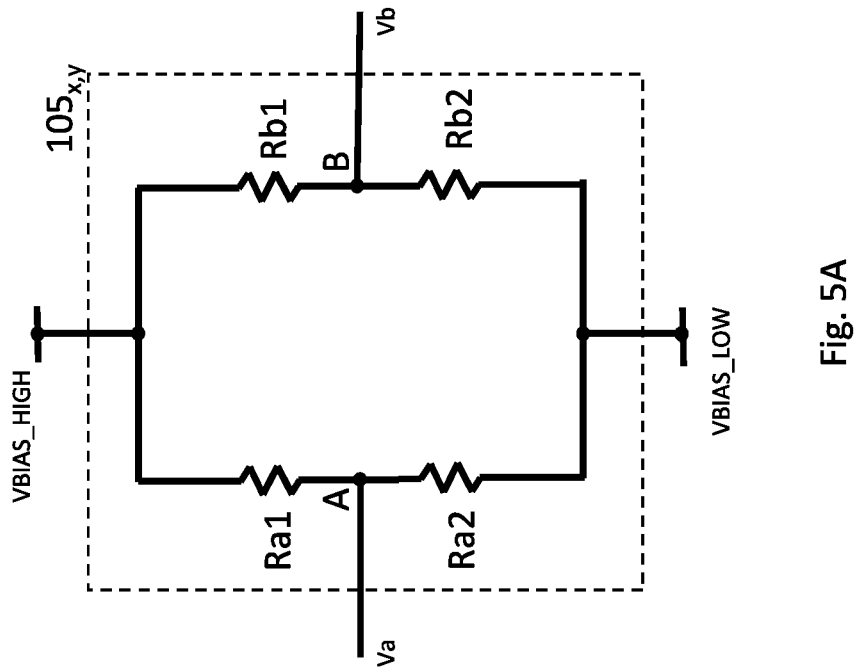
FIGS. 5A and 5B show example schematic circuits for resistor based PUF cells.

FIG. 5A shows an example PUF cell $105x,y$ comprising resistors. In this case, the pair of devices in the PUF cell are not a pair of single component devices (as is the case in FIGS. 3 and 4 above), but a pair of composite devices. Each device making up the pair of devices is a potential divider, and the two potential dividers are coupled together to form an H-bridge formation wherein the divider ratio of each of the potential dividers is matched (i.e., the design ratio of Ra1:Ra2 is the same as the design ratio of Rb1:Rb2). The design resistance of resistors Ra1, Ra2, Rb1 and Rb2 may all be the same (i.e., they may all be matched resistors). Alternatively, Ra1 and Rb1 may have the same design resistance as each other (i.e., they may be matched resistors), and Ra2 and Rb2 may have the same design resistance as each other (i.e., they may be matched resistors). Alternatively, each of Ra1, Ra2, Rb1 and Rb2 may have different design resistances, but with the two potential dividers having the same design impedance ratio, i.e. Ra1:Ra2=Rb1: Rb2. In each example, the two devices (e.g., the two potential dividers) are matched in that they both have the same design impedance ratio and should therefore, in theory, output the same divided voltage as each other (i.e., in theory Va should equal Vb). However, it will be appreciated that owing to manufacturing variances, the actual resistance of a resistor will be at least slightly different to the design resistance. Consequently, the voltage at measurement point A is likely to be different to the voltage at measurement point B by a random amount for each of the identical PUF cells $105_{x,y}$.

Figure 5B:
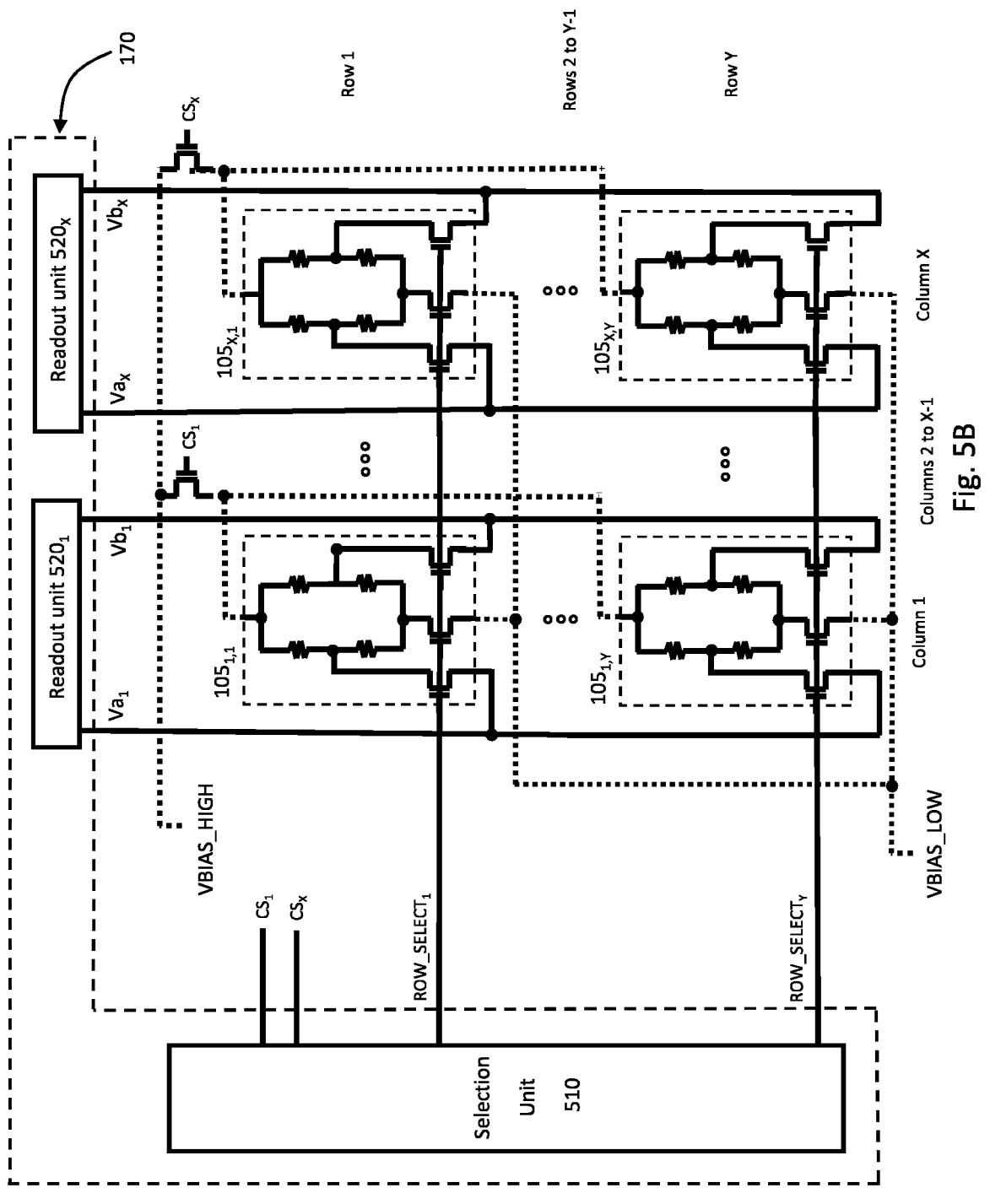

FIG. 5B shows a non-limiting example implementation of the determination unit 170 configured to select and readout one or more PUF cells $105_{x,y}$ of the type represented in FIG. 5A. The determination unit 170 comprises a selection unit 510 that is configured to enable one or more columns of PUF cells using control signals $CS_1$ to $CS_x$ to selectively apply a bias or stimulation voltage VBIAS_HIGH to VBIAS_LOW across the H-bridge in PUF cells within the enabled column (s). The selection unit 510 is further configured to use the control signals $ROW\_SELECT_1$ to $ROW\_SELECT_y$ to select one or more of the enabled PUF cells $105_{x,y}$ for readout. The determination unit 170 further comprises readout units $520_1$ to $520_x$ configured to determine a difference between Va and Vb of the selected PUF cell(s). Various techniques for the determination unit 170 to determine the difference between Va and Vb, most particularly to measure a sign and magnitude of the difference between Va and Vb, are disclosed below.

In the above, a number of particular examples have been disclosed for types of PUF cell using which a physical characteristic may be determined for the purpose of determining a PUF value (the physical characteristic being, for example, a difference in resistance, capacitance, turn-on threshold voltage, etc between a pair of matched devices). However, it will be appreciated that there are many other types of PUF cell that are possible and this disclosure is not limited to any particular type of PUF cell. For example, each PUF cell could comprise a pair of devices where each device is a single active or passive component, such as a pair of transistors or capacitors, or each PUF cell could comprise a pair of devices where each device is a more complex composite device that comprises a plurality of components, such as a pair of ring oscillators, or a pair of potential dividers, etc). It will be appreciated that the present disclosure is not limited to any particular implementation of PUF cell and may be applied to any implementation where a physical characteristic, indicative of a random manufacturing variation between a pair of devices, may be used to determine a persistent random PUF value. The present disclosure focusses particularly on techniques for determining the random manufacturing variation between the pair of devices by measuring one or more voltages that are indicative of the difference (in most instances 'measuring' is the determination of both the sign of the voltage and the magnitude, but in some instances it may simply be the determination of the sign of the voltage).

FIG. 6 shows an example PUF apparatus in accordance with an aspect of the present disclosure. The apparatus comprises a plurality of PUF cells $105_{x,y}$, as described above. The apparatus also comprises a row of RNG cells $605_x$, which are described in more detail later. The inclusion of RNG cells is optional and is included in FIG. 6 to show how the readout units $620_x$ may be used for measuring voltages output by RNG cells $605_x$ as well as voltages output by PUF cells $105_{x,y}$. In some implementations the RNG cells may be omitted entirely. In other implementations, two or more rows of RNG cells may be included.

The determination unit 170 comprises a selection unit 610 configured to select a particular row of PUF cells $105_{x,y}$ or the row of RNG cells $620_x$ for readout using the PUF_ROW-_SELECT lines and the RNG_ROW_SELECT line. The configuration of the selection unit 610 and the connections of the ROW_SELECT lines may be dependent on the particular design and configuration of the PUF cells and RNG cells, and so details are not represented in FIG. 6 for the sake of simplicity. The selection unit 610 and the way in which rows may be selected are not the focus of this disclosure and so shall not be described in any further detail. However, some non-limiting examples are given in FIGS. 2, 3A, 3B, 4A-4C and 5B above.

The determination unit 170 also comprises a readout unit $620_x$ for each column of PUF/RNG cells. Each readout unit is coupled to the readout lines of its corresponding column. For example, readout unit 6201 is coupled to the differential readout lines carrying voltages $Va_1$ and $Vb_1$ and readout unit $620_x$ is coupled to the differential readout lines carrying voltages $Va_x$ and $Vb_x$. FIGS. 2, 3A and 3B show examples of such differential readout lines, wherein the differential voltage Va−Vb (or Vb−Va) output from a selected PUF cell onto the readout line is indicative of the random manufacturing difference within the selected PUF cell. Each readout unit $620_x$ is configured to output a measure $625_x$ of the differential voltage $Va_x$−$Vb_x$ that it receives. In the configuration represented in FIG. 6, parallel readout is possible in that the selection unit 610 can select a row of PUF cells or RNG cells, and a plurality of measurements $625_x$ for the corresponding plurality of selected PUF cells or RNG cells may be determined in parallel by the readout units $620_x$. In an alternative, a single readout unit may be provided for two or more columns of PUF/RNG cells, with a multiplexer choosing which of the selected cells will be readout by the readout unit. The measure $625_x$ output from each readout unit $620_x$ may take a number of different forms depending on the configuration of the readout unit $620_x$ and the way in which the measure $625_x$ is to be used in determining a PUF value or a dynamic random number. For example, the measure $625_x$ may be indicative only of a sign of Va−Vb (or Vb−Va), for example whether it is a positive value or a negative value, or it may be indicative of a sign and magnitude of Va−Vb (or Vb−Va). The present disclosure focuses particularly of different implementations of the readout unit $620_x$ and the ways in which the output measure $625_x$ may subsequently be used.

As explained in detail below, the PUF apparatus 100, particularly the determination unit 170, may be operated in any one or more different modes. For example, it may be configured to be able to switch operation between two or more different modes. These modes may include PUF modes where PUF values are determined based on random manufacturing differences between matched pairs of devices, such as PUF coarse-measurement mode and/or PUF fine-measurement mode. Additionally or alternatively, these modes may include PUF self-checking mode and/or dynamic random number mode.

Physical Unclonable Function mode

Figure 7:
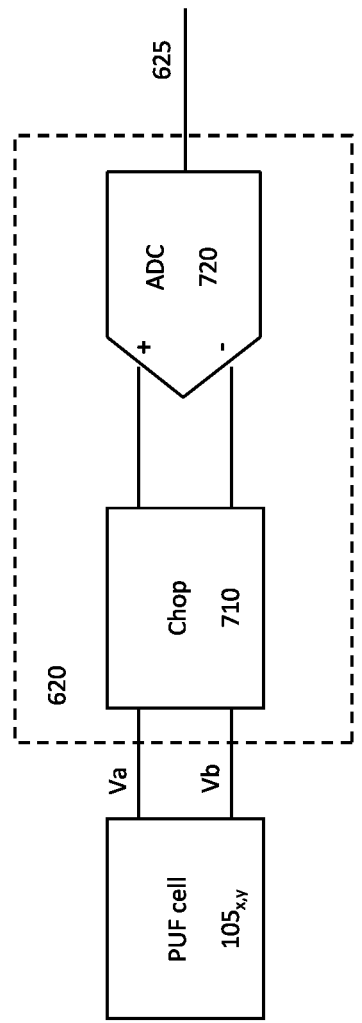
FIG. 7 shows an example implementation of a readout unit of the PUF apparatus/system of FIG. 6.

FIG. 7 shows an example implementation of a readout unit 620 comprising a chop 710 and ADC 720. The chop 710 may be configured in any suitable way that will be well understood by the skilled person to controllably chop, or switch, the inputs to the ADC 720. In particular, the chop 710 may couple Va to the positive input "+" of the ADC 720 and couple Vb to the negative input "−" of the ADC 720 for an analog to digital conversion of the signal Va−Vb. The chop 710 may then be controlled to chop or switch the coupling such that Va is coupled to the negative input "−" of the ADC 720 and Vb is coupled to the positive input "+" of the ADC 720 for an analog to digital conversion of the signal Vb−Va. The benefits of doing so are explained in more detail below.

The readout unit 620 may be configured in a number of different ways depending on whether it is intended to be used only for reading out PUF cells, or only for reading out RNG cells, or to be used for reading out PUF cells and RNG cells. Furthermore, it may be configured to generate a multi-bit digital word as the output measure 625 (indicative of the sign and magnitude of Va−Vb), or generate a single-bit value as the output measure 625 (indicative only of the sign of Va−Vb), or be controllable to output either a multi-bit word or single-bit value depending on the desired operation of the readout unit 620. Each of these possibilities will be described in more detail below.

When configured to generate a multi-bit digital word in order to determine the sign and magnitude of Va−Vb, using the chop 710 and performing two digital conversions may help to improve the accuracy of the measurement. In particular, it may help to reduce systematic offset and delay errors that may be introduced by components within the selection unit 610, the PUF cell $105_{x,y}$, and/or the readout unit 620. For example, switches in those units may cause charge injection mismatch in the signals of Va and Vb, causing a degree of mismatch between Va and Vb that is not the result of random manufacturing differences of the pair of devices within the PUF cell $105_{x,y}$. Additionally or alternatively, any amplifiers within the readout unit 620 (for example within the ADC 720) may have an inherent offset between their inputs, and/or any comparators within the readout unit 620 (for example within the ADC 720) may have comparator delays and/or offsets. All of these factors may together be classified as "systematic errors" that stay substantially the same for each digital conversion.

A first digital conversion of Va−Vb may be expressed as:

$$D1 \left(<x:0>\right) = DeltaPUF + \text{systematic errors} + noise1$$

DeltaPUF is the component of Va−Vb that is caused by the random manufacturing difference between the pair of devices in the PUF cell. Noise1 includes, for example, thermal noise and 1/f noise.

Between the first digital conversion and a second digital conversion, the chop 710 may be controlled to chop/switch the inputs to the ADC 720 such that the second digital conversion is of the signal Vb−Va. The second digital conversion of Vb−Va may be expressed as:

$$D2 \left(<x:0>\right) = -DeltaPUF + \text{systematic errors} + noise2$$

D2 includes the value −Delta PUF because Delta PUF is defined as the component of Va−Vb caused by the random manufacturing difference. Because of the chop, the ADC 720 is converting Vb−Va, such that D2 represents the value −DeltaPUF (+the other components shown above).

By then finding D1−D2 we arrived at:

$$D1 - D2 = 2 * DeltaPUF + (noise1 - noise2)$$

In this case, the output measure 625 may be the value D1−D2. As explained later, readout unit 620 may be configured to store D1 after the first conversion, for example in memory (not represented in the figure for simplicity), or it may be configured to hold D1 in some other way (explained later), so that D2 can subsequently be subtracted from D1 to arrive at the output measure 625.

As can be seen, the systematic errors are substantially or entirely removed. There is a noise trade off in that thermal noise increases by $\sqrt{2}$ but 1/f noise is significantly reduced. Overall, signal to noise ratio of D1−D2 is increased by 2/2 compared with just D1 or D2.

Consequently, it can be seen that by performing two conversions with a chop between the two, the accuracy of the output measure 625 may be significantly improved. This means that any PUF value subsequently determined using the output measure 625 may be more random in that various potential inherent biases are reduced or removed, and that random value may be regenerated more consistently over time, making the PUF value more persistent.

PUF Fine-Measurement Mode

Figure 8A:
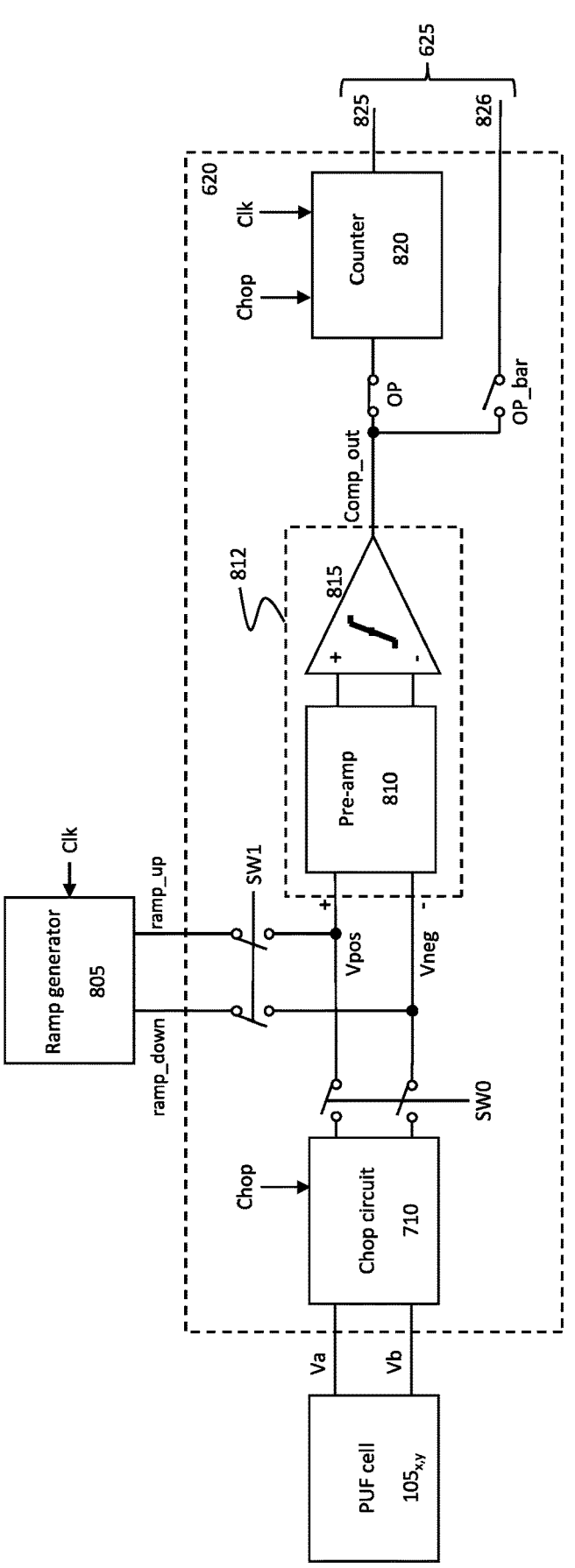
FIGS. 8A and 8B show a further example implementation and operation of a readout unit of the PUF apparatus/system of FIG. 6.

FIG. 8A shows one non-limiting example of how the readout unit 620 of FIG. 6 may be implemented. In this example, the ADC 720 is a ramp-ADC (sometimes also referred to as a slope ADC) that is made up of a ramp generator 805 (sometimes also referred to as a slope generator) that is part of the PUF apparatus 100 (for example, part of the determination unit 170, a comparator 812 that comprises a pre-amp 810 and a regenerative or latching comparison stage 815 and a counter 820. The comparator 812 may be an auto-zeroed comparator, as described later, or an otherwise sampling comparator. The ramp generator 805 is configured to generate two ramp signals—a first (ramp_up) that ramps up over time from a lower value to a higher value, and a second (ramp_down) that ramps down over time from the higher value to the lower value. The ramp generator 805 may be implemented in any suitable way that will be well understood by the skilled person. It may be a single unit that generates both the ramp_up and ramp_down signals, or a separate ramp generator may be used to generate each ramp signal. In one non-limiting example, the ramp generator 805 may be a DAC ramp generator that comprises a digital to analog converter, DAC, configured to receive a multi-bit binary count value, which is converted to the two analog ramp signals. The "higher value" referred to above may be the maximum DAC output voltage and the "lower value" may be the minimum DAC output voltage.

The pre-amp 810 may be any suitable type of differential amplifier, which will be well understood by the skilled person. One particular example is described in more detail below with reference to FIG. 9A. The pre-amp 810 may be a single-stage amplifier or a multi-stage amplifier. Furthermore, the pre-amp 810 may optionally include an autozero function, as described in more detail below with reference to FIG. 9A. There are benefits to using an auto-zeroed pre-amp 810, although it is not essential and the readout unit 620 can operate without it.

The comparison stage 815 may be ay suitable stage (for example, an op amp) that compares the two voltages at its input and sets the output to a value (e.g., high or low that indicates which is larger, which will be well understood by the skilled person. It may be a fully differential comparison stage 815 and output a differential signal, or it may be configured to output a single ended signal. For example, if it is fully differential, it may be configured to output a differential signal of 1 or –1, depending on the comparison of the signals at the inputs. A single-ended output may be configured to output a signal of 1 or 0 (alternatively 1 or –1), depending on the comparison of the signals at the inputs. In one non-limiting example, the comparison stage 815 may be a regenerative latch comparator, which may help with improving the stability of decision at the threshold. Optionally, a set/reset (SR) latch may also be coupled to the output to help latch the output to improve noise immunity (not represented in FIG. 8A for the sake of simplicity).

The counter 820 may be any suitable type of counter, for example configured to count up or count down. It may be a simple binary counter, or a Gray code counter. Using a Gray code counter may be beneficial because each increment or decrement of the count results in a single bit change, such that the counter 820 has a consistent current footprint during the count. This may help to prevent side channel attacks that look at the current or power consumption of the readout unit 620. In the example of FIG. 8A, the counter 820 is implemented as a single counter, although it may alternatively be implemented as two complimentary counters, as explained below with reference to FIG. 9A.

Figure 8B:
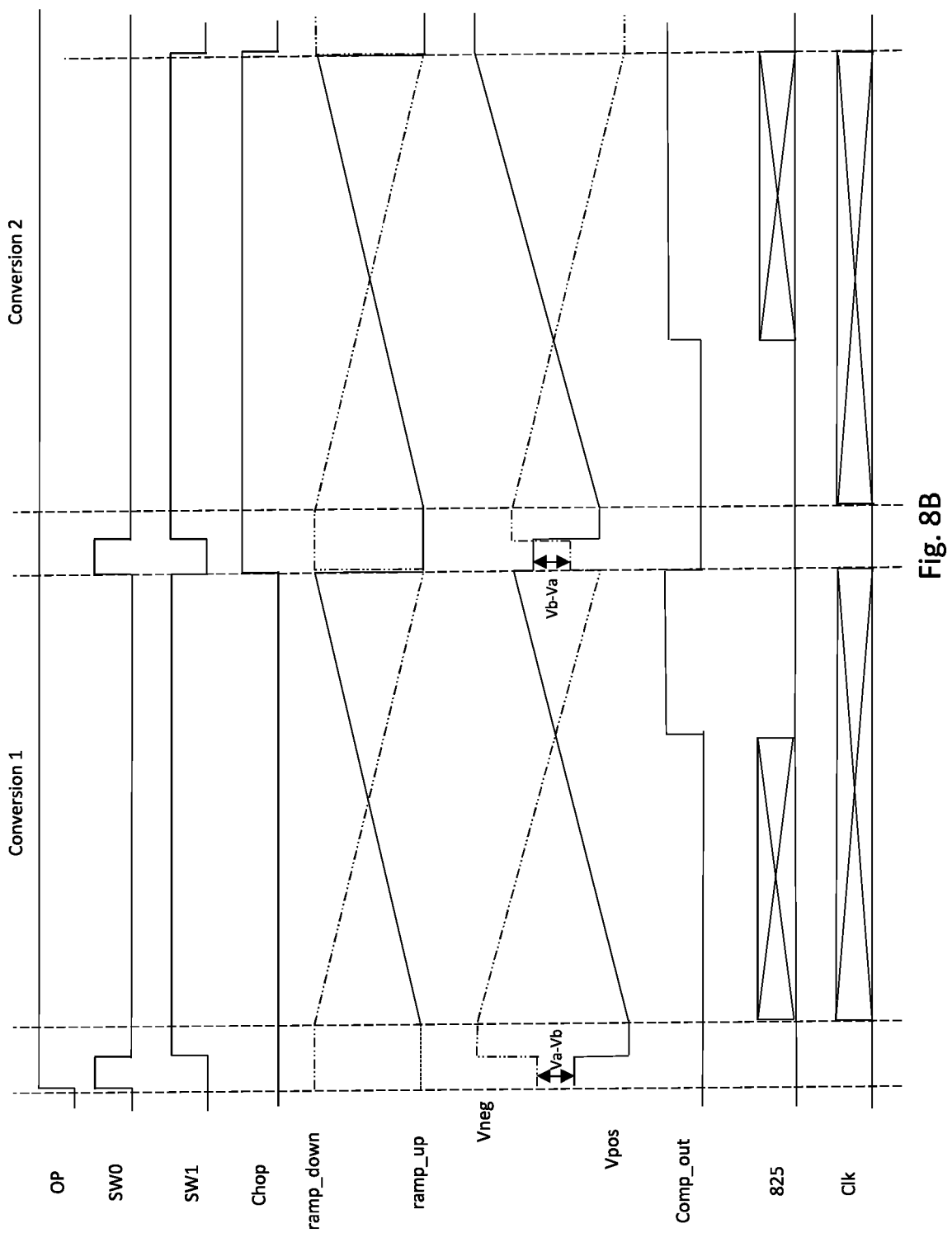

FIG. 8B shows a timing diagram representing one way in which the readout unit 620 of FIG. 8A may be operated when the apparatus is in the PUF fine-measurement mode. In this mode of operation, if the PUF apparatus comprises two or more PUF cells that are connectable to the readout unit 620 (for example, as shown in FIG. 6), the selection unit 610 may use the row select signals to control a PUF cell 105 to output signals Va and Vb to the readout unit 620, with the other cells disconnected or decoupled from the readout unit 610 (or not driven/stimulated to output any signal) so that only one PUF cell outputs Va and Vb to the readout unit 620 (for example, as shown in FIG. 5B). The readout unit 620 generates a multi-bit measurement 825 that is indicative of both the sign and magnitude of the value Va–Vb. In the example represented in FIG. 9B, Vb is greater than Va.

Figure 9A:
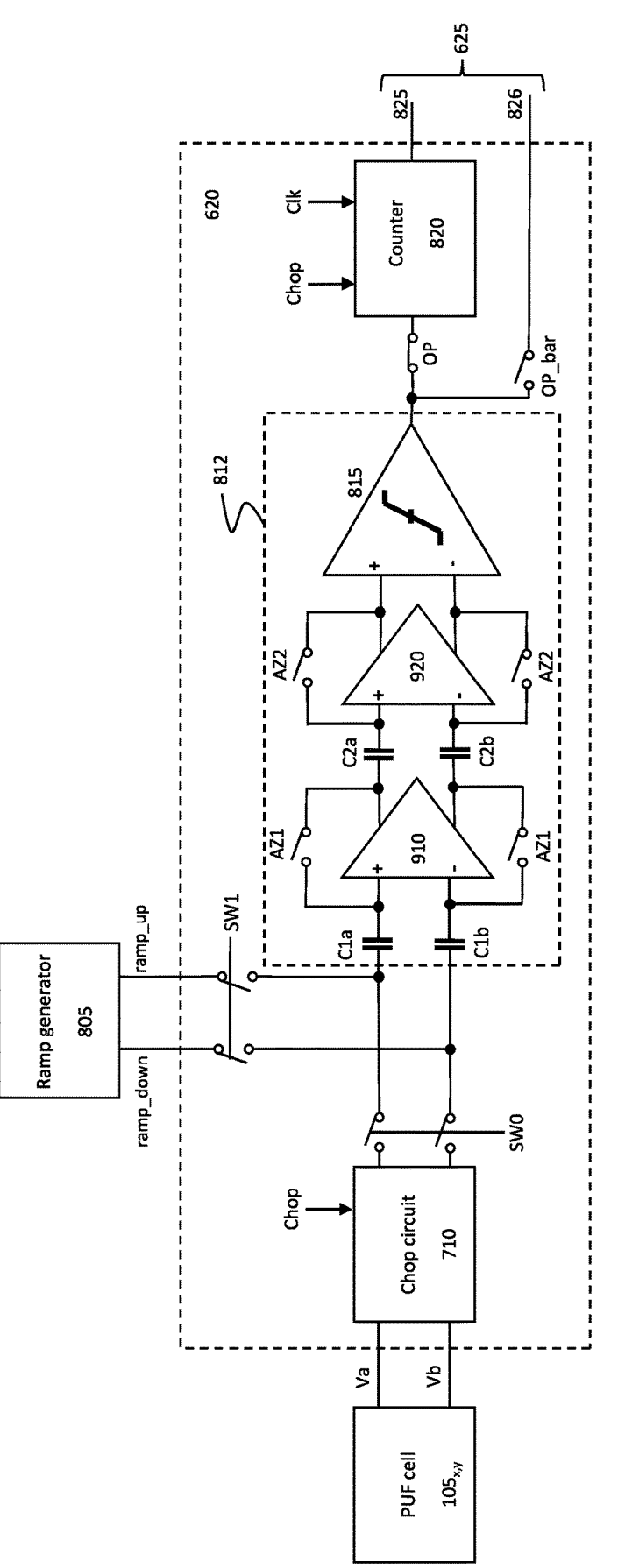
FIGS. 9A and 9B show a further example implementation and operation of a readout unit of the PUF apparatus/system of FIG. 6.
Figure 9B:
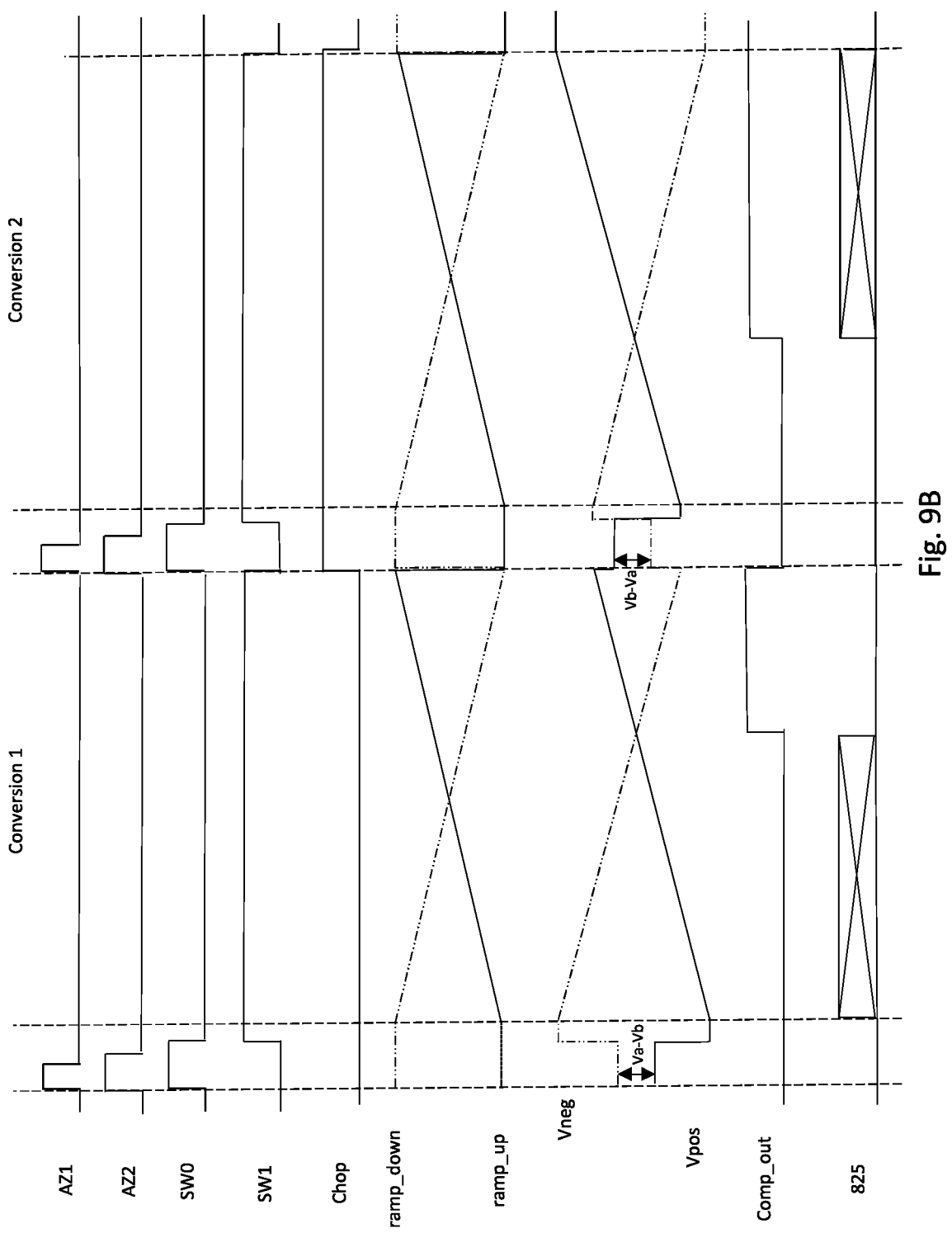

First, the switches controlled by signal SW0 are closed to couple the PUF cell 105$_{x,y}$ to the pre-amp 810 via the chop circuit 710 so that the pre-amp inputs Vpos and Vneg are held at Va–Vb. Whilst the switches controlled by SW0 are shown on the comparator 812 side of the chop circuit 710, they may alternatively be on the PUF cell 105 side of the chop circuit. In a further alternative, they may not form part of the readout unit 620 and instead be part of the PUF cell 105 and controlled in order to couple or decouple the PUF cell 105 from the readout unit 620 as required (for example, when multiple PUF cells 105 are couplable to the readout unit 620, the switches may be used to decouple all but one PUF cell 105 from the readout unit 620 at any one time. An example of this is shown in FIG. 5B). In this example, the chop 710 initially couples Va to the positive input of the comparator 812 and couples Vb to the negative input of the comparator 812. Because Vb>Va, as can be seen in FIG. 9B voltage Vneg is greater than the voltage Vpos. The comparator 812 may be configured to sample those signals in any suitable way, an example of which is shown in FIG. 9A. The switches controlled by the signals OP and OP_bar are also controlled so as to close the switch coupling the comparator 812 output to the counter 820 input, and open the switch controlled by OP_bar. In an alternative, rather than using switches for this purpose, one or more gated logic cells may be used, configured to switch between coupling the output Comp_out to the counter 820 or to the output 826 based on the control signal OP.

The switches control by signal SW0 are then opened and the sampled values of Va and Vb are respectively held at the positive and negative inputs of the comparator 812. The switches controlled by SW1 are then closed to couple the ramp_up and ramp_down signal lines to the inputs of the comparator 812. At this time, the ramp_down signal is at its maximum value, ready to ramp down, and the ramp_up signal is at its minimum value, ready to ramp up. At this stage, initialisation for the first digital conversion is complete.

Conversion 1 starts when the clock signal clk begins. The clock signal may be generated by a clock generator within the determination unit 170, or may be a native clock signal within the device in which the PUF apparatus 100 is implemented. It may have any suitable frequency depending on the configuration of the ramp generator 805 and the counter 820. The ramp_up and ramp_down signals are shown in FIG. 8B, along with the way in which they affect the voltages at Vneg and Vpos. The ramped signals may continue until ramp_down reaches its minimum value and ramp_up reaches its maximum value, at which time the ramp generator 805 may be reset.

In this example, the counter 820 is initially configured to count the clock signals when Comp_out is low. Comp_out goes high when Vpos becomes greater than Vneg, at which time the counter 820 ceases counting. The counted value 825 is a multi-bit digital representation of: $V_a–V_b$+offset/delay+ noise1, where offset/delay are nonidealities caused by circuits (as explained earlier).

The counter 825 may be configured to count up or down in any suitable way, for example using standard binary counting or using Gray code counting. As will be understood by the skilled person, in Gray code counting, the value of only one bit of the multi-bit word changes for each count increment or decrement. This may be advantageous for the PUF apparatus 100 in order to help maintain a constant current draw throughout the count, thereby reducing the possibility of side channel attacks that look at the power footprint of the apparatus.

Once the number of cycles of Clk reaches the full scale of conversion 1 (referred to from hereon as Fullscale_conv1), the conversion is complete and the Clk signal ceases. For example, if Fullscale_conv1 is 7-bit, the number of clock cycles is $2^7=128$. The switch signal SW0 changes state in order to re-couple the PUF cell 105 to the inputs of the comparator 812 via the chop circuit 710. The switch signal SW1 also changes state to disconnect the ramp generator 805 from the inputs of the pre-amp comparator 812. Finally, the chop signal changes state in order to cause the chop circuit 710 to chop the comparator 812 inputs. In this example, since during conversion 1 the chop circuit 710 coupled Va to the positive input of the comparator 812 and coupled Vb to the negative input of the comparator 812, when the chop signal changes state the chop circuit 710 then couples Va to the negative input of the comparator 812 and couples Vb to the positive input of the comparator 812. Consequently, the value −(Va−Vb), i.e. Vb−Va, is now held at the inputs to the comparator 812. This signal is sampled by the pre-amp 810 when the switch control signal SW0 changes state again (from high to low), thereby disconnecting the pre-amp 810 from the PUF cell 105. The state of switch signal SW1 also changes (from low to high), thereby re-coupling the ramp signals to the inputs of the comparator 812. The ADC is now ready for the second conversion.

The second conversion begins when the clock signal is restarted, causing the counter 825 to recommence counting and the ramp generator 805 to start the ramping signals ramp_up and ramp_down.

The counter 825 may be operated in many different ways. In the example represented in FIG. 8B, it is operated as a purely up counter (but could alternatively be operated as a purely down counter). The signal "Chop" is used in this example not only to control the chop circuit 710, but also control the operation of the counter 820. In particular, a change of state of the Chop signal changes the nature of the signal that will cause the counter 820 to start and stop counting. In this particular example, when Chop is low, the counter 820 is configured to count when comp_out is low and cease counting when comp_out is high. When Chop is high, the counter 820 is configured to count when comp_out is high and cease counting when comp_out is low. Therefore, as can be seen in FIG. 8B, during conversion 2, initially the counter 820 does not count, but then when Vpos becomes greater than Vneg and the signal comp_out goes high, the counter 820 starts counting the cycles of the Clk signals. At the end of conversion 2, the Clk signal ceases and the whole conversion is completed such that the counted output 825 represents a measure of Va−Vb. In this example, because of the chop performed by the chop circuit 710 and the change in the operation of the counter 820 caused by the Chop signal, the count during conversion 2 is equal to: Fullscale_conv2−(Vb−Va+offset/delay+noise2), where Fullscale_conv2 is the full scale count of the counter 820 during conversion 2 (which is the same as the full scale count of the counter 820 during conversion 1).

The value of Count1 (i.e., the amount counted during conversion 1, which may be referred to as the first digital value) plus the value of Count2 (i.e., the amount counted value during conversion 2, which may be referred to as the second digital value) is:

$$[Va - Vb + \text{offset/delay} + \text{noise1}] +$$
$$[\text{Fullscale\_conv2} - (Vb - Va + \text{offset/delay} + \text{noise2})] =$$
$$2(Va - Vb) + \text{noise1} - \text{noise2} + \text{Full scale\_conv2}$$

Therefore, it can be seen that the digital measurement of Va−Vb is arrived at from the first digital value and the second digital value (in this case, the addition of the two). In this example, the counter 825 is left to continue incrementing (or decrementing if the counter 825 is a decrementing counter) its count between conversion1 and conversion2, so that the counter output 825 at the end of conversion 2 is equal to Count1+Count2. Therefore, in this mode of operation, the digital measurement 625 of Va−Vb is the counted value 825 at the end of conversion 2. As can be seen above (and as explained in more detail earlier), the offset/delay values are entirely or substantially cancelled and the output 825 is a more accurate measure of the signal Va−Vb. Furthermore, the counter 820 can be a simple type of counter, operating as a straightforward count up or count down counter. Control of the counter is also straightforward, as can be seen from FIG. 8B, and there is no need to store in memory the value Count1 since the counter 820 just continues its counting between conversion 1 and conversion 2. This even further simplifies the operation and requirements of the readout unit 620.

In this example, the full scale count for each conversion (e.g., Fullscale_conv1 and Fullscale_conv2) may be the same as the full scale of the ramp generator, which is the difference between the maximum and minimum values of the ramp signals (and is the same as the full scale of the digital values used by the DAC in the ramp generator 805 to generate the ramp signals). The full scale count for each conversion (e.g., Fullscale_conv1 and Fullscale_conv2) may be 50% (or less) of the full scale count that the counter 820 is capable of. For example, if counter 820 is configured to generate an 8-bit count, the full scale count for each conversion may be 7-bits (i.e., 128). Consequently, it can be seen from the above formula that when 2 (Va−Vb)+noise1−noise2 is a positive number (i.e., Va>Vb, assuming the noise components are small), then the 8-bit count at the end of conversion 2 will have an MSB of 1 (i.e., an 8-bit word equal to 128+a positive number). If, however, 2 (Va−Vb)+noise1−noise2 is a negative number (i.e., Vb>Va, assuming the noise components are small), then the 8-bit count at the end of conversion 2 will have an MSB of 0 (i.e., an 8-bit word equal to 128+a negative number). If the MSB is 1, the remaining 7-bits will represent the magnitude of 2 (Va−Vb)+noise1−noise2 and if the MSB is 0, the remaining 7-bits will represent the 7-bit full scale minus the magnitude of 2 (Va−Vb)+noise1−noise2 (from which the magnitude of 2 (Va−Vb)+noise1−noise2 can be straightforwardly obtained if desired, for example by flipping the value of each of the 7-bits if the counter 820 is a standard binary counter). Therefore, the MSB of the count 825 at the end of conversion 2 indicates the sign of Va−Vb. There are a number of useful applications of this characteristic, which are explained later. It will be appreciated that an 8-bit counter is just one example and the counter 825 may be configured to have any suitable full scale that is greater than the full scale of the count in each of conversion 1 and conversion 2.

Whilst this is one particularly beneficial implementation and operation of the counter 820, many others are possible. For example, in another implementation the counter 820 may be reset between conversion 1 and conversion 2, with the counted value 825 at the end of conversion 1 (e.g., the first digital value) stored in memory and then added to the counted value 825 at the end of conversion 2 (e.g., the second digital value). In this case, a further processing unit/block (not represented in FIG. 8A) may be configured to sum the two counted values together, the result of which is the full conversion digital measurement of Va−Vb. The full scale of the counter 820 may be the same or greater than the full scale of the count in each of conversion 1 and conversion 2 (e.g., Fullscale_conv1 and Fullscale_conv2).

In a further possibility, the Chop signal may not be used by counter 820, such that the counter 820 is triggered to start and stop counting in the same way during conversion 1 and conversion 2. In this case, the number counted by the counter 820 during conversion 2 may represent: (Va−Vb)+ offset/delay+noise2. In this case, number counted by the counter 820 during conversion 1 may be stored in memory and then subtracted by a further processing unit/block (not represented in FIG. 8A) from the number counted during conversion 2, in order to arrive at the digital measurement of Va−Vb. The full scale of the counter 820 may be the same or greater than the full scale of the count in each of conversion 1 and conversion 2 (e.g., Fullscale_conv1 and Fullscale_conv2).

In a further alternative, rather than having to store the number counted during conversion 1, an up/down counter may be used at the counter 820. In this case, it may be operated to count up (or down) during conversion 1, and then operated to count down (or up) during conversion 2, in which case the counted value 825 at the end of conversion 2 may be the digital measurement of Va−Vb. The full scale of the counter 820 may be the same or greater than the full scale of the count in each of conversion 1 and conversion 2 (e.g., Fullscale_conv1 and Fullscale_conv2).

The various control signals and their timings represented in FIG. 8B (and in the other timing diagrams discloses herein, such as FIGS. 9B, 10B, 16C) may be set by a control unit that is not represented in FIG. 8A for the sake of simplicity. The control unit may be of any suitable type that will be well understood by the skilled person, for example it may be a processor of some sort, such as a microcontroller or a microprocessor, or it may be programmed logic such as an FPGA, or a dedicated control circuit, etc.

FIG. 9A shows one particular example implementation of the pre-amp 810. In this example, the pre-amp 810 is a two-stage, autozeroing sampling amplifier comprising two gain/amplifier stages 910 and 920, with capacitors C1$a$ and C1$b$ at the inputs of the first gain stage 910 and capacitors C2$a$ and C2$b$ at the inputs of the second gain stage 920. Whilst this example represents a two-stage arrangement, it will be appreciated that it could alternatively be a single stage (in which case gain stage 920, capacitors C2$a$ and C2$b$ and the auto-zeroing switches AZ2 would be omitted), or a three or more stage arrangement.

FIG. 9B shows an example timing diagram of how a digital measurement of Va−Vb may be determined during the circuit represented in FIG. 9A. Most of the operation of the arrangement is the same as that represented in FIG. 8B and those parts of the operation will not be described again here. Furthermore, the clock signal Clk and the switch control signal OP will be operated in the same way as represented in FIG. 8B and are not represented in FIG. 9B for the sake of simplicity.

Before conversion 1, control signals AZ1 and AZ2 are set to high so as to auto-zero both stages of the pre-amplifier. Subsequently, AZ1 and AZ2 are set low to open the autozeroing switches and the control signal SW0 goes low so as to disconnect the pre-amplifier 810 from the PUF cell 105$_{x,y}$ and sample the values Va and Vb at input capacitors C1$a$ and C1$b$. Consequently, the capacitors C1$a$ and C1$b$ effectively hold or store at the inputs to the gain stage 910 the value Va−Vb. By auto-zeroing the pre-amplifier 810 prior to conversion, the amount of residual amplifier offset may be reduced, such that the size of the "offset" component (described in more detail earlier with reference to FIG. 8B) within the measurement performed by conversion 1 is reduced. Having auto-zeroed the pre-amplifier 810 and sampled the voltages Va and Vb, conversion 1 is then performed in the same way as described above with reference to FIG. 8B.

After conversion 1 and prior to conversion 2, control signals AZ1 and AZ2 are again set to high so as to auto-zero both stages of the pre-amplifier, thereby again reducing the residual amplifier offset for conversion 2. Control signals SW0 and Chop go high so as to couple Va and Vb to the inputs of the pre-amplifier 810 again (but with the input coupling chopped by the chop circuit 710) and control signal SW1 goes low in order to disconnect the ramp generator 805. Subsequently, control signals AZ1 and AZ2 go low, control signal SW0 goes low so as to again disconnect the pre-amplifier 810 from the PUF cell 105$_{x,y}$ and sample the values Va and Vb at input capacitors C1$a$ and C1$b$, and control signal SW1 goes high. Conversion 2 can then be performed in the same way as described above with reference to FIG. 8B.

Using an auto-zeroing pre-amplifier 810 is not essential, but may have the benefit of reducing the amplifier offset, thereby improving the accuracy of measurement of Va−Vb. Using a multi-stage amplifier 810 may have same benefits, particularly when it is an auto-zeroing pre-amplifier 810 as it may help to reduce total input referred offset. In particular, it may reduce kTC noise mismatch generated in the first gain stage and reduce input referred offset of the kTC noise mismatch at the second gain stage by a factor that is equal to the gain of the first gain stage. However, regardless of whether or not the pre-amplifier 810 is an auto-zeroing amplifier, the pre-amplifier 810 may have only a single gain stage or it may be a multi-stage amplifier (i.e., it may have two or more gain stages).

In FIGS. 8A, 8B, 9A and 9B, the comparison stage 815 is represented as having a single ended output that is set to high or low depending on the comparison of voltages at its input terminals. In an alternative, it may have a differential output, where the output differential voltage is either high or low (for example, either a positive voltage or a negative voltage) on the comparison of voltages at its input terminals. As will be appreciated by the skilled person, such a differential voltage may be used to control the operation of the counter 820 as described earlier with reference to FIGS. 8B and 9B (for example, by using only one of the two output signals to control the start/stop of the counter 820, or by using a counter 820 that is configured to start/stop depending on whether the differential voltage output from the comparison stage 815 is positive or negative).

Figure 10A:
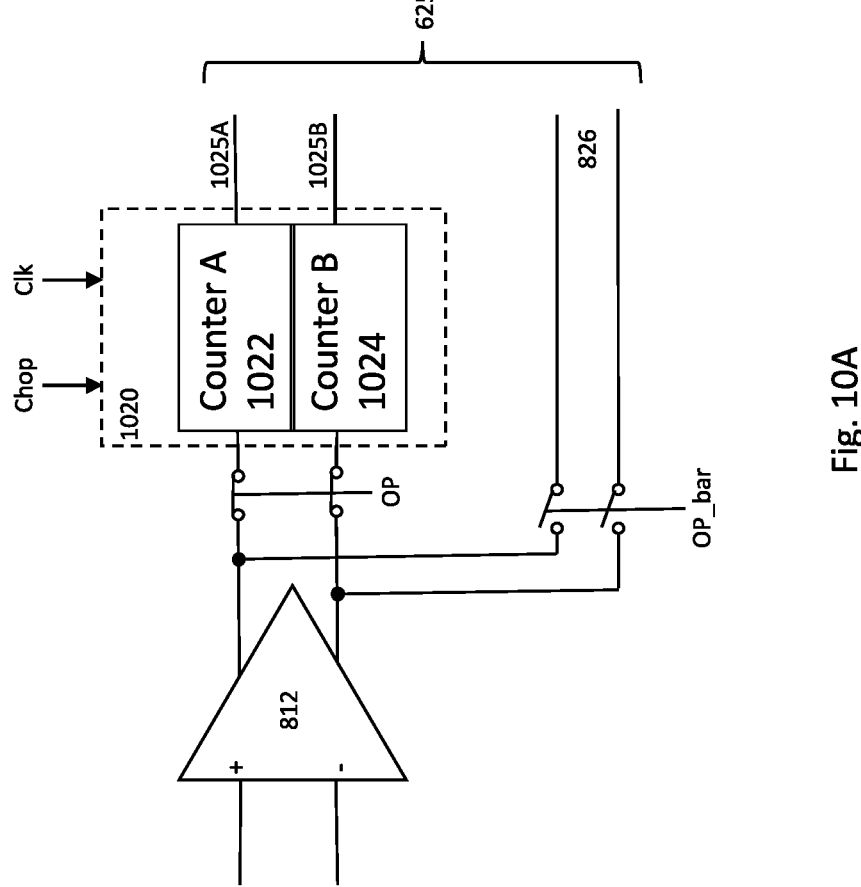
FIGS. 10A and 10B show a further example implementation and operation of a part of a readout unit of the PUF apparatus/system of FIG. 6.

FIG. 10A shows an alternative type of counter 1020 that may be used instead of the single counter 820 represented in FIGS. 8A and 9A. Counter 1020 is a complimentary counter comprising counter A 1022 and counter B 1024. The counter 1020 is configured such that, during operation, counter A 1022 counts the Clk signal while counter B 1024 is not counting, and counter B 1024 counts the Clk signal while counter A 1022 is not counting. Each of counter A 1022 and counter B 1024 may be standard binary counters, or Gray code counters, or any other type of counter.

Figure 10B:
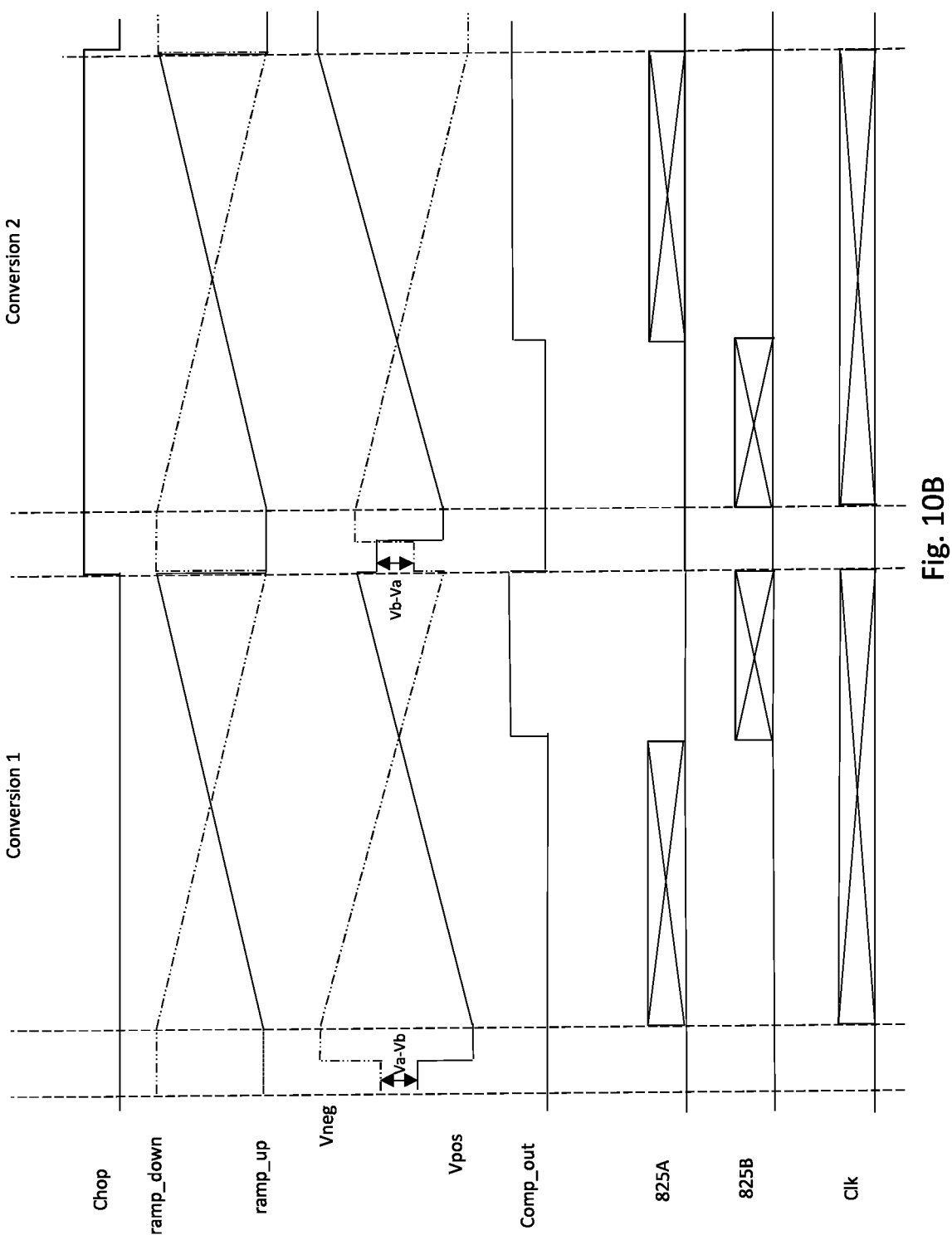

FIG. 10B shows an example timing diagram to help explain the operation of the complimentary counter 1020. The operation of the readout unit 620 as a whole is the same as described with reference to FIG. 8B or 9B, except for the operation of the complimentary counter 1020. Therefore, for the sake of simplicity, FIG. 10B and the following explanation focus specifically on the operation of the complimentary counter 1020. Counter A 1022 is configured to operate in the same way as the counter 820 described above with reference to FIGS. 8 and 9. Therefore, during conversion 1 it counts the Clk signal when Comp_out is low (e.g., when the positive output terminal of the comparator 812 is low), and during conversion 2 it counts the Clk signal when Comp_out is high (e.g., when the positive output terminal of the comparator 812 is high). Counter B 1024 is the compliment to Counter A 1022, and so counts the Clk signal when Counter A 1022 is not counting i.e., when Comp_out is high during conversion 1 (e.g., when the negative output terminal of the comparator 812 is high) and when Comp_out is low during conversion 2 (e.g., when the negative output terminal of the comparator 812 is low). A measure of Va−Vb may then be determined using the count 825A of Counter A 1022 for conversion 2 and the count 825A of Counter A 1022 for conversion 1 (as described earlier), or by using the count 825B of Counter B 1024 at the end of conversion 2 and the count 825B of Counter B 1024 at the end of conversion 1 (which will give a measure of −(Va−Vb)). For example, in the chopped counter implementation, this may be achieved by allowing the counters to cumulatively count both the first and second conversions (as explained earlier). Alternatively, the counters may be reset between conversions, with the counted value at the end of conversion 1 stored and then the counted value at the end of conversion 2 subtracted from it.

Whilst the operation of the complimentary counter 1020 has been described particularly with the comparison stage 815 having a differential output, it will be readily appreciated that the operation would be the same with the comparison stage 815 having a single ended output.

A benefit of the complimentary counter 1020 is that throughout each conversion, regardless of the values of Va and Vb, the complimentary counter 1020 is always counting. This means that with each conversion, the circuit has a constant current draw, regardless of the analog values being converted. This should help to reduce the chances of side channel attacks that are based on looking at the power consumption of the circuit.

A further benefit is realised in the context of PUF self-checking, which may take the form of PUF self-enrolment or PUF health-checking.

Optionally, when the PUF apparatus 100 comprises two or more readout units 620$_x$ configured to operate in parallel (for example, measure in parallel two or more differential signals output by the PUF cells 105, as shown in FIGS. 5B and 6), a single ramp generator 805 may be used and the ramp_up and ramp_down signals shared by the readout units 620. In this example, a first ADC would be formed by the ramp generator 805 and the comparator 812 and counter 820 of the first readout unit 6201. A second ADC would be formed by the ramp generator 805 and the comparator 812 and counter 820 of the second readout unit 6202, etc. The switches controlled by signal SW1 may form part of each readout unit 620$_x$, or there may be a single pair of switches controlled by SW1, the state of which decide whether the ramp_up and ramp_down signals are supplied to all readout units 620$_x$ or none of the readout units 620$_x$. This enables parallel readout and PUF value generation, thereby significantly improving the speed with which a PUF output may be generated, whilst minimising the number of parallel components/circuits and thereby minimising cost and space.

Additionally or alternatively, rather than each readout unit 620 having its own counter 820, there may be a single counter shared by each of the two or more readout units 620$_x$. In this case, each readout unit may include a latching device that latches the output of the single counter when the comparator 815 output changes, such that each readout unit 620$_x$ may still arrive at a count that is dependent on the signal Va−Vb that it is measuring.

PUF Self-Checking Mode

In some PUF systems, it may be desirable to identify PUF cells that have a relatively large difference in measured physical characteristic (resulting in a relatively large Va−Vb) and mark those PUF cells as being the ones to use for subsequent PUF value determination. This is called 'enrolment'. The PUF apparatus 100 of the present disclosure may optionally be operated in a self-checking mode where it performs self-enrolment (e.g., enrolment of PUF cells using circuits that are native to the PUF apparatus 100). Enrolment may be performed because PUF cells with a small measured physical characteristic might be prone to a change of PUF value over time. In particular, if Va>Vb gives a PUF value of 0 and Va<Vb gives a PUF value of 1, if Va−Vb is very small it is more likely that over time the PUF value of the cell might change from 0 to 1 or vice versa, as a result of changes in environmental conditions, component wear and/or readout noise.

Therefore, after manufacture of the device, enrolment might take place where Va−Vb is measured for each PUF cell and those with a relatively large Va−Vb may be marked as suitable for use and those with a relatively small Va−Vb may be marked as unsuitable for use. Previously, this might require a full measure of Va−Vb to be determined (for example, using any of the techniques described above) and the value then compared against a threshold to determine whether it is sufficiently large for future use. However, using the complimentary counter 1020, the process of enrolment may be made significantly more efficient.

PUF health-checking also involves determining whether Va−Vb for a PUF cell is relatively large, but the outcome of the comparison is generating a status report that is indicative of a likelihood that the PUF apparatus will generate a persistent PUF output, rather than marking PUF cells as suitable or unsuitable for use in generating a PUF value. In more detail, if the PUF apparatus 100 has a plurality of PUF cells 105, the magnitude of Va−Vb for each cell 105 may change or drift over-time. Cells having a Va−Vb with a relatively small magnitude may become more likely to have a change in the PUF value they generate. The larger the number of cells that experience this, the more likely it becomes that the final PUF output (which is generated using the PUF values generated using each of the cells 105) will no longer be reliably persistent. Therefore, throughout the lifetime of the PUF apparatus 100, it may periodically or intermittently be operated in the PUF self-checking mode in order to assess how many cells now have a relatively small magnitude of Va−Vb, based on which a statistical likelihood of generating a persistent PUF output may be determined. The status-report may be indicative of the likelihood of generating a persistent PUF output in one or more different ways, including: identifying the number or proportion of cells with a relatively small magnitude of Va−Vb; identifying a statistical likelihood of generating a persistent PUF output (e.g., a score out of 100); etc.

Therefore, PUF self-checking mode may include operating the PUF apparatus 100 in a self-enrolment mode or a health-checking mode. In some instances, the PUF apparatus 100 may be configured to be operable in the self-enrolment mode, for example at the start of the apparatuses life (and optionally occasionally again during its life), in order to enroll (or re-enroll) cells, and at other times operate in the health-check mode periodically or intermittently throughout its life. In both operations, it is determined whether or not the magnitude of Va−Vb is relatively small, which will now be described further.

Figure 11A:
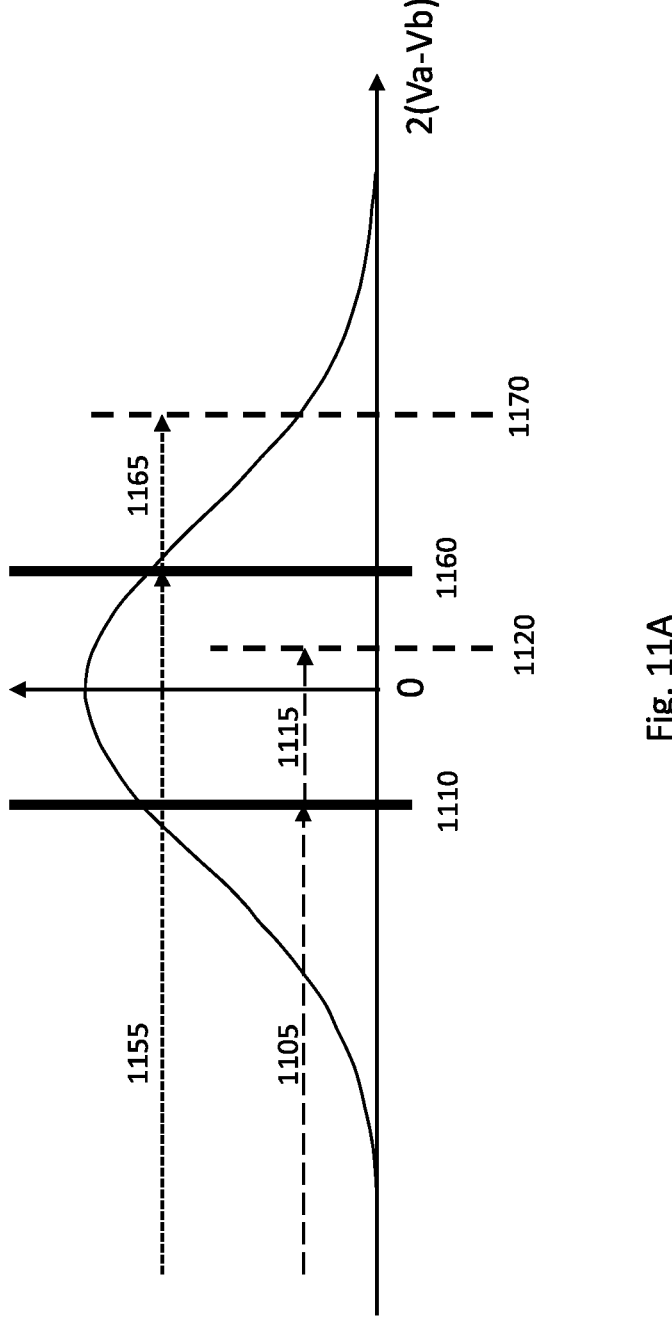
FIGS. 11A and 11B show example visualisations of measurements using the readout unit of FIG. 10A.
Figure 11B:
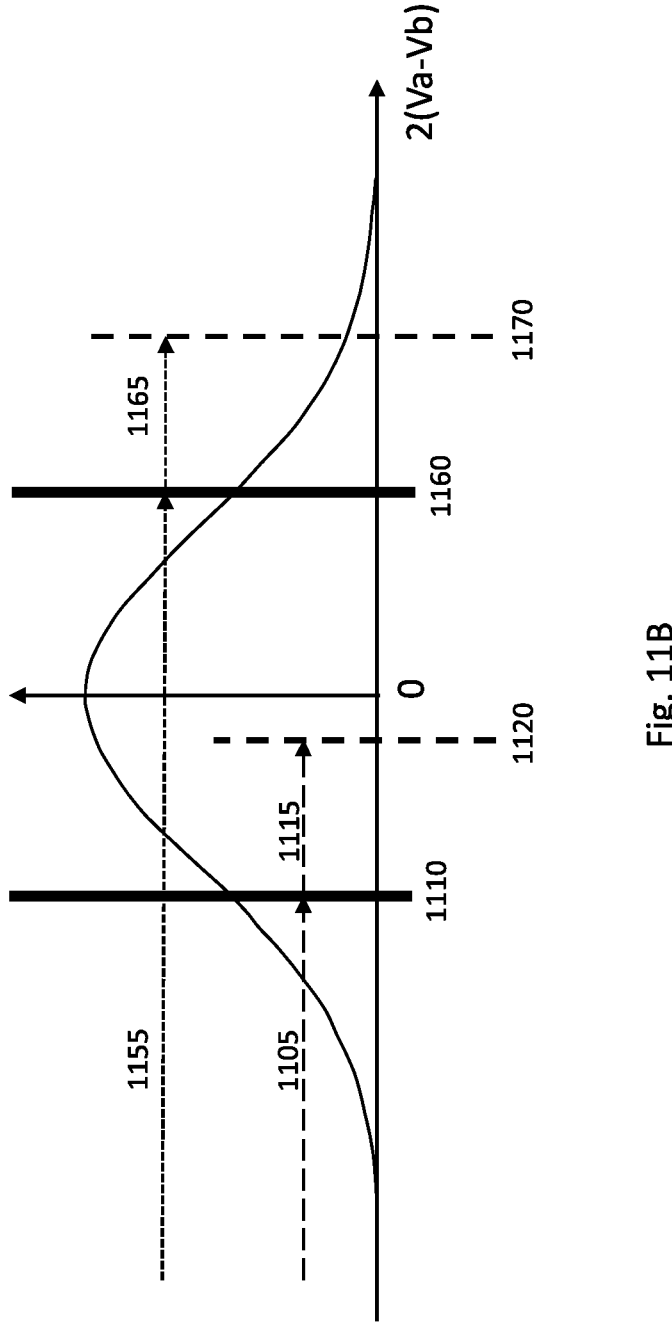

FIG. 11A shows an example where Va–Vb is relatively small and FIG. 11B shows an example where Va–Vb is relatively large. During enrolment, the readout unit 620 is operated as described above with reference to FIG. 10B, in order to determine a measure of the magnitude of Va–Vb. The only difference is that counter A 1022 and counter B 1024 are not configured to stop counting at the end of conversions 1 and 2 (i.e., when the ramp signals complete their ramp). Instead, readout unit 620 is configured such that they continue to count for n cycles of Clk after they would normally stop counting according to the process represented in FIG. 10B (for example, in the case represented in FIG. 10B, counter B 1024 may continue to count n cycles of Clk at the end of conversion 1 and counter A 1022 may continue to count n cycles of Clk at the end of conversion 2, or both counter A 1022 and counter B 1024 may count n cycles of Clk at the end of conversion 1 or at the end of conversion 2). As will be seen from FIG. 11A, the n cycles of the Clk equates to an additional threshold count and defines a stability threshold used to determine whether Va–Vb is considered to be sufficiently large to be reliably stable. The larger the number n, the larger the magnitude of Va–Vb must be in order for the PUF cell to meet the threshold requirement for being reliably stable.

To explain this further, FIG. 11A shows a bell curve distribution, which represents the statistical distribution of values of Va–Vb for PUF cells. As can be seen, about 50% of PUF cells have a negative Va–Vb and about 50% of PUF cells have a positive Va–Vb (as required for the PUF cells to generate a random PUF value), with an approximately normal or Gaussian distribution of values. In this example, "0" is the mid-scale of counters A and B (e.g., "0" is represented by a count that is 50% of the maximum possible at the end of conversion 2) and represents there being no difference between Va and Vb. Numeral 1105 represents the count of counter A 1022 that is counted according to the process represented in FIG. 10B, and 1110 represents the corresponding measured size of 2 (Va–Vb). Numeral 1115 represents the additional threshold count that counter A 1022 is configured to count when operating in the PUF self-checking mode. Numeral 1120 represents the final value measured by counter A 1022 at the end of the process. Numeral 1155 represents the count of counter B 1024 that is counted according to the process represented in FIG. 10B, and 1160 represents the corresponding measured size of 2 (Vb–Va). Numeral 1165 represents the additional threshold count that counter B 1024 is configured to count when operating in the PUF self-checking mode. Numeral 1170 represents the final value measured by counter B 1024 at the end of the process.

As can be seen, in this example the measured value 1120 and 1170 have the same sign, because the threshold count 1115 has caused the count for counter A 1022 to flip from negative to positive.

In contrast, turning to FIG. 11B, it can be seen that the value 1120 is negative and the value 1170 is positive. This is because Va–Vb has a greater magnitude, so the additional threshold count 1115 was not sufficient to cause the count for counter A 1022 to flip from negative to positive. Therefore, by using the additional threshold count 1115 and 1165 (which will be of the same size as each other), it is possible quickly, with minimal additional time and processing, to determine whether Va–Vb is sufficiently large to exceed the stability threshold. If during PUF self-checking mode both counter outputs 1025A and 1025B have the same sign, then Va–Vb is relatively small and is less than the stability threshold, which indicates that the PUF cell is unlikely to be sufficiently stable for the sign of Va–Vb to stay the same over time. If the counter outputs 1025A and 1025B have different signs, then Va–Vb is relatively large and that PUF cell should be used in the future. It will be appreciated that in this example, because both counters are up counters, the values 1120 and 1170 will either both be positive or will have different signs. However, if the counters are down counters, the values 1120 and 1180 will either both be negative or will have different signs. Therefore, it is important to consider whether both values have the same sign (positive or negative), in which case the PUF cell should not be used in the future, or if they have different signs. This may be quickly determined, for example, by XORing the MSBs of counter A 1022 and counter B 1024.

It can be very quickly determined whether or not a counted value output by the counters is positive or negative just from the MSB of the count. If the MSB of the counter is 0, the counted number is a negative value, whereas if the MSB is 1, the counted number is a positive value. Therefore, the stability of the PUF cell can be very quickly determined by performing the operation of described with reference to FIG. 10B with the additional threshold count described above, and then looking to see if the MSB of the outputs 1025A and 1025B of counter A 1022 and counter B 1024 are the same (in which case the PUF cell may be considered unstable) or are different (in which case the PUF cell may be considered stable).

A further benefit of this is that the PUF value of the PUF cell is never revealed. In particular, looking to see if the signs of the value counted by counter A 1022 and counter B 1024 are the same does not indicate whether Va–Vb is positive or negative (and, therefore, if the PUF value for that cell is 1 or 0). This means that self-checking can be performed more securely, and the results may be reported more openly, without revealing the PUF values of each cell.

In an alternative, rather than using an additional threshold count to determine whether the magnitude of Va–Vb is greater than, or less than, a stability threshold, instead the magnitude of Va–Vb may be measured as described with reference to FIGS. 8-10, and then compared in further processing to the stability threshold. For example, the measured magnitude of Va–Vb may be stored in memory and then compared arithmetically to the predetermined stability threshold.

When performing health-checking, once one or more PUF cells 105 are checked to see if the magnitude of their Va–Vb is less than the stability threshold, a status report may be generated as described above.

When performing self-enrolment mode, once a PUF cell 105 is checked to see if the magnitude of its Va–Vb is less than the stability threshold, marking the PUF cell may be done by keeping a record, for example in memory, of a PUF cell ID and a flag that indicates whether or not the cell is suitable for use in generating a PUF value. Self-enrolment may be periodically or intermittently repeated in the field throughout the lifetime of the PUF apparatus 100, to ensure that each of the PUF cells used for generating a PUF output are still reliably stable.

By configuring the readout unit 620 is disclosed herein, the same apparatus may be used to perform self-checking or generate a PUF value, without requiring additional specialist circuits, thereby saving cost and reducing the size of the PUF apparatus.

In the above explanation of PUF value generation with reference to FIGS. 8, 9 and 10, the readout unit 620 is operated in a mode whereby the measurement 625 of Va–Vb is a relatively fine measure of Va–Vb. However, the readout unit 620 may be configured also to be operable to generate a PUF value by determining a coarser measure of Va–Vb, which may be achieved faster and/or with lower power consumption. This mode of operation is called 'PUF coarse-measurement'

PUF Coarse Measurement Mode

In one example of this mode of operation, the control signal OP may be set low (and OP_bar correspondingly set high) so as to disconnect the counter 820, 1020 from the output of the comparator 812 and couple the comparator 812 output directly to an output 826 of the readout unit 620.

Figure 12A:
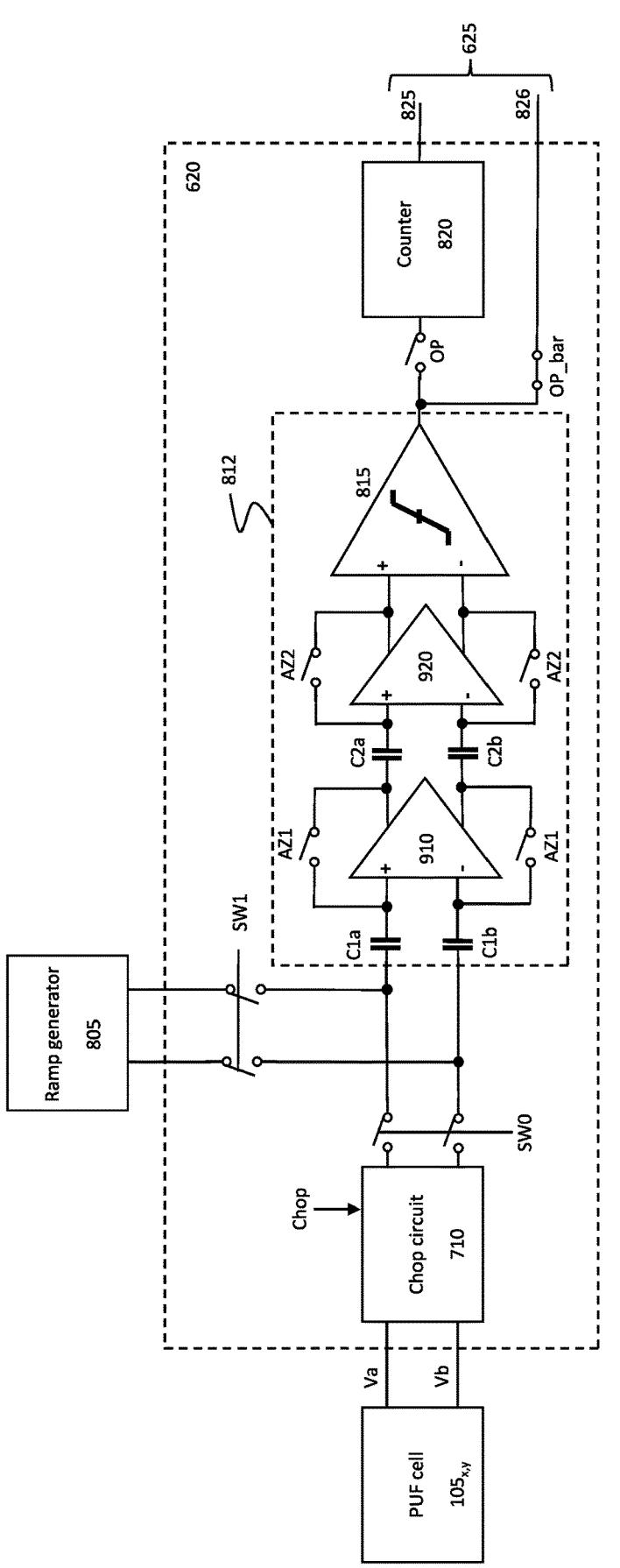
FIGS. 12A and 12B show a further example implementation and operation of a readout unit of the PUF apparatus/system of FIG. 6

FIG. 12A shows a simplified representation of the readout unit 620 when the control signals OP and SW1 are set as described above. In this example, the pre-amp 810 is the same multi-stage autozeroing pre-amp of FIG. 9A, but it could alternatively have any number of gain stages (e.g. one, three, four, etc), or could alternatively be any suitable type of sampling pre-amp, for example with or without auto-zeroing functionality.

In the coarse-measurement mode of operation, the readout unit 620 is configured such that the measurement 625 of Va–Vb is a single bit value 826 that indicates the sign (and not the magnitude) of Va–Vb. More specifically, the comparator 812 operates as a single-bit quantizer ADC that sets the value of its single-bit output based on a relative size of Va and Vb. This mode of operation may be particularly useful for PUF apparatus that have been through enrolment (as described earlier), where the PUF value for a cell 105 that is readout is set to be high or low (e.g. 1 or 0) depending on whether Va–Vb for that cell is positive or negative (a so called 'weak' PUF). It will be appreciated that this example of the coarse-measurement mode of operation may be faster than the fine-measurement mode of operation described earlier. By having a reconfigurable readout unit 620 that is capable of operating in a PUF fine-measurement mode or a PUF coarse measurement mode (and optionally also a self-checking mode), the same PUF apparatus 100 may be used for various different purposes. For example, the same hardware may be used for device enrolment (e.g., self-enrolment), PUF value generation using multi-bit measurements of Va–Vb (which could be 'strong' PUF or 'weak' PUF operation), or faster PUF value generation using single bit measurements of Va–Vb (e.g., 'weak' PUF operation).

Returning to the example of PUF coarse-measurement represented in FIG. 12A, the single-bit measure 826 of Va–Vb may be achieved in two different ways. A first technique, 'chop technique', utilises the chop circuit 710 such that ultimately the input to the comparison stage 815 is 2 (Va–Vb), with systematic errors associated with the circuit (for example, biases in the pre-amp 810) reduced or entirely cancelled from the signal at the comparison stage 815 input.

Figure 12B:
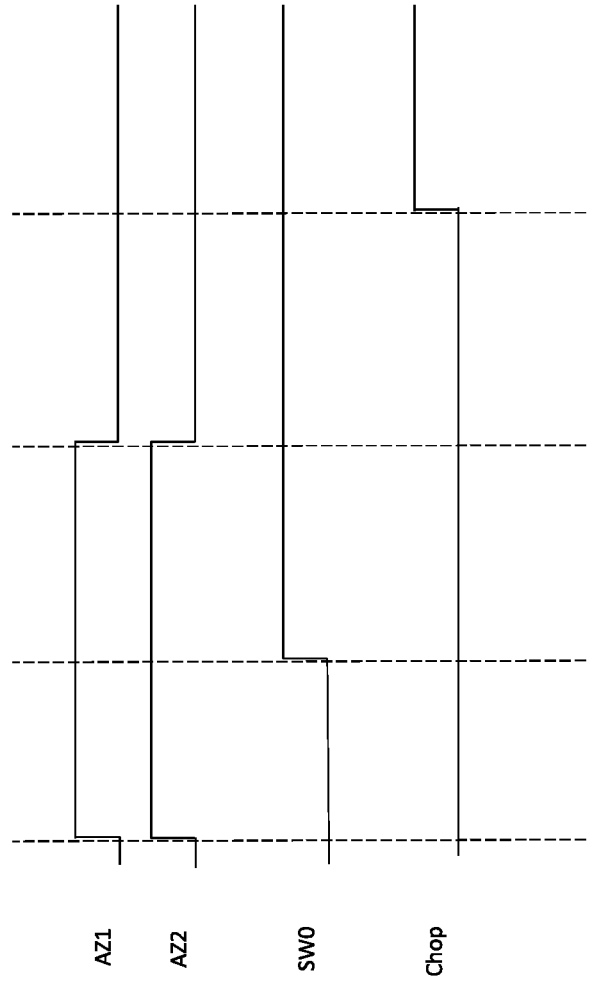

FIG. 12B shows an example timing diagram for operation in the 'chop technique'. The switches controlled by SW1 are open for the entirety of the time, in order to entirely decouple the ramp generator 805 from the comparator 812. The signal SW1 is not represented in FIG. 12B for the sake of simplicity. Initially the autozero switches controlled by signals AZ1 and AZ2 are closed and the coupling switches controlled by signal SW0 are open. Then, the comparator 812 is coupled to the PUF cell 105 by closing switches controlled by signal SW0 (for example, Va may be coupled to C1a and Vb may be coupled to C1b). The autozero switches are then opened by control signals AZ1 and AZ2 (either simultaneously, or at slightly offset times). Finally, the chop circuit 710 is controlled by the signal 'Chop' such that the coupling of voltages Va and Vb to the comparator 812 inputs are switched over (for example, Va may now be coupled to C1b and Vb may now be coupled to C1a). At this time, the input to the comparison stage 815 will comprise a component equal to 2 (Va–Vb). Autozeroing the pre-amp 810 should reduce or eliminate residual offset in the pre-amp 810, so systematic errors in the signal at the input to the comparison stage 815 should be reduced or eliminated. Furthermore, by operating the circuit in this way and generating a signal comprising 2 (Va–Vb) at the input to the comparison stage 815, the signals (Va and Vb) being compared by the comparison stage 815 have been doubled in size, which should further improve the accuracy with which the comparison stage 815 makes the comparison. Consequently, the single bit measurement 826 should accurately indicate if Va>Vb, or if Vb>Va.

A second technique for the PUF coarse-readout mode is referred to as 'pre-bias technique'. In the pre-bias technique, the sampling capacitors of the pre-amp 810 are initially pre-biased to a common voltage before the Va–Vb comparison takes place. In this example, this is achieved using the ramp generator 805, but it may alternatively be achieved by coupling the comparator 812 inputs to any suitable reference voltage. The ramp generator 805 is controlled to output a common voltage (e.g., the same voltage) on its two output lines, for example by setting the DAC in the ramp generator 805 to its mid-range voltage. Initially the autozero switches controlled by signals AZ1 and AZ2 are closed and the coupling switches controlled by signals SW0 and SW1 are open. The coupling switches controlled by SW1 are then closed so as to couple the ramp generator 805 to the pre-amp 810 inputs, and thereby pre-bias the pre-amp 810 sampling capacitors. Then, the comparator 812 is coupled to the PUF cell 105 by closing switches controlled by signal SW0 (for example, Va may be coupled to C1a and Vb may be coupled to C1b, or Vb may be coupled to C1a and Va may be coupled to C1b, depending on the state of the chop circuit 710). Finally, the autozero switches are opened by control signals AZ1 and AZ2 (either simultaneously, or at slightly offset times). At this time, the input to the comparison stage 815 will comprise a component equal to (Va–Vb). Autozeroing the pre-amp 810 should reduce or eliminate residual offset in the pre-amp 810, so systematic errors in the signal at the input to the comparison stage 815 should be reduced or eliminated. Consequently, the single bit measurement 826 should accurately indicate if Va>Vb, or if Vb>Va.

In both of these techniques for the PUF coarse-measurement mode, it can be seen that the readout unit 620 is operated in such a way that it performs a coarse, 1-bit digital conversion of Va–Vb, indicative of whether Va–Vb is greater than or less than 0 (e.g., indicative of which of Va and Vb is larger). As a result, it can very quickly (in the order of micro sections, for example in about 10 us) readout a measurement of Va–Vb that can be used for generating a PUF value.

In an alternative example of the coarse-measurement mode, the readout unit 620 may be operated as described earlier with reference to any of FIG. 8B, 9B or 10B, but with only conversion 1 being carried out. The counted value 825, 1025A at the end of conversion1 will be indicative of Va–Vb (as explained earlier), but will also comprise some systematic offset components that make it less accurate than the fine-measurement mode of operation. Furthermore, it will comprise fewer bits than the final digital measure of Va–Vb that is arrived at by the PUF fine-measurement mode (for example, it may be a 7-bit number, whereas the final digital measure arrived at by the PUF fine-measurement mode may be an 8-bit number). However, the accuracy may still be sufficient for some uses/applications of the PUF apparatus

100, and particularly where self-enrolment has taken place such that any inaccuracies in the measurement should be less than the enrolment stability threshold, such that the inaccuracies should not cause the PUF value generated based on the coarse-measurement of Va–Vb to become unstable (egg, not persistent).

In all examples of the PUF coarse-measurement mode described above, the digital measurement of Va–Vb has a greater resolution (i.e., more bits) when operating in the PUF fine-measurement mode compared with the PUF coarse-measurement mode. In an alternative, the coarse-measurement mode and fine-measurement mode may each generate a digital measurement of Va–Vb with the same numbers of bits, but the readout unit 620 may be operated to consume less power in the coarse-measurement mode compared with the fine-measurement mode. For example, the bias current of the comparator 812 may be reduced in the coarse-measurement mode and/or the autozeroing time may be reduced in the coarse-measurement mode and/or the sampling time may be reduced in the coarse-measurement mode.

Dynamic Random Number Mode

As explained earlier with reference to FIG. 6, the PUF apparatus 100 may optionally be configured to include one or more RNG cells 605$_x$ for generating a dynamic random number (e.g., a random number that, each time it is generated, has a substantially equal likelihood of being any one of its plurality of possible values). The PUF apparatus 100 may be configured to be operable in a dynamic random number mode, where the readout unit 620 reads a value from an RNG cell 605$_x$ and uses that to generate a dynamic random number. As can be seen in FIG. 6, for example, the PUF apparatus 100 may be configured such that a readout unit 620$_x$ is coupled to one or more PUF cells 105$_{x,y}$ and to an RNG cell 605$_x$ (or, in alternative implementations, to more than one RNG cell). Whilst not represented in FIG. 6, it will be appreciated that the readout unit 620$_x$ may be coupled or decoupled from any of the cells within its column (e.g., readout unit 6201 may be coupled or decoupled from any of the cells within column 1) by controlling switches that are within the cells (as shown in FIG. 5B) or are positioned between the outputs of each of the cells and the two signal lines that goes to the readout unit 620$_x$. Alternatively, there may not be any switches of that type, and the cells instead may be configured such that when they are not selected and stimulated/activated by the selection unit 610, they are effectively isolated from the readout units 620$_x$. In this way, the selection unit 610 may select only one cell in each column at any given time, such that only the signals output from that cell are read by the readout unit 620$_x$.

When operating in the dynamic random number mode, the selection unit 610 may control one or more RNG cells 605$_x$ (which may also be referred to as one or more noise sources, since they are configured to output first and second noise signals, as described later) in a similar way to as described earlier in relation to selecting PUF cells. For example, the selection unit 610 may use the RNG_ROW_SELECT signal to select the row of RNG cells 605$_x$ and the PUF_ROW_SELECT signals to deselect all of the PUF cells 105$_{x,y}$ such that each of the readout units 620$_x$ is coupled to a respective RNG cell 605$_x$.

Each of the RNG cells 605$_x$ may comprise one or more components/circuits configured to generate an electrical signal, such as a voltage, that has a random component (ego, noise). For example, each RNG cell 605 may comprise one or more switched capacitor circuits configured to generate and output a voltage signal comprising random kTC noise.

Figure 13B:
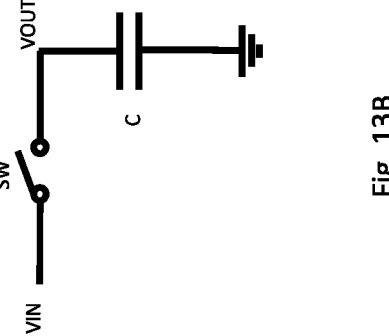
FIG. 13B shows an example representation of a switched capacitor circuit.
Figure 13A:
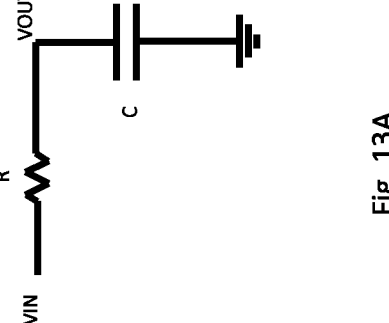
FIG. 13A shows an example representation of an RC filter circuit.

FIG. 13A shows an example representation of an RC filter circuit that is used to help explain the kTC noise that may be generated by a capacitor.

The RC filter circuit has a resistor R and a capacitor C and the thermal noise $v_n$ in the signal VOUT may be expressed as:

$$v_n = \sqrt{4 * k_B * T * R * BW} \rightarrow BW = \frac{1}{4RC}$$

$$v_n = \sqrt{4 * k_B * T * R * \frac{1}{4RC}}$$

$$v_n = \sqrt{\frac{k_B * T}{C}}$$

where
   T=temperature
   $k_B$=Boltzmann constant

The thermal noise $v_n$ is generally referred to as kTC noise, and that is how it will be referred to in the remainder of this disclosure. The kTC noise is random and follows a Gaussian distribution where $$\sqrt{\frac{k_B * T}{C}}$$

is the sigma of the Gaussian distribution.

In an example, at a temperature of 27° C. (300K) the kTC noise of the capacitor C would be:

| Capacitance | $\sqrt{\frac{k_B * T}{C}}$ |
|---|---|
| 1 fF | 2.03 mV |
| 10 fF | 644 uV |
| 100 fF | 204 uV |
| 1 pF | 64 uV |

FIG. 13B shows an example representation of a basic switched capacitor arrangement for generating kTC noise. The switch SW can be modelled as a varying resistor depending on the state of the switch. The kTC noise generated by this circuit is the same as that of the RC filter circuit represented in FIG. 13A. When the switch is turned from an on (i.e., closed) state to an off (i.e., open) state, kTC noise is injected across the capacitor C. Consequently, changing the state of the switch SW from a closed state to an open state may be seen as generating a capacitor voltage VOUT that comprises kTC noise.

Figure 14B:
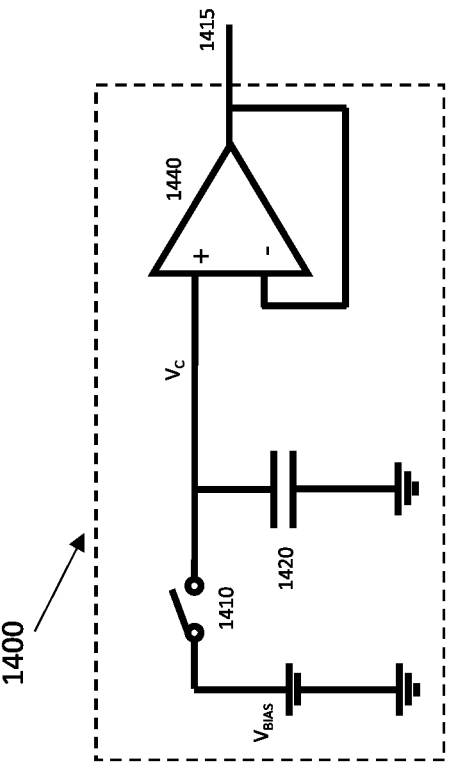
FIGS. 14A to 14G show example representations of noise generator circuits in accordance with an aspect of the present disclosure.
Figure 14A:
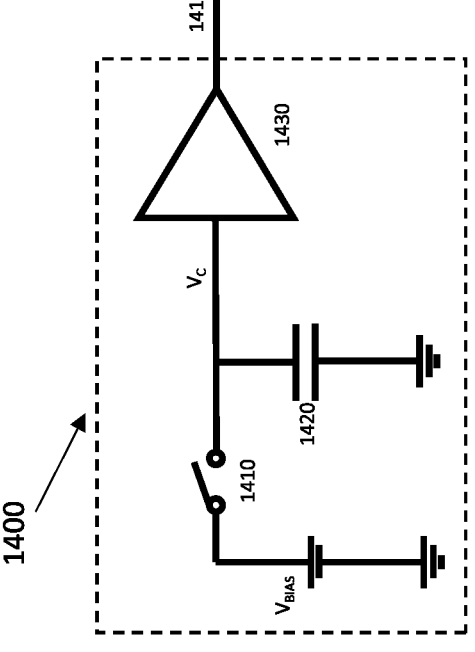

FIG. 14A shows an example implementation of the noise generator circuit 1400. The noise generator circuit 1400 comprises a switch 1410 and a capacitor 3140 and is arranged such that when the switch 1410 state is changed from closed to open, the bias voltage VBIAS and kTC noise is sampled on the capacitor 1420. The bias voltage VBIAS may be set to be any voltage including a positive voltage, negative voltage or 0V. The switch 1410 may be any suitable type of controllable switch, for example a transistor such as a MOS type transistor, which may be of either p or n type depending on the level of VBIAS. The noise generator circuit 1400 further comprises a buffer 1430 that is configured to buffer the capacitor voltage $V_C$ to generate the buffered voltage 1415. The buffer may be of any suitable type, for example a source-follower.

FIG. 14B shows a further example implementation of the noise generator circuit 1400. It is of the same design as that shown in FIG. 14A, except it has a different type of buffer 1440. In this example, the buffer 1440 is a differential amplifier with negative feedback and may be of any suitable type, for example an op amp. Both buffer 1430 and buffer 1440 provide functionality to isolate the low capacitance circuit that precedes the buffer from potentially relatively high input capacitances at the readout unit 620 input. Consequently, it helps to maintain a small capacitance for generating the kTC noise, thereby increasing the size of the generated kTC noise. Furthermore, both buffer 1430 and buffer 1440 provide functionality to increase the drive strength of the kTC noise signal (i.e., the drive strength of the buffered voltage 1415 is greater than the capacitor voltage $V_C$), which makes it easier for the determination unit 170 to use the kTC noise in generating the random number. The primary difference between the two buffers 1430 and 1440 is that buffer 1430 may have a larger offset voltage than buffer 1440, but that offset voltage should be largely or entirely cancelled by double sampling the capacitor 1420 and by the operation of the readout unit 620, as described later.

Figure 14D:
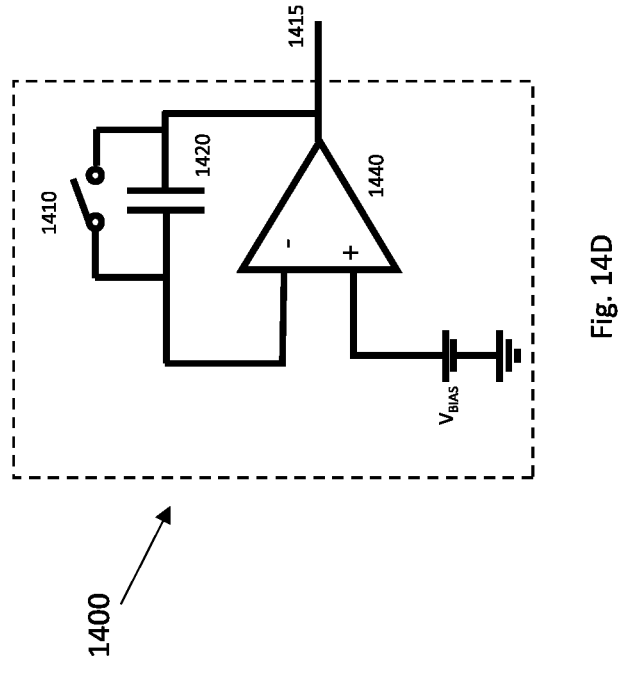
Figure 14C:
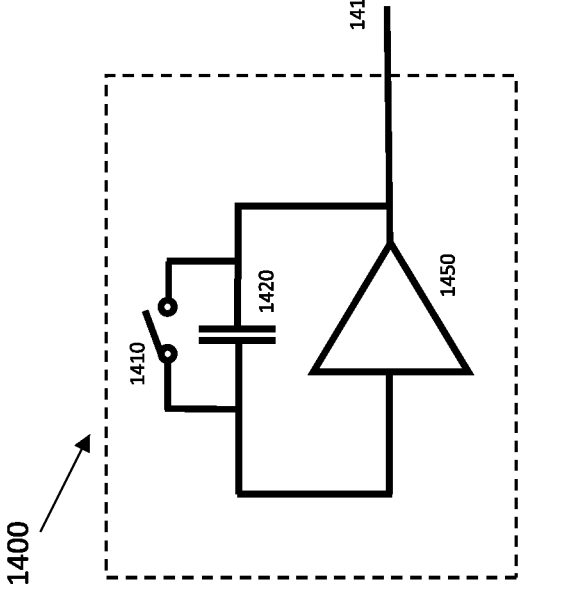

FIGS. 14C and 14D show further example implementations of the noise generator circuit 1400. In the implementation of FIG. 14C, a single ended amplifier 1450 (of any suitable type, for example a straightforward single stage common-source amplifier) is used. In the implementation of FIG. 14D, a differential amplifier 1440 is used. In both implementations, the noise generator circuit 1400 is configured such that the buffered output voltage 1415 is a gained up version of the capacitor voltage (which comprises kTC noise), where the gain is equivalent to the ratio of the input capacitance of the amplifier 1440/1450 to the capacitance of capacitor 1420.

Figure 14F:
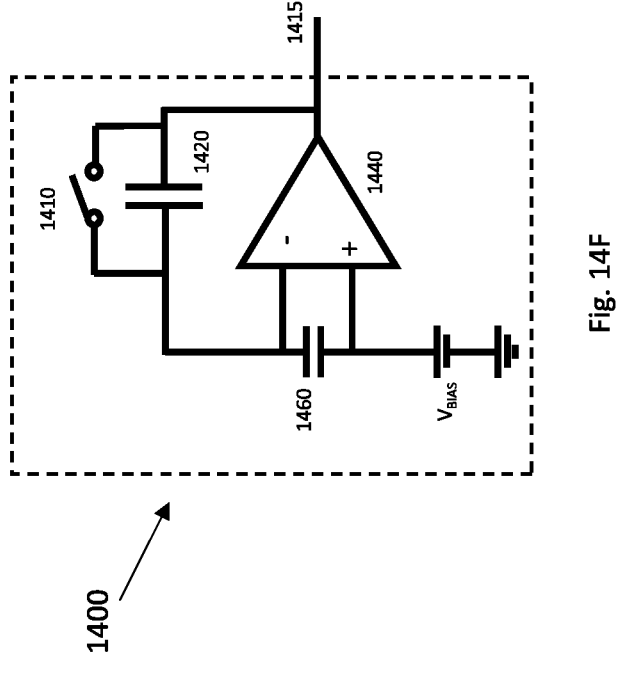
Figure 14E:
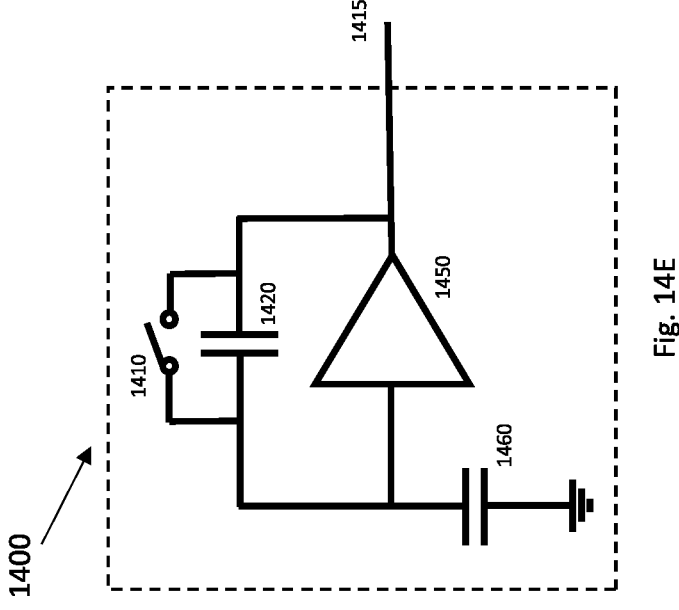
Figure 14G:
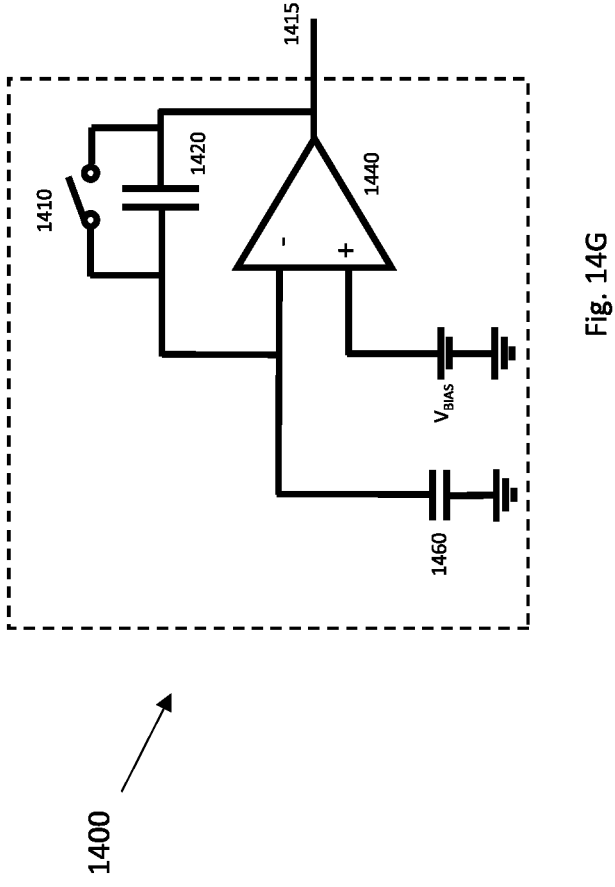

FIGS. 14E, 14F and 14G show further example implementations of the noise generator circuit 1400. These implementations are very similar to those of FIGS. 14C and 14D, except that they further include an additional capacitor 1460, which has a relatively large capacitance compared with the capacitor 1420 that is used for kTC noise generation. In all of these three implementations, the noise generator circuit 1400 is configured such that the buffered output voltage 1415 is a gained up version of the capacitor voltage (which comprises kTC noise), where the gain is equivalent to the ratio of the capacitance of capacitor 1460 to the capacitance of capacitor 1420.

The voltages in all of FIGS. 14A, 14B, 14D, 14E, 14F and 14G are shown relative to ground, but the circuits may alternatively be configured to use any other suitable reference voltage.

Figure 15:
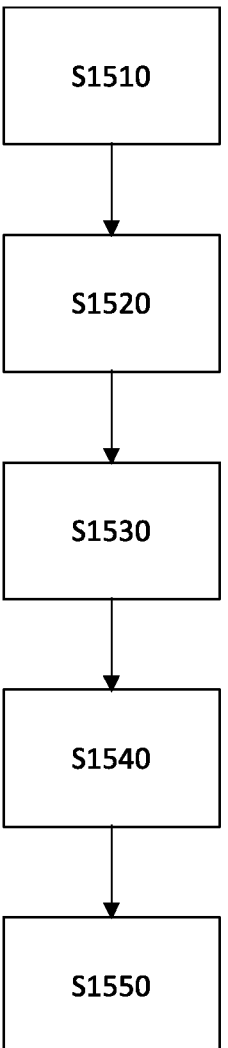
FIG. 15 shows an example diagram by which a dynamic random number may be generated in accordance with an aspect of the present disclosure.

FIG. 15 shows an example diagram by which a dynamic random number may be generated.

In Step S1510 at a first point in time, the noise generator circuit 1400 generates a first capacitor voltage across capacitor 1420, wherein the first capacitor voltage comprises first kTC noise. A first buffered voltage that is a buffered version of the first capacitor voltage is output from the noise generator circuit 1400. The noise generator circuit 1400 may be controlled to do this by controlling the state of the switch 1410 to change from a closed state to an open state. That control may be exercised, for example, by the selection unit 610, for example by transmitting control signals using the one or more RNG_ROW_SELECT control lines. The selection unit 610 or other control unit may take any suitable form that would be well understood by the skilled person, for example it may be implemented by a dedicated circuit/logic, or an FPGA, or a microcontroller or processor, or any other type of logic that is configured to control the state of the switch 1410.

In Step S1520, the readout circuit 620 reads the first buffered voltage from the noise generator circuit 1400. As explained in more detail below, this first buffered voltage may be sampled by the readout unit 620 or otherwise held/stored by the determination unit 170 for use later in generating the random number.

In Step S1530 at a second point in time subsequent to the first point in time, the noise generator circuit 1400 generates a second capacitor voltage across capacitor 1420, wherein the second capacitor voltage comprises second kTC noise. A second buffered voltage that is a buffered version of the second capacitor voltage is output from the noise generator circuit 1400. The noise generator circuit 1400 may be controlled to do this by first returning the state of the switch 1410 to a closed state and then at the second point in time changing the state of the switch 1410 from the closed state to an open state. Again, this control may be exercised in any suitable way, as explained above.

In Step S1540, the readout unit 620 reads the second buffered voltage from the noise generator circuit 1400. As explained in more detail below, this second buffered voltage may be sampled by the readout unit 620 or otherwise held/stored by the determination unit 170 for use later in generating the random number.

In Step S1550, a random number based on the first buffered voltage and the second buffered voltage may be generated.

Figure 16A:
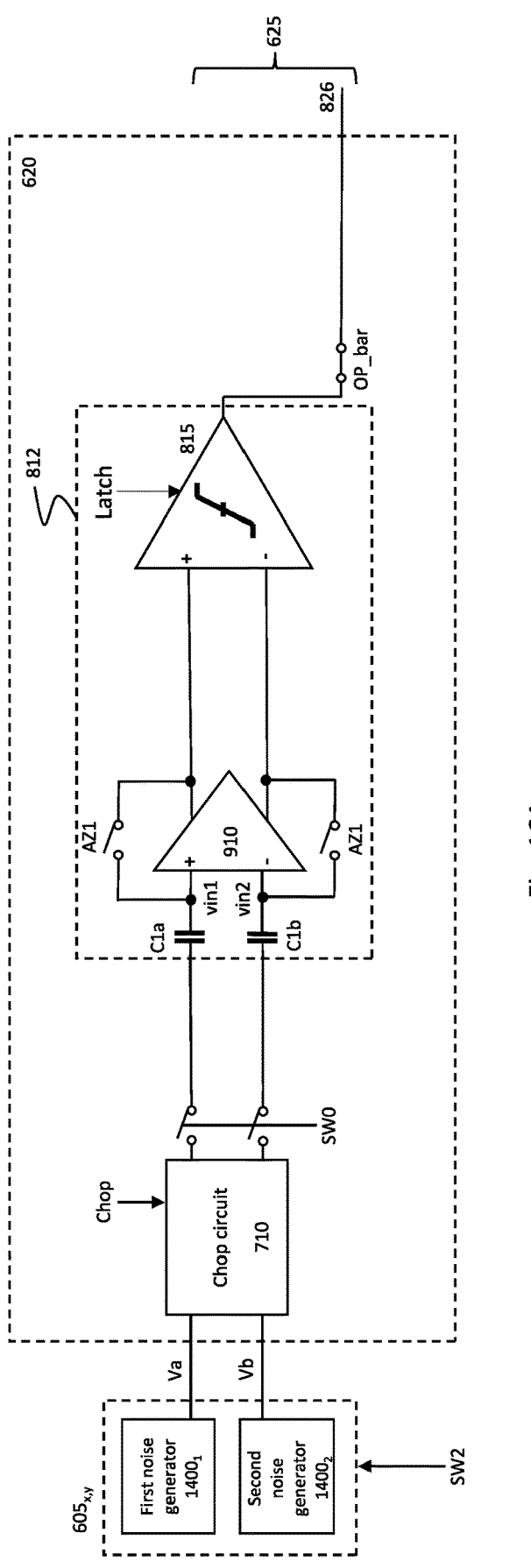
FIGS. 16A to 16C show example implementation and operation of a readout unit of the PUF apparatus/system of FIG. 6.

FIG. 16A shows an example implementation of a noise source, or RNG cell 605$_{x,y}$, and the readout unit 620 in order to demonstrate how the earlier described readout unit 620 can be used for generating a dynamic random number. The comparator 812 in this example has a single gain stage 910, but it could alternatively include multiple gain stages, such as two or more gain stages (for example, as shown in FIG. 12A). The switches controlled by signals SW1 and OP are held open throughout generation of the dynamic random number, so the ramp generator 805, the counter 820/1020 and the switches controlled by SW1 and OP are all omitted from this diagram for the sake of simplicity. In this example, the noise source (RNG cell 605$_{x,y}$) comprises two noise generator circuits—a first noise generator circuit 14001 and a second noise generator circuit 14002. The first and second noise generator circuits may be of identical design and may be implemented in any of the ways described earlier, for example those shown in FIGS. 14A-14G. Referring to the process described above with reference to FIG. 15, in Step S1510, at the first point in time, the first noise generator circuit 14101 may generate the first capacitor voltage across its capacitor 14201 (wherein the first capacitor voltage comprises first kTC noise) and the second noise generator circuit 14102 may generate a third capacitor voltage across its capacitor 14202 (wherein the third capacitor voltage comprises third kTC noise) by controlling their respective capacitor switches (for example, using control signal SW2, which is described in more detail later). The first buffered voltage Va is output from the first noise generator circuit 14101 and a third buffered voltage Vb is output from the second noise generator circuit 14102, such that the noise source outputs first and second noise signals. These two buffered voltage signals together form a first differential signal. The term "differential" is used in the present disclosure to include both true or fully differential (where the signals making up the differential signal are both produced by a single structure centred on a common voltage) and pseudo differential (where each of the two signals making up the differential signal are produced by differential structures not necessarily centred on a common mode voltage, but where the two structures are designed to have the same DC bias, as is the case in the example of FIG. 16A).

In Step S1520, the readout unit 620 reads the first differential signal from the first and second noise generator circuits and samples the first differential signal using the sampling capacitors of the pre-amp 810.

In Step S1530 at the second point in time subsequent to the first point in time, the first noise generator circuit 14001 generates the second capacitor voltage across its capacitor 14201 (wherein the second capacitor voltage comprises second kTC noise) and the second noise generator circuit 14002 generates a fourth capacitor voltage across its capacitor 14202 (wherein the fourth capacitor voltage comprises fourth kTC noise) by controlling their respective capacitor switches, as described earlier. The second buffered voltage Va is output from the first noise generator circuit 14001 and a fourth buffered voltage Vb is output from the second noise generator circuit 14002. These two buffered voltage signals together form a second differential signal.

In Step S1540, the readout unit 620 reads the second differential signal from the first and second noise generator circuits and compares it to the earlier sampled first differential signal (explained in more detail later).

In Step S1550, the readout unit 620 outputs a random number in the form of the single-bit value 826 that is a measure of a difference between the first differential signal and the second differential signal. In other words, the comparator 812 output is a coarse conversion or quantisation of the difference between the first differential signal and the second differential signal and is indicative of the sign of the difference between the first differential signal and the second differential signal (e.g., indicative of whether the first differential signal is greater or lesser than the second differential signal). Since the first and second differential signals should both be random and centred around the same common voltage, there should be a substantially equal likelihood that the difference between them is positive or negative, such that the measurement 826 is a 1-bit dynamic random number.

Figure 16B:
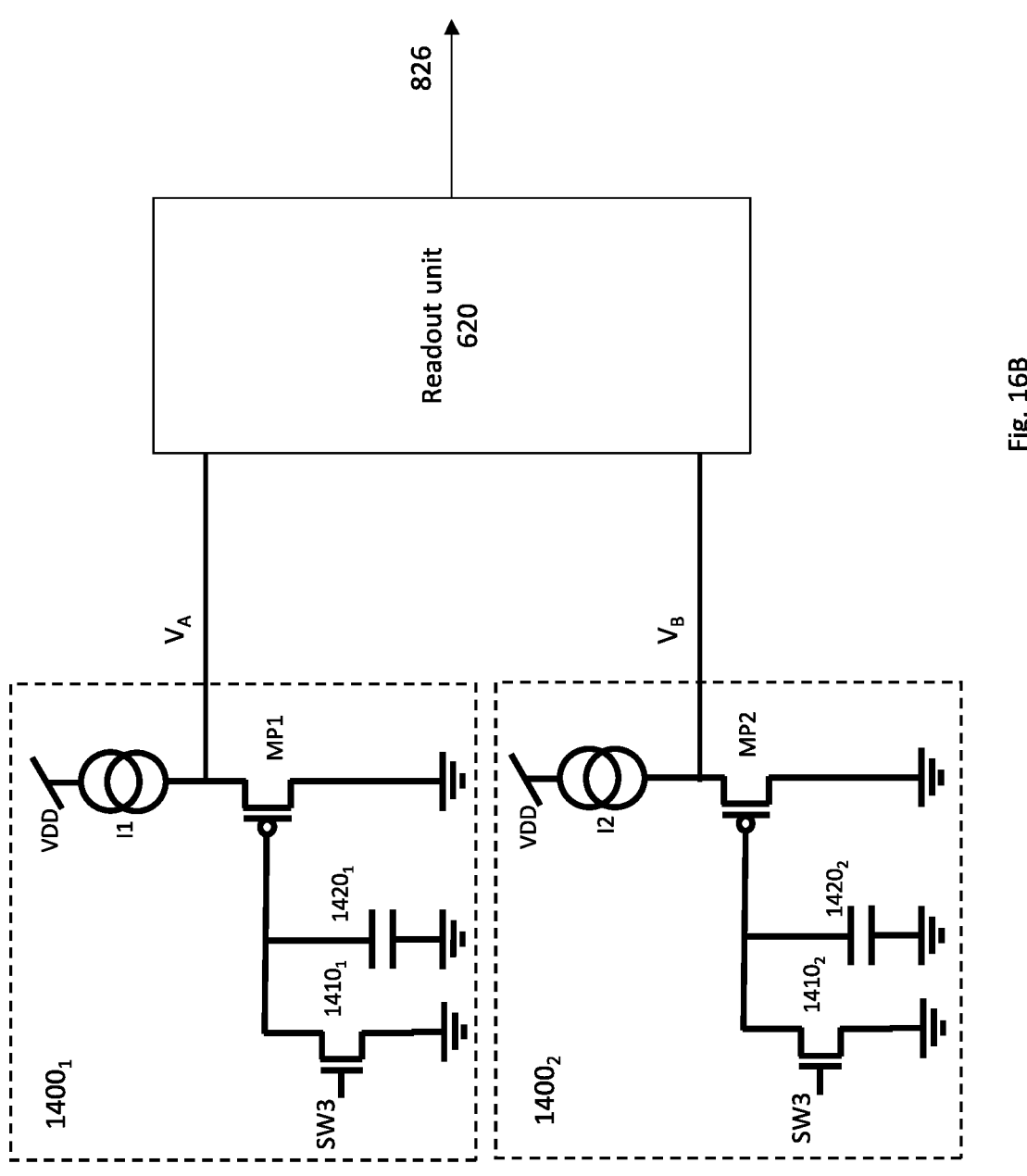

FIG. 16B shows an example implementation of the first and second noise generators 14001 and 14002, although it will be appreciated that for each noise generator any other suitable configuration may be used where a capacitor voltage comprising kTC noise can be generated and a buffered signal output (for example any of the implementations of FIGS. 14A-14F, or any other suitable implementation), or indeed any other suitable type of circuit configured to generate and output noise signals. The switch 1410 of each of the noise generators is implemented using a FET, the state of which is controlled by control signal SW. The buffer of each of the noise generators is implemented using the respective current sources I1 and I2 and the respective FETs MP1 and MP2. Differences in the components of each of the noise generators may contribute to undesirable signal components within the buffered voltages $V_A$ and $V_B$ that might reduce the randomness of the number generated using the buffered voltage $V_A$ and $V_B$. For example, each of the generated capacitor voltages may have slightly different DC offsets owing to differences in the switches 1410$_1$ and 1410$_2$ and/or differences in the capacitors 1420$_1$ and 1420$_2$, which would carry through to the buffered output voltages $V_A$ and $V_B$. Additionally, or alternatively, each of the buffers may have a different offset owing to component differences, which would result in an offset between the buffered output voltages $V_A$ and $V_B$. However, because the differential signal at a first point in time (the first differential signal) is compared to the differential signal at the signal point in time (the second differential signal) in order to generate the random number, and each of those differential signals should have the same or very similar offset components, those undesirable signals may be significantly reduced or entirely cancelled, leaving only the kTC noise which is useful for random number generation.

In FIGS. 16A and 16B, the two noise generation circuits 14001 and 14002 are represented as differential structures not necessarily centred on a common mode voltage, such that the signals $V_A$ and $V_B$ together form a pseudo differential signal. However, they could alternatively be configured such that the signals $V_A$ and $V_B$ together form a true/fully differential signal. For example, rather than using a separate buffer for each kTC capacitor 1420, a single differential buffer could be used with the capacitor voltage (comprising kTC noise) of each of capacitors 1420$_1$ and 1420$_2$ being received at respective inputs to the differential buffer. The skilled person will readily appreciate various different types of suitable differential buffers that may be used. In this case, the first and second noise generator circuits may be considered together to comprise first and second capacitors 1420$_1$ and 1420$_2$ and a differential buffer configured to output a differential signal based on the capacitor voltages of the first and second capacitors 1420$_1$ and 1420$_2$.

Figure 16C:
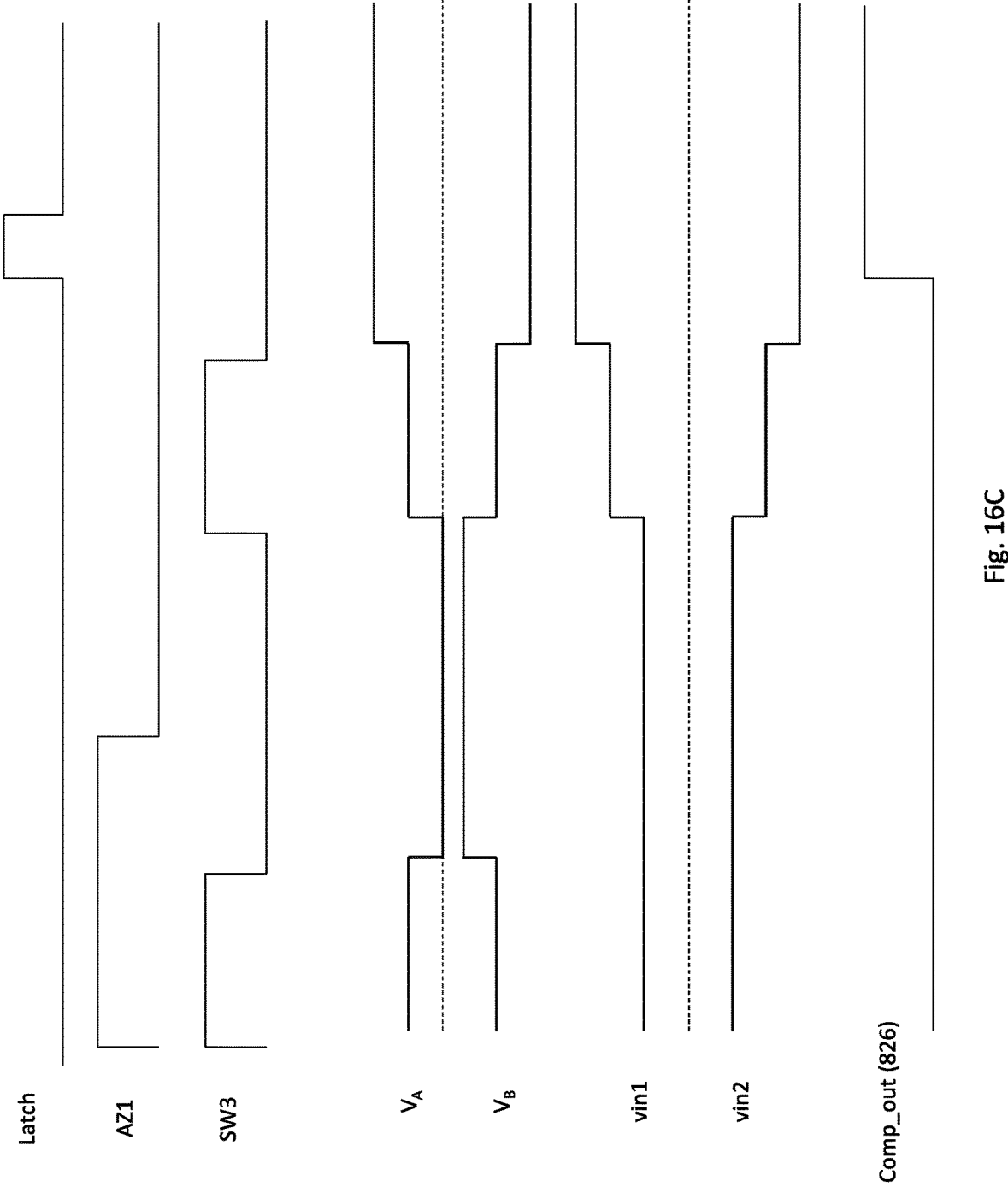

FIG. 16C shows a timing diagram representing an example operation of the PUF apparatus 100 when operating in the dynamic random number mode. Throughout the operation, the switches controlled by SW0 may be closed and the switches controlled by signals SW1 and OP may be open. Furthermore, the chop circuit 710 is not utilised during the operation, so the Chop control signal may remain unchanged throughout. Initially, in Step S1510, the autozero switches AZ1 are closed, in an autozeroing state and the switches of the noise generators 14001 and 14002 are closed, to couple the first buffered differential signal to the auto-zeroing pre-amp. At step S1520, the switch signal SW3 then goes low, so that the first buffered differential signal is sampled by capacitors C1$a$ and C1$b$. Example differential signals $V_A$ and $V_B$, and vin1 and vin2, are shown in FIG. 16C. It will be appreciated that these are merely one example and that their magnitudes and relative polarity may vary depending on the kTC noise in the signals output by the noise generator circuits. The sampled first differential signal comprises a difference between the kTC noise generated by the first noise generator circuit 1400$_1$ and the kTC noise generated by the second noise generator circuit 1400$_2$ in the first switching event of the noise generator capacitors, as well as any DC offsets between the two signals making up the differential signal (for example, caused by one or more of low-frequency noise, offsets in the driving voltages of the noise generator circuits, offsets caused by the buffers of the noise generator circuits, etc).

Subsequent to that, the autozero state ends by opening the autozero switches AZ1, at Steps S1530 and S1540 the noise generator circuits are reset by closing the switches controlled by signal SW3 and then subsequently opened again so that a second switching event in the noise generator circuits takes place, to generate new kTC noise in their capacitors, and the second buffered differential voltage is output from the noise generator circuits. The second buffered differential voltage comprises a difference between the kTC noise generated by the first noise generator circuit $1400_1$ and the kTC noise generated by the second noise generator circuit $1400_2$ in the second switching event of the noise generator capacitors, as well as any DC offsets between the two signals making up the differential signal. The second buffered differential signal is sampled onto the capacitors C1a and C1b. Consequently, because the first and second buffered differential signals are both sampled onto the capacitors C1a and C1b without any reset of the capacitors C1a and C1b, and both sampled signals include the same (or substantially the same) DC components, the differential signal at the input to the comparison stage 815 represents an amplified version of the difference between the first buffered differential voltage and the second buffered differential voltage. Consequently, the signal at the input to the comparison stage 815 comprises a difference between the differential voltage of the kTC noise generated by the first noise generator circuit $1400_1$ the second noise generator circuit $1400_2$ in the first switching event, and the differential voltage of the kTC noise generated by the first noise generator circuit $1400_1$ the second noise generator circuit $1400_2$ in the second switching event. The output of the comparison stage 815 is indicative of the polarity of the differential signal at its input, which in turn indicates whether the combined kTC noise generated by the first noise generator $1400_1$ by its two switched capacitor kTC events is greater than or less than the combined kTC noise generated by the second noise generator $1400_2$ by its two switched capacitor kTC events. Therefore, the output of the comparator 812 will be randomly 0 or 1. At Step S450, the comparison stage 815 is optionally latched such that its output Comp_out is held at the output. In this case, the latch value of Comp_out is the measurement 826, which is also the 1-bit random number 125.

By performing auto-zeroing in this way, residual offset of the pre-amp and also offset voltages between the two buffers of the two noise generation circuits may be significantly reduced. This may help to reduce any bias in the random number, thereby improving the randomness of the number. Furthermore, autozeroing in this way may also help to reduce 1/f noise in the signal at the input of the comparator 815.

In the examples of FIGS. 16A-16C, by considering a differential voltage signal made up of the outputs of two identical noise generation circuits, at least some DC components in the signals $V_A$ and $V_B$ should be cancelled out so that the differential signal comprises kTC noise and any offset between the buffers of the noise generator circuits (which is then subsequently cancelled by determining the random number based two kTC noise events from each of the noise generator circuits—i.e., by determining the random number using the first and second differential signals).

Optionally, the comparison stage 815 may not be configured to be latching, such that its output is simply set based on a comparison of its input voltages at that time. Additionally or alternatively, there may be a set/reset (SR) latch at the output of the comparator 812 to hold the output value of the comparator 812 (or it may alternatively be held in any other suitable way, such as using memory). Furthermore, the comparison stage 815 output may be single ended or differential, as explained earlier.

It will be appreciated that a multi-bit dynamic random number may be generated by having a plurality of readout units 520x and a plurality of RNG cells 605x as represented in FIG. 6. The readout units 625x may be operated as described above such that each measurement 625x output by the readout units 620x is a single-bit 826x having a random value, wherein each of those single bits 826x is used as a bit in the multi-bit dynamic random number. Consequently, readout units 6201 used for reading out signals from PUF cells 105 when the apparatus is operating in a PUF mode may also be used for reading out signals from RNG cells 605 when the apparatus is operating in the dynamic random number mode. Therefore, the PUF apparatus 100 may also have dynamic random number generation functionality without requiring any additional readout circuitry, simply by including one or more noise sources (RNG cells 605) within the apparatus and by operating the apparatus in the way described above. Since both the generation of dynamic random numbers and the generation PUF outputs are very useful in device and/or data security, having an apparatus 100 that is capable of performing both functions at very limited additional component and size cost may be of great benefit.

A further benefit related to the dynamic random number mode is that protection against a third party attack, such as a side channel attack, on the PUF apparatus may be enhanced. For example, a third party may seek to affect the apparatus that results in it generating a dynamic random number that is of the third party's choosing, rather than a genuine dynamic random number. In one example, the third party may attempt to alter the operation of the PUF apparatus so that it outputs a dynamic random number that is all 0s or all 1s, which they may attempt to do by modifying the power supply levels of the PUF apparatus and/or focusing EM waves, such as laser light, of particular frequency on the PUF apparatus. Such side-channel attacks are typically intended to alter the operation of the readout circuitry in a way that results in the generation of a particular dynamic random number that is desired by the third party. By doing so, cryptographic operations that are performed using the dynamic random number, for example to hash/hide sensitive private keys such as the PUF output, may become predictable such that the private key is exposed. However, attacking the PUF apparatus to affect the way in which the dynamic random number is generated should also affect the PUF output generated by the apparatus. For example, if the third party affects the readout circuitry in a way that result in the circuitry reading out all 0s or all 1s, that may also result in any PUF output generated by the readout circuitry being all 0s or all 1s. Consequently, even if the third party is successful in attacking the dynamic random number in such a way that the cryptographic operations performed on the PUF output become ineffective and expose the PUF output, the PUF output should be incorrect anyway so the third party would have learnt nothing of use.

With this in mind, the PUF apparatus may optionally be configured to switch between the dynamic random number mode and a PUF generation mode periodically or intermittently so that side-channel attacks may be rendered ineffective. The PUF apparatus may be configured to make it difficult to predict when it will switch between the two modes, for example switching intermittently based on time or number of PUF outputs generated since the last dynamic random number, etc. This makes it more difficult for the third party to cease their attack when it is likely the apparatus will switch to the PUF generation mode. Additionally, or alternatively, the PUF apparatus may be configured such that rather than having a dedicated RNG row, the RNG cells 605x may be interspersed within the PUF cell rows. In this way, whenever a PUF row is selected and readout, the row will include RNG cells 605x such that an attack on the apparatus that is intended to affect the dynamic random number would inevitably affect the PUF output as well. Alternatively, the selection unit 610 may be configured to select cells on a per-cell basis, rather than a per-column basis, and for each readout operation may be configured to select a number of RNG cells 605x and a number of PUF cells 105, so that again for each readout operation both PUF values and dynamic random number values are generated.

In summary, the PUF apparatus 100 disclosed herein may be controllable to operate in at least two different modes, including: PUF coarse-measurement mode; PUF fine-measurement mode; PUF self-checking mode; and dynamic random number mode. Consequently, the PUF apparatus 100 can be operated in a variety of different ways using a single readout unit/circuit. This means that the PUF apparatus 100 may operate very flexibly over its lifetime, without incurring additional component and space costs and complexity.

In a further alternative implementation, the PUF apparatus 100 may be configured to operate in only one of these modes. For example, the operation in the fine-measurement mode results in significant improvements in the accuracy of measurement of Va–Vb. This means that the accuracy of any subsequent process that uses the measurement of Va–Vb (for example, using it for generating a PUF value, or using it for performing enrolment and/or health-checking), should also be improved. Therefore, implementing a PUF apparatus that can measure Va–Vb only in the way described above with reference to the fine-measurement mode should still be beneficial.

The skilled person will readily appreciate that various alterations or modifications may be made to the above described aspects of the disclosure without departing from the scope of the disclosure.

For example, the PUF apparatus 100 is shown as having a plurality of PUF cells, each having a pair of matched devices (which may each have a single component, or multiple components arranged together to form a complex device, such as an oscillator or string of logic gates). The one or more PUF cells may together be referred to as a PUF source, configured to output a first signal (e.g., a first voltage) and a second voltage (e.g., a second voltage) that is indicative of a random manufacturing difference between components within the PUF source. However, rather than having one or more PUF cells, the PUF apparatus 100 may instead have a PUF source that comprises a plurality of reconfigurable pairs of matched devices. For example, if there are three matched transistors, the first two transistors may represent a first pair, the second two transistors may represent a second pair and the first and third transistors may represent a third pair. The determination unit 170 may be configured to select, at a particular time, which of the devices are to make up the matched pair and the readout unit 520 then generate a PUF value using that selected pair, or perform self-enrolment of that selected pair, in any of the ways described herein with reference to FIGS. 6 to 12.

Furthermore, rather than having a plurality of PUF cells 105 arranged in a matrix and a plurality of readout units 620, as shown in FIGS. 5B and 6, the PUF apparatus 100 may comprise a single readout unit 620 and a plurality of PUF cells (or plurality of pairs of devices that are arranged other than as PUF cells, for example as described above), wherein each of the PUF cells 105 are read by the readout unit 620 in series, in order to generate a multi-bit PUF out. Alternatively, there may be a plurality of readout units 620 and the number of readout units may be the same as the number of PUF cells 105.

Whilst in the above disclosure, the signals output from the PUF cells 105 and the RNG cells 605 are voltage signals Va and Vb, the PUF apparatus may 100 alternatively be configured such that the PUF cells 105 and the RNG cells 605 output signals of a different type, for example current signals or charge signals. In this case, the readout unit 620 may be configured to determine a measure of the difference between the two signals that it receives.

The terminology "coupled" used above encompasses both a direct electrical connection between two components, and an indirect electrical connection where the two components are electrically connected to each other via one or more intermediate components.

Whilst in the particular examples described above, the readout unit 620 may be configured to operate as a slope-converter when the PUF apparatus 100 is operating in the PUF fine-measurement mode or the PUF self-checking mode, in an alternative it may comprise the circuits and components required to operate as a SAR converter, rather than a slope-converter. The skilled person will readily understand the operation of a SAR converter, so the operation shall not be described further. When implemented as a SAR converter, rather than having a ramp generator 805 and counter 820, the PUF apparatus 100 may instead have a DAC and SAR controller (such as a counter outputting a digital value to the DAC), wherein an ADC is formed by the DAC, SAR controller and the comparator 812. In this case, when operating in the PUF fine-measurement mode or the PUF self-checking mode, the PUF apparatus may be configured to couple the DAC output to the comparator 812 input and operate the SAR controller so that a multi-bit digital measurement of Va–Vb is determined by the SAR ADC. When operating in the PUF coarse-measurement mode or the dynamic random number mode, the DAC may be decoupled from the comparator 812 input (for example, by controlling switches that couple/decouple the DAC output and the comparator 812 input), and the SAR controller and DAC may be switched off. The readout unit may then be operated exactly as described above with reference to FIGS. 12 and 16.

ASPECTS OF THE DISCLOSURE

Example aspects of the disclosure are set out in the following non-limiting clauses:

Clause 1: A physical unclonable function, PUF, apparatus, comprising: a PUF source for outputting a first signal and a second signal, wherein a difference between the first signal and the second signal is indicative of a random manufacturing difference between components in the PUF source; and an analog to digital converter, ADC, for coupling to the PUF source; wherein the PUF apparatus is configured to operate in a plurality of different modes comprising at least a PUF coarse-measurement mode and a PUF fine-measurement mode, and wherein when operating in the PUF coarse-measurement mode and when operating in the PUF fine-measurement mode, the PUF apparatus is configured to: use the ADC to generate a digital measurement that is a measure of the difference between the first signal and the second signal; and generate a PUF value using the digital measurement, and wherein when the PUF apparatus is operating in the PUF fine-measurement mode, the digital measurement has a greater resolution than when operating in the PUF coarse-measurement mode.

Clause 2: The PUF apparatus of clause 1, wherein when operating in the PUF fine-measurement mode, the digital measurement is a multi-bit value indicative of a sign and magnitude of the difference between the first signal and the second signal.

Clause 3: The PUF apparatus of clause 1 or 2, wherein when operating in the PUF coarse measurement mode, the digital measurement is a single-bit value indicative of a sign of the difference between the first signal and the second signal.

Clause 4: The PUF apparatus of any of clauses 1-3, wherein the ADC comprises a comparator that is used in both the PUF coarse-measurement mode and the PUF fine-measurement mode to generate the digital measurement.

Clause 5: The PUF apparatus of any of clauses 1-4, wherein when operating in the PUF coarse-measurement mode, the ADC is configured to operate as a single-bit quantizer that sets a value of the single-bit based on a relative size of the first signal and the second signal.

Clause 6: The PUF apparatus of any of clauses 1-5, wherein when operating in the PUF fine-measurement mode, the PUF apparatus is configured to: perform, using the ADC, a first digital conversion to generate a first digital value indicative of a difference between the first signal and the second signal; perform, using the ADC, a second digital conversion to generate a second digital value indicative of a difference between the second signal and the first signal; and generate the digital measurement using the first digital value and the second digital value.

Clause 7: The PUF apparatus of clause 6, wherein the digital measurement is generated by combining the first digital value and the second digital value in such a way that a systematic error component in the first digital value and the second digital value is reduced or substantially cancelled out.

Clause 8: The PUF apparatus of clause 6 or clause 7, further comprising a chop circuit coupled to a first input and a second input of the ADC, and wherein the first digital conversion is performed with the first chop circuit coupling the first signal to the first input of the ADC and coupling the second signal to the second input of the ADC, and wherein the second digital conversion is performed with the chop circuit coupling the first signal to the second input of the ADC and coupling the second signal to the first input of the ADC.

Clause 9: The PUF apparatus of any of clauses 1-8, wherein the ADC comprises: a ramp generator configured to generate at least one ramp signal that increases or decreases over time, and a comparator whose two inputs form the first and second input of the ADC, wherein when operating in the PUF fine-measurement mode, the ADC is configured to operate as a ramp-ADC and the at least one ramp signal is applied to at least one of the comparator inputs.

Clause 10: The PUF apparatus of clause 9, wherein the at least one ramp signal comprises: a ramp-up signal that increases over a period of time from a lower value to a higher value; and a ramp-down signal that decreases over the period of time from the higher value to the lower value, wherein when operating in the PUF fine-measurement mode, the ramp-up signal is applied to one of the comparator inputs and the ramp-down signal is applied to the other of the comparator inputs.

Clause 11: The PUF apparatus of clause 9 or clause 10, wherein when operating in the fine-measurement mode: the PUF source is further configured to output a third signal and a fourth signal, where a difference between the third signal and the fourth signal is indicative of a random manufacturing difference between further components in the PUF source, and the PUF apparatus further comprises a further ADC coupled to the PUF source to receive the third signal and the fourth signal, wherein the further ADC comprises: the ramp generator; and a further comparator coupled to the ramp generator for applying the at least one ramp signal to at least one input of the further comparator, wherein the further ADC is configured to operate as a ramp-ADC in parallel with the ADC and generate a further digital measurement that is a measure of the difference between the third signal and the fourth signal.

Clause 12: The PUF apparatus of any of clauses 9 to 11, wherein when operating in the PUF fine-measurement mode, the PUF apparatus is configured to: perform, using the ADC, a first digital conversion to generate a first digital value; perform, using the ADC, a second digital conversion to generate a second digital value; and generate the digital measurement using the first digital value and the second digital value.

Clause 13: The PUF apparatus of clause 12, wherein a difference between the higher value and the lower value is a full scale of the ramp generator, and wherein one of the first digital value and the second digital value is a measure of a difference between the first signal and the second signal equal to the full scale of the ramp generator less a measure of the difference between the second signal and the first signal.

Clause 14: The PUF apparatus of clause 13, wherein the digital measurement is generated by summing the first digital value and the second digital value such that the digital measurement is indicative of the full scale of the ramp generator plus twice the difference between the first signal and the second signal.

Clause 15: The PUF apparatus of any of clauses 9 to 14, wherein the ADC further comprises a counter, and wherein when operating in PUF fine-measurement mode: the ramp-generator receives a clock signal for use in generating the at least one ramp signal, and the counter counts the clock signal when an output of the comparator is a particular value, wherein the digital measurement is generated using the count of the counter.

Clause 16: The PUF apparatus of clause 15 when dependent on any of clauses 12 to 14, wherein the first digital value corresponds to a number of clock cycles counted by the counter during the first digital conversion, and the second digital value corresponds to a number of clock cycles counted by the counter during the second digital conversion.

Clause 17: The PUF apparatus of clause 16, wherein the counter is configured to count the clock signal during the first digital conversion when the output of the comparator is a first value and count the clock signal during the second digital conversion when the output of the comparator is a second value.

Clause 18: The PUF apparatus of clause 16 or clause 17, wherein the ADC is configured to generate the digital measurement by operating the counter to cumulatively count between the first and the second digital conversions, wherein a counted value at the end of the second digital conversion is the digital measurement.

Clause 19: The PUF apparatus of any of clauses 15 to 18, wherein the counter is a complimentary counter comprising a first counter and a second counter, wherein when the PUF apparatus is operating in PUF fine-measurement mode, during a digital conversion the second counter is configured to count the clock signal whenever the first counter is not counting the clock signal.

Clause 20: The PUF apparatus of any of clauses 1-19, wherein the PUF source comprises a plurality of PUF cells, wherein each PUF cell comprises a pair of devices and when operating in the PUF coarse-measurement mode or the PUF fine-measurement mode, the PUF cell is configured to output a respective first signal and second signal indicative of a random manufacturing difference between the pair of devices.

Clause 21: The PUF apparatus of clause 20, wherein the ADC is selectively coupled to any one of a first PUF cell of the plurality of PUF cells and a second PUF cell of the plurality of PUF cells, such that when the ADC is coupled to the first PUF cell the digital measurement is a measure of the difference between the first signal and the second signal output by the first PUF cell, and when the ADC is coupled to the second PUF cell the digital measurement is a measure of the difference between the first signal and the second signal output by the second PUF cell.

Clause 22: The PUF apparatus of clause 20, wherein the ADC is coupled to a third PUF cell of the plurality of PUF cells and the digital measurement is a measure of the difference between the first signal and the second signal output by the third PUF cell, and wherein the PUF apparatus further comprises a further ADC coupled to a fourth PUF cell of the plurality of PUF cells and configured to generate a further digital measurement that is a measure of a difference between the first signal and the second signal output by the fourth PUF cell, and wherein the ADC and the further ADC are configured to operate in parallel.

Clause 23: The PUF apparatus of any of clauses 1-22, further comprising a noise source for outputting a first noise signal and a second noise signal, wherein the ADC configured for selective coupling to either one of the noise source and the PUF source, wherein the plurality of different modes further comprises a dynamic random number mode, and wherein when operating in the dynamic random number mode, the PUF apparatus is configured to: use the ADC to generate a dynamic random number using the first noise signal and the second noise signal.

Clause 24: The PUF apparatus of clause 23, wherein the ADC comprises a comparator, and wherein when operating in the dynamic random number mode, the ADC is configured to use the comparator for generating the dynamic random number; and wherein when operating in the PUF coarse-measurement mode and when operating in the PUF fine-measurement mode, the ADC is configured to use the comparator for generating the digital measurement.

Clause 25: The PUF apparatus of clause 23 or clause 24, wherein the PUF apparatus further comprises a selection circuit configured to: control the noise source to output the first noise signal and the second noise signal when the PUF apparatus is operating in the dynamic random number mode; and control the PUF source to output the first signal and the second signal when the PUF apparatus is operating in the PUF coarse-measurement mode and when the PUF apparatus is operating in the PUF fine-measurement mode.

Clause 26: The PUF apparatus of any of clauses 1-25, wherein the PUF source comprises a pair of devices where the first signal and second signal are indicative of a random manufacturing difference between the pair of devices pair, and wherein the plurality of different modes further comprises a PUF self-checking mode, and wherein when operating in the PUF self-checking mode, the PUF apparatus is configured to: use the ADC to generate the digital measurement, wherein the digital measurement is indicative of a magnitude of the difference between the first signal and the second signal; and determine whether the magnitude of the difference between the first signal and the second signal is greater or less than a PUF stability threshold.

Clause 27: The PUF apparatus of clause 26, wherein when operating in the PUF self-checking mode the PUF apparatus is configured to record that the pair of devices are unsuitable for use in generating a PUF value when the magnitude of the difference between the first signal and the second signal is less than the PUF stability threshold.

Clause 28: The PUF apparatus of clause 26 or clause 27, wherein when operating in the PUF self-checking mode the PUF apparatus is configured to generate a status-report based on whether the magnitude of the difference between the first signal and the second signal is greater or less than a PUF stability threshold, wherein the status-report is indicative of a likelihood of the PUF apparatus generating a persistent PUF output.

Clause 29: The PUF apparatus of any of clauses 26-28, wherein the ADC comprises a complimentary counter comprising a first counter and a second counter, wherein a number counted by the first counter is equal to a sum of: a first value indicative of a sign and magnitude of a difference between the first signal and the second signal; and an additional threshold count corresponding to the stability threshold; and wherein a number counted by the second counter is equal to a sum of: a third value indicative of a sign and magnitude of a difference between the second signal and the first signal; and the additional threshold count, wherein if the number countered by the first counter is of the same sign as the number counted by the second counter, the magnitude of the difference between the first signal and the second signal is less than a PUF stability threshold, and wherein if the number countered by the first counter is of a different sign to the number counted by the second counter, the magnitude of the difference between the first signal and the second signal is greater than a PUF stability threshold.

Clause 30: A system comprising: a pair of matched electrical devices; a noise source configured to generate an electrical signal comprising random noise; and a determination circuit configured to, when the system is operating in a physical unclonable function, PUF, mode: generate, using the pair of matched electrical devices, a first electrical signal that is indicative of a random manufacturing difference between the pair of matched electrical devices; and generate a PUF value based on the first electrical signal, and wherein the determination circuit is further configured to, when the system is operating in a dynamic random number mode: generate, using the noise source, a second electrical signal comprising random noise; and generate a dynamic random number using the second electrical signal.

Clause 31: The system of clause 30, wherein the determination circuit comprises a comparator for use in generating the PUF value when the system is operating in the PUF mode, and for use in generating the dynamic random number when the system is operating in the dynamic random number mode.

Clause 32: The system of clause 31, wherein the determination circuit is configured, when the system is operating in the PUF mode, to couple an input of the comparator to the pair of matched electrical devices such that the comparator receives the first electrical signal; and wherein the determination circuit is configured, when the system is operating in the dynamic random number mode, to couple the input of the comparator to the noise source such that the pre-amplifier receives the second electrical signal.

Clause 33: The system of any of clauses 30 to 32, wherein when the system is operating in the PUF mode, the determination circuit is configured to determine a measure of the first electrical signal and generate the PUF value using the measure of the first electrical signal, and wherein when the system is operating in the dynamic random number mode, the determination circuit is configured to determine a measure of the second electrical signal and generate the dynamic random number using the measure of the second electrical signal.

Clause 34: The system of clause 33, wherein the measure of the first electrical signal is a digital value indicative of a sign of the first electrical signal, and wherein the measure of the second electrical signal is a digital value indicative of a sign of the second electrical signal.

Clause 35: The system of any of clauses 30 to 34, wherein each electrical device making up the pair of match devices comprises at least one electrical component.

Clause 36: The system of any of clauses 30 to 35, wherein the first signal is a differential or pseudo-differential signal, and wherein the second signal is a differential or pseudo-differential signal.

Clause 37: A physical unclonable function, PUF, system, comprising: a pair of matched devices; and a determination circuit coupled to the pair of matched devices, wherein when the system is operating in an enrolment mode, the determination circuit is configured to: determine whether a magnitude of a random manufacturing difference between the pair of matched devices exceeds a stability threshold; mark the pair of matched devices as suitable for use in generating a PUF value if the magnitude of the random manufacturing difference exceeds the stability threshold; and mark the pair of matched devices as unsuitable for use in generating a PUF value if the magnitude of the random manufacturing difference is less than the stability threshold, and wherein when the system is operating in a PUF mode and the pair of matched devices are marked as suitable for use in generating a PUF value: determine a measure of the random manufacturing difference between the pair of matched devices; and generate the PUF value using the measure of the random manufacturing difference between the pair of matched devices.

Clause 38: The PUF system of clause 37, wherein the determination circuit comprises a comparator for use in determining the magnitude of the random manufacturing difference when the system is operating in the enrolment mode and for use in determining the measure of the random manufacturing difference when the system is operating in the PUF mode.

Clause 39: The PUF system of clause 37 or clause 38, configured to operate in the enrolment mode intermittently or periodically throughout the life of the PUF system.

The invention claimed is:

1. A physical unclonable function, PUF, apparatus, comprising:

a PUF source for outputting a first signal and a second signal, wherein a difference between the first signal and the second signal is indicative of a random manufacturing difference between components in the PUF source; and an analog to digital converter, ADC, for coupling to the PUF source;

wherein the PUF apparatus is configured to operate in a plurality of different modes comprising at least a PUF coarse-measurement mode and a PUF fine-measurement mode, wherein the ADC comprises a comparator that is used in both the PUF coarse-measurement mode and the PUF fine-measurement mode to generate a digital measurement, and wherein when operating in the PUF coarse-measurement mode and when operating in the PUF fine-measurement mode, the PUF apparatus is configured to:

use the comparator to generate the digital measurement that is a measure of the difference between the first signal and the second signal; and generate a PUF value using the digital measurement, wherein when the PUF apparatus is operating in the PUF fine-measurement mode, the digital measurement has a greater resolution than when operating in the PUF coarse-measurement mode; and wherein when operating in the PUF coarse-measurement mode, the comparator is configured to operate as a single-bit quantizer that sets a value of the single-bit based on a relative size of the first signal and the second signal.

2. The PUF apparatus of claim 1, wherein when operating in the PUF fine-measurement mode, the digital measurement is a multi-bit value indicative of a sign and magnitude of the difference between the first signal and the second signal.

3. The PUF apparatus of claim 1, wherein when operating in the PUF coarse-measurement mode, the digital measurement is a single-bit value indicative of a sign of the difference between the first signal and the second signal.

4. The PUF apparatus of claim 1, wherein when operating in the PUF fine-measurement mode, the PUF apparatus is configured to:

perform, using the ADC, a first digital conversion to generate a first digital value indicative of a difference between the first signal and the second signal;

perform, using the ADC, a second digital conversion to generate a second digital value indicative of a difference between the second signal and the first signal; and generate the digital measurement using the first digital value and the second digital value.

5. The PUF apparatus of claim 4, wherein the digital measurement is generated by combining the first digital value and the second digital value in such a way that a systematic error component in the first digital value and the second digital value is reduced or substantially cancelled out.

6. The PUF apparatus of claim 4, further comprising a chop circuit coupled to a first input and a second input of the ADC, and wherein the first digital conversion is performed with the first chop circuit coupling the first signal to the first input of the ADC and coupling the second signal to the second input of the ADC, and wherein the second digital conversion is performed with the chop circuit coupling the first signal to the second input of the ADC and coupling the second signal to the first input of the ADC.

7. The PUF apparatus of claim 1, wherein the ADC comprises:

a ramp generator configured to generate at least one ramp signal that increases or decreases over time, and a comparator whose two inputs form the first and second input of the ADC, wherein when operating in the PUF fine-measurement mode, the ADC is configured to operate as a ramp-ADC and the at least one ramp signal is applied to at least one of the comparator inputs.

8. The PUF apparatus of claim 1, further comprising a noise source for outputting a first noise signal and a second noise signal, wherein the ADC configured for selective coupling to either one of the noise source and the PUF source, wherein the plurality of different modes further comprises a dynamic random number mode, and wherein when operating in the dynamic random number mode, the PUF apparatus is configured to:

use the ADC to generate a dynamic random number using the first noise signal and the second noise signal.

9. The PUF apparatus of claim 8, wherein the ADC comprises a comparator, and wherein when operating in the dynamic random number mode, the ADC is configured to use the comparator for generating the dynamic random number; and wherein when operating in the PUF coarse-measurement mode and when operating in the PUF fine-measurement mode, the ADC is configured to use the comparator for generating the digital measurement.

10. The PUF apparatus of claim 1, wherein the PUF source comprises a pair of devices where the first signal and second signal are indicative of a random manufacturing difference between the pair of devices pair, and wherein the plurality of different modes further comprises a PUF self-checking mode, and wherein when operating in the PUF self-checking mode, the PUF apparatus is configured to:

use the ADC to generate the digital measurement, wherein the digital measurement is indicative of a magnitude of the difference between the first signal and the second signal; and determine whether the magnitude of the difference between the first signal and the second signal is greater or less than a PUF stability threshold.

11. A system comprising:

a first source comprising a pair of matched electrical devices;

a second source configured to generate an electrical signal comprising random noise, wherein the first source and the second source use separate electrical components; and a determination circuit configured to, when the system is operating in a physical unclonable function, PUF, mode:

generate, using the pair of matched electrical devices, a first electrical signal that is indicative of a random manufacturing difference between the pair of matched electrical devices; and generate a PUF value based on the first electrical signal, and wherein the determination circuit is further configured to, when the system is operating in a dynamic random number mode:

generate, using the second source, a second electrical signal comprising random noise; and generate a dynamic random number using the second electrical signal.

12. The system of claim 11, wherein the determination circuit comprises a comparator for use in generating the PUF value when the system is operating in the PUF mode, and for use in generating the dynamic random number when the system is operating in the dynamic random number mode.

13. The system of claim 12, wherein the determination circuit is configured, when the system is operating in the PUF mode, to couple an input of the comparator to the pair of matched electrical devices such that the comparator receives the first electrical signal; and wherein the determination circuit is configured, when the system is operating in the dynamic random number mode, to couple the input of the comparator to the noise source such that a pre-amplifier receives the second electrical signal.

14. The system of claim 11, wherein when the system is operating in the PUF mode, the determination circuit is configured to determine a measure of the first electrical signal and generate the PUF value using the measure of the first electrical signal, and wherein when the system is operating in the dynamic random number mode, the determination circuit is configured to determine a measure of the second electrical signal and generate the dynamic random number using the measure of the second electrical signal.

15. The system of claim 14, wherein the measure of the first electrical signal is a digital value indicative of a sign of the first electrical signal, and wherein the measure of the second electrical signal is a digital value indicative of a sign of the second electrical signal.

16. A physical unclonable function, PUF, system, comprising:

a pair of matched devices; and a determination circuit coupled to the pair of matched devices, wherein the determination circuit comprises a counter and an analog-to-digital converter, ADC, wherein the ADC comprises a ramp generator or successive approximation register converter, and wherein when the system is operating in an enrolment mode, the determination circuit is configured to:

perform an analog-to-digital conversion using the ADC to generate a digital measurement indicative of a random manufacturing difference between the pair of matched devices;

count, using the counter, a number of cycles corresponding to a stability threshold after completing the analog-to-digital conversion;

determine whether a magnitude of a random manufacturing difference between the pair of matched devices exceeds the stability threshold;

mark the pair of matched devices as suitable for use in generating a PUF value if the magnitude of the random manufacturing difference exceeds the stability threshold; and mark the pair of matched devices as unsuitable for use in generating a PUF value if the magnitude of the random manufacturing difference is less than the stability threshold, and wherein when the system is operating in a PUF mode and the pair of matched devices are marked as suitable for use in generating a PUF value:

determine a measure of the random manufacturing difference between the pair of matched devices; and generate the PUF value using the measure of the random manufacturing difference between the pair of matched devices.

17. The PUF system of claim 16, wherein the determination circuit comprises a comparator for use in determining the magnitude of the random manufacturing difference when the system is operating in the enrolment mode and for use in determining the measure of the random manufacturing difference when the system is operating in the PUF mode.

18. The PUF system of claim 16, configured to operate in the enrolment mode intermittently or periodically throughout a life of the PUF system.

* * * * *